US012233988B2

(12) United States Patent
Scheiferstein

(10) Patent No.: US 12,233,988 B2
(45) Date of Patent: Feb. 25, 2025

(54) SYSTEMS AND METHODS FOR CARGO TRANSPORT

(71) Applicant: Archimedes Freight, Inc., Phoenix, AZ (US)

(72) Inventor: Gregory Scheiferstein, Phoenix, AZ (US)

(*) Notice: Subject to any disclaimer, the term of this patent is extended or adjusted under 35 U.S.C. 154(b) by 0 days.

(21) Appl. No.: 18/726,173

(22) PCT Filed: Jan. 10, 2024

(86) PCT No.: PCT/US2024/010980
§ 371 (c)(1),
(2) Date: Jul. 2, 2024

(87) PCT Pub. No.: WO2024/151694
PCT Pub. Date: Jul. 18, 2024

(65) Prior Publication Data
US 2024/0425143 A1    Dec. 26, 2024

Related U.S. Application Data

(60) Provisional application No. 63/619,311, filed on Jan. 9, 2024, provisional application No. 63/440,381, filed on
(Continued)

(51) Int. Cl.
*B63B 1/38*    (2006.01)
*B63B 1/32*    (2006.01)
(Continued)

(52) U.S. Cl.
CPC ............... *B63B 1/38* (2013.01); *B63B 1/322* (2013.01); *B63B 39/03* (2013.01); *B63H 21/20* (2013.01);
(Continued)

(58) Field of Classification Search
CPC ........... B63B 1/38; B63B 1/322; B63B 39/03; B63B 2001/382; B63B 2001/387; B63H 21/20; B63H 2021/207
See application file for complete search history.

(56) References Cited

U.S. PATENT DOCUMENTS

| 4,099,477 A | 7/1978 | Caldwell |
| 4,789,306 A | 12/1988 | Vorus et al. |

(Continued)

FOREIGN PATENT DOCUMENTS

| CN | 110274750 A | 9/2019 |
| CN | 107554684 B | * 10/2019 |

(Continued)

OTHER PUBLICATIONS

International Search Report / Written Opinion for PCT/US24/10980, issued on May 22, 2024.
(Continued)

*Primary Examiner* — Anthony D Wiest
(74) *Attorney, Agent, or Firm* — Gregory Scheiferstein

(57) ABSTRACT

A vessel configured for transporting cargo can be configured to operate in a supercavitation mode, the supercavitation mode including releasing a fluid at least partially over an external surface, diverting at least a portion of the fluid to a propulsion system, and generating propulsion at least in part from the first fluid. In response to traveling in the supercavitation mode, the vessel can travel at high-speeds with a majority of the hull below a surface of a body of water.

17 Claims, 29 Drawing Sheets

Related U.S. Application Data on Jan. 21, 2023, provisional application No. 63/438,240, filed on Jan. 10, 2023, provisional application No. 63/438,030, filed on Jan. 10, 2023.

(51) Int. Cl.
  *B63B 39/03*  (2006.01)
  *B63H 21/20*  (2006.01)

(52) U.S. Cl.
  CPC ... *B63B 2001/382* (2013.01); *B63B 2001/387* (2013.01); *B63H 2021/207* (2013.01)

(56) References Cited

U.S. PATENT DOCUMENTS

| | | | |
|---|---|---|---|
| 5,090,352 A | 2/1992 | Stanford | |
| 6,962,121 B1 * | 11/2005 | Kuklinski | F42B 19/125 114/67 A |
| 7,779,759 B2 | 8/2010 | Paulic et al. | |
| 7,836,827 B2 | 11/2010 | Fu | |
| 7,966,936 B1 | 6/2011 | Gieseke | |
| 9,403,579 B2 | 8/2016 | Sancoff | |
| 2001/0035117 A1 | 11/2001 | Burg | |
| 2003/0101919 A1 | 5/2003 | Stevens | |
| 2004/0235369 A1 | 11/2004 | Nakajima et al. | |
| 2012/0192781 A1 | 8/2012 | Brizzolara | |
| 2015/0013586 A1 | 1/2015 | Sancoff et al. | |
| 2021/0323685 A1 | 10/2021 | Kupratis et al. | |

FOREIGN PATENT DOCUMENTS

| | | |
|---|---|---|
| CN | 114810425 A | 7/2022 |
| GB | 1170359 A | 11/1969 |
| GB | 2585758 A | 1/2021 |
| JP | 4616662 B2 | 8/2006 |
| KR | 101597632 B1 | 2/2016 |
| KR | 102141294 B1 | 8/2020 |
| KR | 20210040517 A | 4/2021 |

OTHER PUBLICATIONS

Igor Nesteeruk, "Supercavitation: Advances and Perspectives. A collection dedicated to the 70th jubilee of Yu.N. Savchenko," Springer-Verlag Berlin Heidelberg, 2012.

* cited by examiner

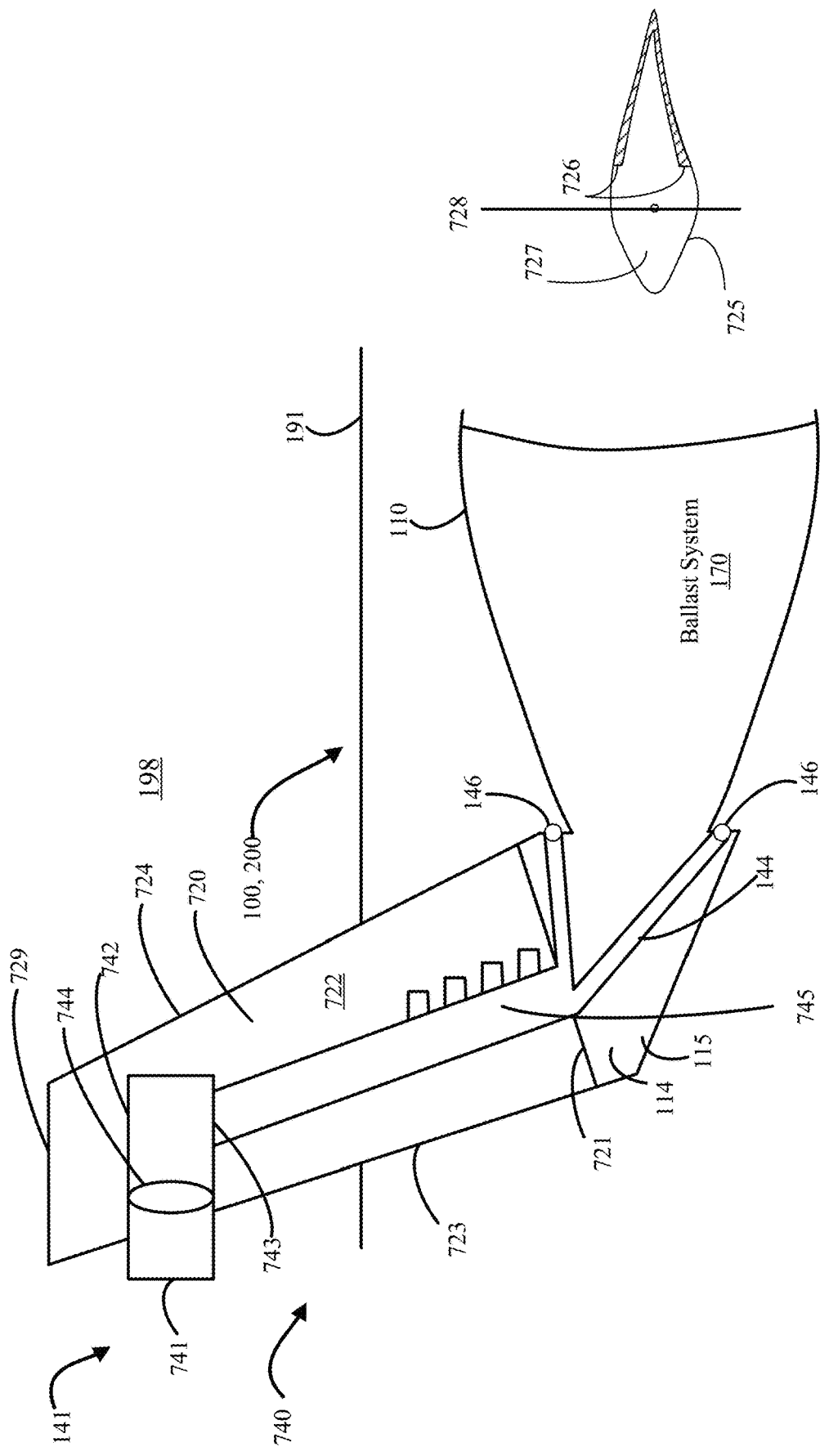

SYSTEMS AND METHODS FOR CARGO TRANSPORT

CROSS-REFERENCE TO RELATED APPLICATIONS

This application is a U.S. national stage entry under 35 U.S.C. § 371 of International Application No. PCT US2024/10980 filed on Jan. 10, 2024 and entitled "SYSTEMS AND METHODS FOR CARGO TRANSPORT," which claims priority to and the benefit of the following provisional applications: (1) U.S. Provisional Application No. 63/438,030 filed on Jan. 10, 2023 and entitled "SYSTEMS AND METHODS FOR CARGO TRANSPORT"; (2) U.S. Provisional Application No. 63/438,240 filed on Jan. 10, 2023 and entitled "SYSTEMS AND METHODS FOR CARGO TRANSPORT"; (3) Provisional Application No. 63/440,381 filed on Jan. 21, 2023 and entitled "SYSTEMS AND METHODS FOR CARGO TRANSPORT"; and (4) Provisional Application No. 63/619,311 filed on Jan. 9, 2024 and entitled "SYSTEMS AND METHODS FOR CARGO TRANSPORT." The disclosure of the foregoing applications are incorporated herein by reference in their entireties, including but not limited to those portions that specifically appear hereinafter, but except for any subject matter disclaimers or disavowals, and except to the extent that the incorporated mater is inconsistent with the express disclosure, in which case the language in this disclosure shall control.

FIELD

The present disclosure relates generally to systems, devices, and methods for cargo transport.

BACKGROUND

Freight shipping transit time is impacted by numerous factors, such as distance, shipping mode, route, and season. Sea freight typically takes between 20 days and 45 days, with about 14 of those days being transit time from China to Los Angeles, California for example. This is typically due to cargo ships traveling at exceptionally low speeds. For example, typical cargo ships travel at a speed of approximately 24 knots (or 27 miles per hour). Cargo ships travel at low speeds due to traveling across the top of the water, weather conditions, weight of the goods, cost of energy, and/or a variety of other reasons.

In contrast to sea freight shipping, another option for international shipping is air freight. International air freight typically takes between 5 and 10 days with transit time (i.e., flight time) being approximately 12 hours. Although air freight can be significantly faster, the cost of air freight is an order of magnitude higher compared to sea freight. One reason air freight is significantly more expensive is due to air freight being significantly limited by weight. In this regard, since an aircraft must generate lift, the weight of the cargo matters significantly more (e.g., lift is greater than or equal to weight of an aircraft for the aircraft to fly).

Typically, 30% of the cost of goods is paid for prior to manufacturing of the goods, and the remaining 70% of the cost of goods is paid for once the goods are shipped. Typically, businesses opt for sea freight due to the prohibitive cost of air freight. In this regard, the capital used for paying 70% of the cost of the goods prior to shipment can be tied up between 20 and 45 days during sea shipment as described above. Accordingly, improved systems, methods, and vehicles for cargo transport may be desirable.

SUMMARY

A vessel is disclosed herein. In various embodiments, the vessel is configured to operate in a supercavitation mode. The vessel is configured to release a fluid at least partially along an external surface of a hull. In response to releasing the fluid, a cavity is at least partially formed around the hull. The cavity formed around the hull can greatly reduce skin friction drag of the vessel during operation.

The vessel disclosed herein comprises a first propulsion system, a second propulsion system, and a fluid supply system configured to release the fluid to operate in the supercavitation mode. The first propulsion system is configured to operate with the fluid supply system to facilitate operation in the supercavitation mode. In various embodiments, the fluid that forms the cavity can further be utilized to facilitate, at least partially, propulsion of the vessel. For example, the fluid can be diverted into the vessel and function as a motive fluid or a fuel for a propulsion system of the vessel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 7A illustrates a schematic view of fluid supply system for a vessel, in accordance with various embodiments.

FIG. 7B illustrates a cross-sectional view of an airfoil for use in the fluid supply system of FIG. 7A, in accordance with various embodiments.

DETAILED DESCRIPTION

Figure 1A:
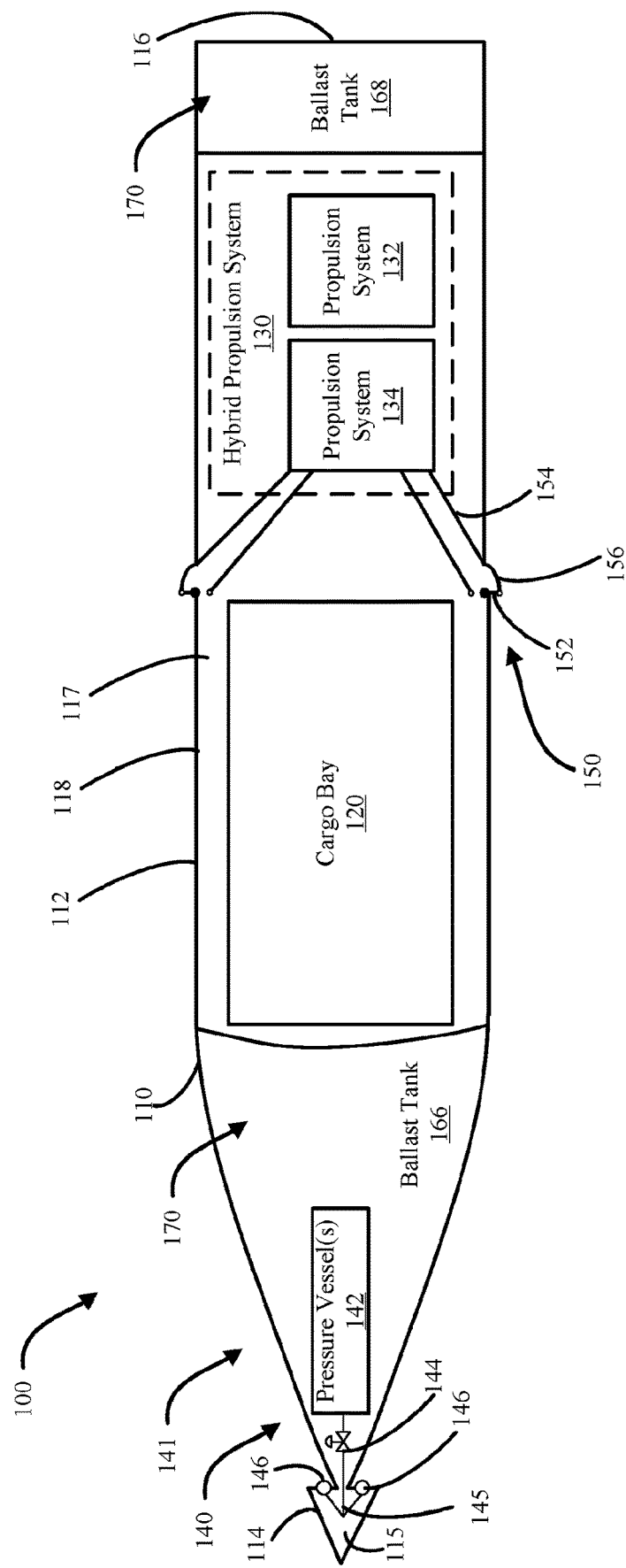
FIG. 1A illustrates a schematic view of a vessel configured to ship cargo, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of a vessel, or generally, to the direction of exhaust of the vessel. As used herein, "forward" refers to the direction associated with the nose (e.g., the front end) of a vessel, or generally, to the direction of motion.

As used herein, "distal" refers to the direction radially outward, or generally, away from the longitudinal axis of the vessel. As used herein, "proximal" refers to a direction radially inward, or generally, towards the longitudinal axis of the vessel.

As used herein, "fluid conduit" refers to any device capable of carrying a fluid therein, such as a duct, a pipe, a tube, or the like.

As used herein, "vessel" refers to a watercraft used, or capable of being used, as a means of transportation for people, cargo, or the like on or in water.

As used herein, a "rotor" refers to a rotating part of a mechanical device. Stated another way, a "rotor" as referred to herein can include a fan, a propeller, an impeller, a stage in a compressor, or the like.

Disclosed herein is a vessel configured to transport cargo. In various embodiments, the vessel is configured to generate a supercavitation flow pattern during operation. "Supercavitation," as referred to herein is an extreme form of cavitation in which a single bubble (i.e., a cavity) of a fluid (e.g., a gas) forms around an object A "supercavitation flow pattern," as referred to herein is a flow pattern that generates the cavity around a vessel with a fluid (e.g., a gas) with a lower density than water. As referred to herein, a "supercavitation mode" is a mode of operation of a vessel that generates the supercavitation flow pattern over at least a portion of the vessel. Stated another way, in response to a vessel traveling in a supercavitation mode, a single bubble (i.e., cavity) of a fluid (e.g., gas) surrounds (i.e., encloses) at least a portion of the vessel). A "non-supercavitation mode" as referred to herein is a mode of operation of a vessel where a supercavitation flow pattern is not present. The supercavitation flow pattern facilitates a reduction in skin friction drag on the vessel, which can allow for significantly increased speeds of the vessel relative to typical vessels, in accordance with various embodiments. The present disclosure is not limited in this regard.

In various embodiments, the fluid supply systems disclosed herein can be configured to facilitate subsonic, sonic, or supersonic speeds (e.g., between Mach 0.5 and Mach 5.0) of the vessel. Although described herein as facilitating sonic or supersonic speeds, the present disclosure is not limited in this regard. For example, the fluid supply systems disclosed herein can be configured to generate maximum speeds during operation that are below the speed of sound (i.e., Mach 1.0) and still be within the scope of this disclosure. Similarly, although disclosed herein as being configured to generate speeds that are below Mach 5.0, the present disclosure is not limited in this regard. For example, speeds greater than Mach 5.0 by use of the systems and methods disclosed herein are within the scope of this disclosure.

Referring now to FIGS. 1A, a schematic view of vessel 100 is illustrated in accordance with various embodiments. Vessel 100 comprises a hull 110, a hybrid propulsion system 130, and a fluid supply system 140 (e.g., a cavitation system, a supercavitation system, or the like). In various embodiments, the vessel 100 further comprises a cargo bay 120 disposed within the hull 110. Although illustrated as including cargo bay 120, the present disclosure is not limited in this regard. For example, vessel 100 having a hull 110 and utilizing the hybrid propulsion system 130 and the fluid supply system 140 without the cargo bay 120 is within the scope of this disclosure.

In various embodiments, cargo bay 120 is configured to receive, and store, cargo (e.g., containers, dry bulk cargo, liquid bulk cargo, break bulk cargo, roll-on roll-of cargo, or the like). In various embodiments, vessel 100 further comprises a cargo handling system. The cargo handling system can be configured to facilitate loading and unloading of cargo into the cargo bay 120. The cargo handling system can be in accordance with any cargo handling system known in the arts for cargo ships and/or cargo aircraft.

In various embodiments, a shape of the hull 110 combined with a placement of the fluid supply system 140 are configured to generate a supercavitation flow pattern in response to flowing a fluid, released from the fluid supply system 140 over an external surface 112 of a main body 118 of the hull 110. The supercavitation flow pattern can facilitate significant drag reduction of the hull 110 during operation of vessel 100. Drag is directly proportional to density. The density of water is approximately 800 times greater than that of air. Therefore, the drag of vessel 100 can be greatly reduced by decreasing an area of an external surface of the hull 110 that is wetted by water (i.e., the external surface of the cavitator 114 being wetted by water, and the external surface 112 of the main body 118 having a boundary layer of air traversing thereon).

In various embodiments, hull 110 includes a shape configured to facilitate a supercavitation flow pattern (e.g., separated flow along the external surface 112 of the main body 118 of the hull 110), as described further herein. The supercavitation flow pattern can be defined by a boundary layer along the external surface 112 of the main body 118 of the hull 110 and/or a cavity at least partially encapsulating the hull 110 as described further herein.

Figure 4A:
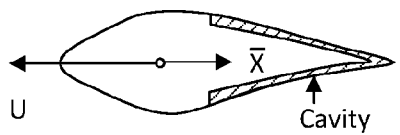
FIG. 4A illustrates an object traveling in a supercavitation mode, in accordance with various embodiments.
Figure 4B:
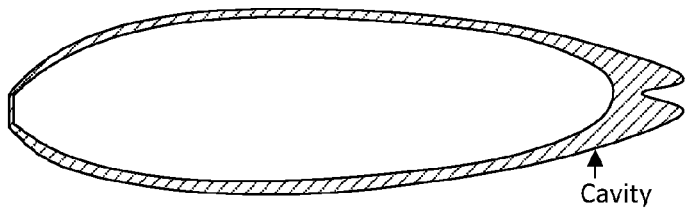
FIG. 4B illustrates an object traveling in a supercavitation mode, in accordance with various embodiments.
Figure 4C:
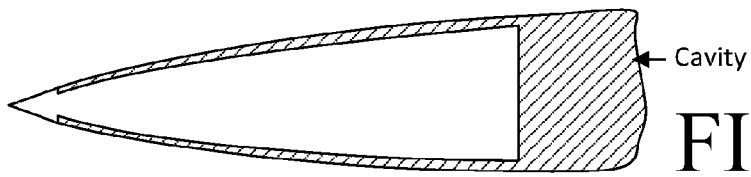
FIG. 4C illustrates an object traveling in a supercavitation mode, in accordance with various embodiments.
Figure 4D:
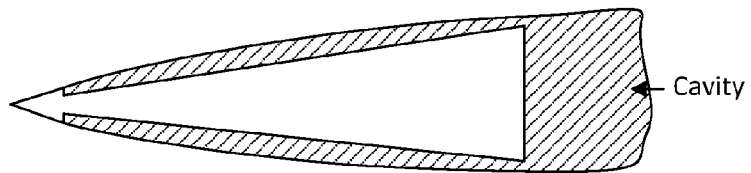
FIG. 4D illustrates an object traveling in a supercavitation mode, in accordance with various embodiments.
Figure 4E:
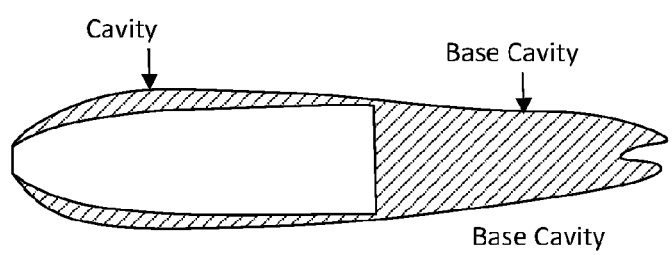
FIG. 4E illustrates an object traveling in a supercavitation mode, in accordance with various embodiments.
Figure 4F:
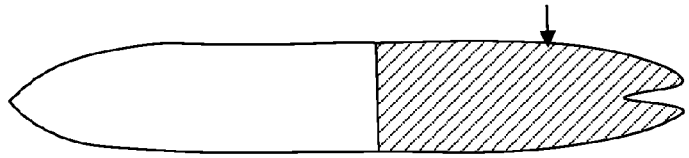
FIG. 4F illustrates an object traveling in a supercavitation mode, in accordance with various embodiments.

In various embodiments, hull 110 comprises a cavitator 114 and a main body 118. The cavitator 114 is disposed at a forward end of the hull 110. The main body 118 extends aft from, and is coupled to, the cavitator 114. In various embodiments, cavitator 114 is disposed at a forward end of hull 110. A "cavitator" as described herein, refers to a portion of hull 110 configured to be wetted by water during operation of the fluid supply system 140. The cavitator 114 is configured to limit pressure drag during operation of the fluid supply system 140. The cavitator 114 can be defined by an external surface of a leading-edge body 115. The leading-edge body 115 can comprise a slender shape (e.g., a cone shape or the like). However, the present disclosure is not limited in this regard. For example, with reference now to FIG. 4A-F, various cavitator shapes are illustrated and are within the scope of this disclosure. In various embodiments, a cavitator in accordance with FIGS. 4B, 4C, and 4D can provide minimal pressure drag relative to FIGS. 4B, 4E, and 4F, while greatly reducing skin friction drag via the fluid supply system 140.

In various embodiments, the hybrid propulsion system 130 comprises propulsion systems 132, 134. The hybrid propulsion system 130 is configured to operate in a first mode (e.g., a non-supercavitation mode) with the propulsion system 132, and the hybrid propulsion system 130 is configured to operate in a second mode (e.g., a supercavitation mode) with the propulsion system 134. In this regard, as described further herein, the hybrid propulsion system 130 is configured to transition between a high-speed mode (e.g., a cavitation mode, a supercavitation mode, or the like), and a low-speed mode (e.g., between 10 and 40 knots). A "supercavitation mode" as referred to herein is a mode of operation where the fluid from the fluid supply system 140 creates a supercavitation flow pattern (i.e., a boundary layer) along the external surface 112 of the main body 118 of the hull 110 as described further herein. The supercavitation mode can facilitate greatly reduced drag and greatly increased speeds relative to typical vessel systems. Furthermore, in various embodiments, the supercavitation mode can facilitate orders of magnitude transit times for freight relative to typical sea freight. In various embodiments, the supercavitation mode can facilitate faster transit time relative to air freight (e.g., between 2 and 10 times faster).

In various embodiments, the fluid supply system 140 comprises one or more fluid outlets 146 disposed proximate a forward end of the hull 110. In various embodiments, the one or more fluid outlets 146 are configured to be in fluid communication with a fluid source 141 during operation in at least one mode of vessel 100. In various embodiments, the fluid source 141 can comprise one or more pressure vessels 142 disposed within the hull 110 or the fluid source 141 can be an external environment 198 with ambient air (e.g., as shown in FIG. 7A and described further herein).

In various embodiments, the fluid supplied along the external surface 112 of the main body of the hull 110 (e.g., via the fluid supply system 140 described further herein) can be an oxidizer (e.g., air, oxygen gas, chlorine gas) or a fuel (e.g., hydrogen gas, ammonia gas, methane gas). In this regard, in the supercavitation mode, a portion of the boundary layer from the fluid traveling along the external surface 112 of the main body 118 of the hull 110 can be bleed into the propulsion system 134 via a plumbing system 150, in accordance with various embodiments. Therefore, the fluid from the fluid supply system 140 can have a dual purpose (i.e., reducing skin friction drag of the vessel 100 and providing either a motive fluid or a fuel to the propulsion system 134), in accordance with various embodiments. In various embodiments, if used as a fuel for the propulsion system 134, the fuel may bleed off sparingly—as opposed to being continuously bled off when being used as a motive fluid—to refuel the propulsion system 134. However, the present disclosure is not limited in this regard, and a fuel may be bled off continuously to the propulsion system 134 and still be within the scope of this disclosure.

In various embodiments, the propulsion system 132 can comprise any propulsion system known in the arts of underwater vessels. For example, the propulsion system 132 can comprise a pump jet/propulsor (FIG. 5A), conventional propellers (e.g., non-ducted propulsors) (FIG. 5B), permanent magnetic rotors (e.g., having a shaft in accordance with a rotor of FIG. 5C), or the like. The present disclosure is not limited in this regard.

The propulsion system 132 is configured to provide an operating mode for operation of the vessel 100 around ports, in confined areas, or the like. Stated another way, vessel 100 can be operated close to land or any other short-range form of operation by the propulsion system 132 to facilitate precise, accurate, and short movements. The present disclosure is not limited in this regard. For example, vessel 100 may operate in a default operating mode (i.e., a normal operating mode) during docking or the like (similar to how an aircraft taxi's prior to docking at a gate). In this regard, the vessel 100 can travel in the default operating mode to navigate out of a port, then transition to a supercavitation mode in open water, then transition back to the default operating mode once the vessel 100 is near a destination port, in accordance with various embodiments. In various embodiments, the propulsion system 132 is configured to typically operate in water (i.e., via displacing water).

Figure 1B:
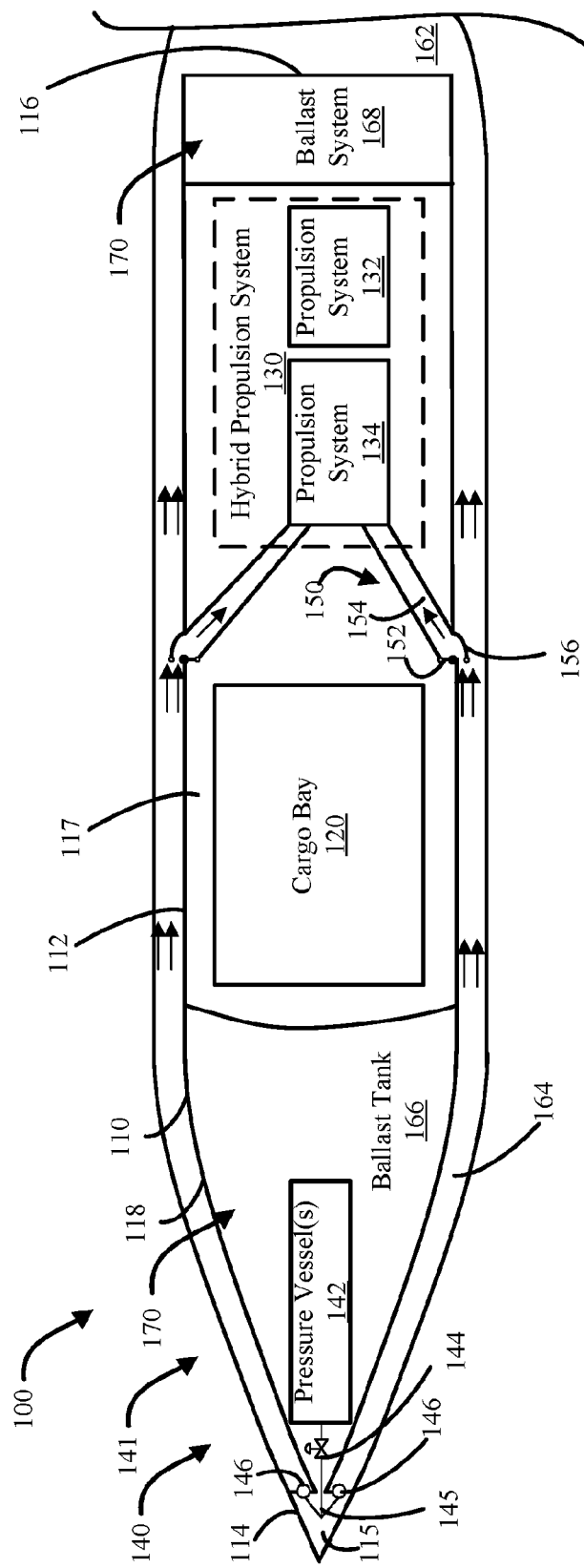
FIG. 1B illustrates a schematic view of the vessel during operation in a supercavitation mode, in accordance with various embodiments.

In various embodiments, the propulsion system 132 is configured to provide sufficient thrust for the vessel to exceed a speed where a boundary layer (e.g., boundary layer 164 as shown in FIG. 1B) is formed over the external surface 112 of the main body 118 of the hull 110 (i.e., a cavity 162 is formed as shown in FIGS. 4A-F) and transition to the supercavitation mode described above. Additionally, the non-supercavitation mode of the propulsion system 132 can be operated close to land or any other short-range form of operation, in accordance with various embodiments. Once the speed is reached that generates the boundary layer (e.g., boundary layer 164 as shown in FIG. 1B), the propulsion system 134 can be turned on and the propulsion system 132 can be turned off in order to facilitate a significantly greater operating speed (e.g., between Mach 0.6 and Mach 5.0, or between Mach 1.0 and Mach 5.0). In various embodiments, the propulsion system 132 is configured to typically operate in water (i.e., via displacing water). In contrast, the propulsion system 134 can be configured to typically operate from the fluid in the one or more pressure vessels 142 (e.g., air or oxygen for an air or oxygen breathing gas turbine engine, or the like).

In various embodiments, the propulsion system 134 can comprise a turbine (or jet) engine (FIG. 6A), a ramjet (FIG. 6B), a rocket engine (FIG. 6C), or any combination of the three (e.g., a turbine-based combined cycle propulsion engine 2300 as shown in FIGS. 23A-E). In various embodiments, ramjets can be most efficient between Mach 3.0 and Mach 6.0, so reaching a high speed via the propulsion system 132, prior to transitioning to the propulsion system 134 could be desirable in response to a ramjet being utilized for the propulsion system 134.

Figure 23A:
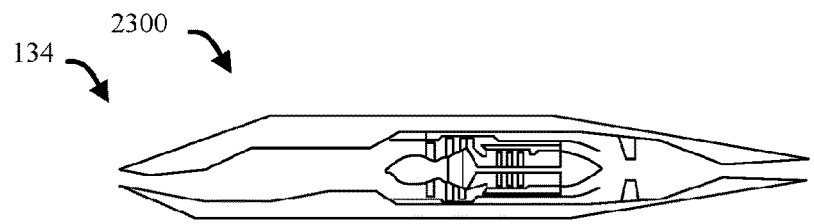
FIG. 23A illustrates a turbine-based combined cycle engine in a turbofan mode, in accordance with various embodiments.
Figure 23B:
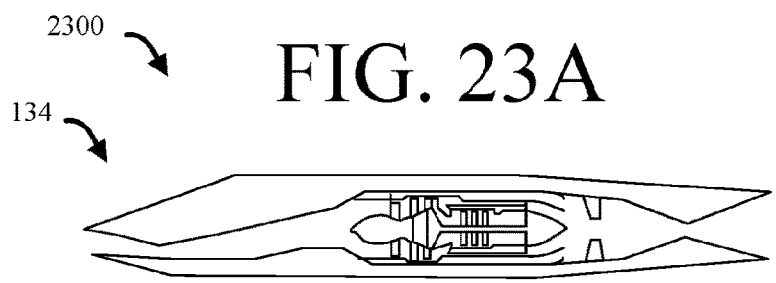
FIG. 23B illustrates a turbine-based combined cycle engine in a turbofan mode prior to a transition to a ramjet mode, in accordance with various embodiments.
Figure 23C:
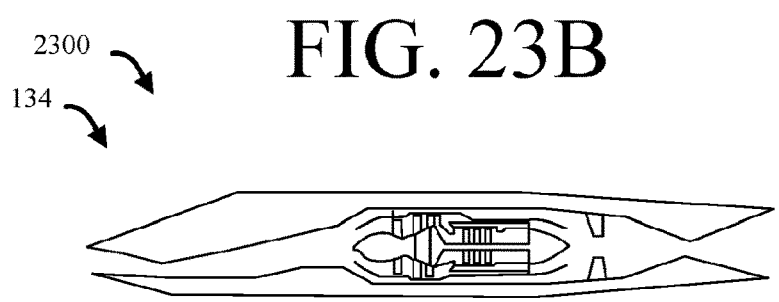
FIG. 23C illustrates a turbine-based combined cycle engine during a transition between the turbofan mode and the ramjet mode, in accordance with various embodiments.
Figure 23D:
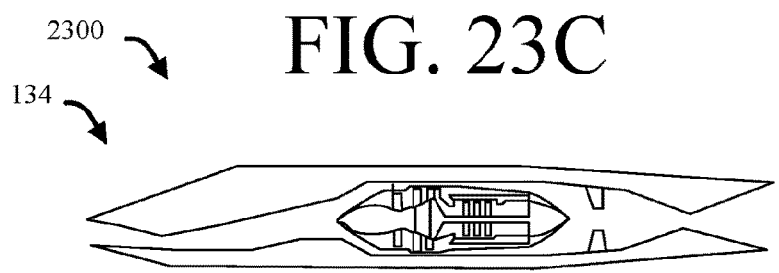
FIG. 23D illustrates a turbine-based combined cycle engine in a ramjet mode immediately after the transition, in accordance with various embodiments.
Figure 23E:
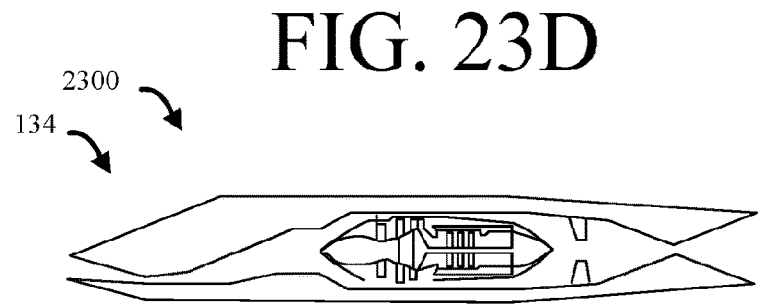
FIG. 23E illustrates a turbine based combined cycle engine in a ramjet mode at a cruising speed.

In various embodiments, the ramjet (FIG. 6B) could be used in combination with the jet engine (FIG. 6A) (e.g., as shown in the turbine-based combined cycle propulsion engine 2300 from FIGS. 23A-E). For example, with reference now to FIG. 23A-E, the turbine-based combined cycle propulsion engine 2300 comprises a turbofan configuration as shown in FIGS. 23A and 23B and a ramjet configuration as shown in FIGS. 23D and 23E. The turbine-based combined cycle propulsion engine 2300 is configured to transition between the turbofan configuration and the ramjet configuration as shown in FIGS. 23B-D. In this regard, in the turbofan mode as shown in FIG. 23A, the turbine-based combined cycle propulsion engine 2300 could propel the vessel 100 to sufficient speeds to utilize the ramjet configuration (e.g., approximate Mach 3), transition to the ramjet configuration once the sufficient speeds are reached (e.g., as shown in FIGS. 23B-D), and then utilize the ramjet configuration as shown in FIG. 23E at even higher speeds (e.g., approximately Mach 5 and greater), in accordance with various embodiments.

In various embodiments, since vessel 100 of FIG. 1A can be fed a motive fluid (e.g., through plumbing system 150), propulsion system 134 can comprise jet engine (FIG. 6A) and/or the ramjet (FIG. 6B), the turbine-based combined cycle propulsion engine 2300 from FIGS. 23A-E, or any other air-breathing propulsion system. In various embodiments, the propulsion system 234 of the vessel 200 from FIG. 2A can supply its own oxidizer and fuel, so the propulsion system 234 of the vessel 200 from FIG. 2A can utilize the rocket engine (FIG. 6C), in accordance with various embodiments. However, the present disclosure is not limited in this regard. For example, the vessel 100 of FIG. 1A could utilize a rocket engine (FIG. 6C) and utilize the plumbing system 150 to re-fill an oxidizer and/or a fuel of the rocket engine, in accordance with various embodiments and still be within the scope of this disclosure.

In various embodiments, the fluid supply system 140 further comprises a valve 144 and one or more fluid conduits 145. In various embodiments, the valve 144 can correspond to each of the one or more pressure vessels 142, a set of the one or more pressure vessels, or all of the one or more pressure vessels 142. The present disclosure is not limited in this regard. In various embodiments, the one or more pressure vessels 142 are configured to be fluidly coupled to the one or more fluid outlets 146 of the fluid supply system 140 while operating in a supercavitation mode. For example, in response to at least partially opening valve 144, a fluid is released from the one or more pressure vessels 142, flowed through the one or more fluid conduits 145 and out the one or more fluid outlets 146. The speed at which the fluid is released can be controlled by metering the fluid (e.g., by controlling an output cross-sectional area of the valve 144 or the like), in accordance with various embodiments.

In various embodiments, the one or more fluid outlets 146 can be disposed on an axial surface (i.e., defined by a plane substantially normal to a longitudinal direction of the vessel 100). "Substantially normal" as referred to herein is normal +/−10 degrees, in accordance with various embodiments. In various embodiments, the one or more fluid outlets 146 can be aligned substantially tangential to a local point of the external surface 112 adjacent to the fluid outlets 146. "Substantially tangential" as referred to herein, is tangential +/−10 degrees. However, the present disclosure is not limited in this regard, and any angle of the fluid outlets 146 relative to a local point of the external surface 112 adjacent to the fluid outlets 146 would be within the scope of this disclosure.

In various embodiments, choice of a fluid for the one or more pressure vessels 142 can be based on a variety of operational factors. For example, to provide the greatest reduction in skin friction drag, a lower density fluid (e.g., hydrogen gas) may be desirable. However, if the fluid is also being used as a motive fluid (e.g., an oxidizer) for the propulsion system 134, a greater density fluid (e.g., oxygen gas or chlorine gas) may be desirable to increase thrust of the propulsion system 134 (i.e., thrust is proportional to a fluid density at the inlet of the propulsion system 134). Thus, depending on the configuration of the fluid supply system 140 and the propulsion system 134, various fluids could be utilized and providing various potential benefits.

In various embodiments, choice of a fluid can also be based on various environmental factors. For example, warming sea temperatures have been found to be depleting ocean waters of oxygen, making it difficult for predators to breathe or hunt in deep waters. In this regard, by utilizing oxygen or air as the fluid of one or more pressure vessels 142, vessel 100 can be configured to deposit oxygen back into the ocean, providing various environmental benefits.

Although illustrated in FIGS. 1A, 1B as including the fluid source 141 for generating a supercavitation flow pattern on-board the vessel (i.e., within the one or more pressure vessels 142), the present disclosure is not limited in this regard. For example, with reference now to FIG. 7A, with like numerals depicting like elements, the fluid source 141 for generating the supercavitation flow pattern can be received from an external environment 198. In this regard, the vessel 100 can further comprise a rotor 744 (e.g., a fan, a propeller, an impeller, a compressor, or the like) configured to route (i.e., pull) air from an external environment 198 through one or more fluid conduits 745, and out the one or more fluid outlets 146 described previously herein. Accordingly, the vessel 100 can comprise a continuous supply of the fluid source 141 that does not have to be replenished after, or during, a respective cargo shipment utilizing the vessel 100, saving time, money, and/or costs, in accordance with various embodiments.

With continued reference to FIG. 7A, the fluid supply system 740 can comprise the rotor 744 and one or more fluid conduits 745. The one or more fluid conduits 745 is configured to fluidly couple the external environment 198 to the one or more fluid outlets 146 described previously herein. The rotor 744 is configured to pull air from the external environment 198 into the one or more fluid conduits 745, and the one or more fluid conduits 745 are configured to route the air out the one or more fluid outlets 146 to generate a supercavitation flow pattern of the external surface 112 of the main body 118 of the hull 110 as described previously herein.

In various embodiments, rotor 744 can be coupled to a nacelle 742. The nacelle 742 can protect the rotor from the external environment 198. In various embodiments, the nacelle 742 is coupled to an aerodynamic structure 720 (e.g., a wing, an airfoil, or the like) that extends outward (e.g., vertically and forward) from the cavitator 114). In various embodiments, the one or more fluid conduits 745 is routed through the aerodynamic structure 720 to the one or more fluid outlets 146 (e.g., from an inlet 743 disposed proximate an outer end 729 (e.g., a tip) of the aerodynamic structure 720. In various embodiments, the nacelle 742 comprises an inlet 741 aligned in the direction of travel for the vessel 100 (i.e., substantially parallel to a longitudinal axis of the hull 110). However, the present disclosure is not limited in this regard. For example, the inlet 741 of the nacelle could be angled relative to a longitudinal axis of hull 110 and still be within the scope of this disclosure.

Although rotor 744 is illustrated as being disposed in the nacelle 744, the present disclosure is not limited in this regard. For example, rotor 744 could be disposed in one of the one or more fluid conduits 745 routed through the aerodynamic structure 720 and still be within the scope of this disclosure. Although rotor 744 is illustrated as being aligned in the direction of travel, the present disclosure is not limited in this regard. For example, one of the one or more fluid conduits 745 could extend to the outer end 729 and define an opening at the outer end. In this regard, the rotor 744 could be disposed in the one of the one or more fluid conduits 745 and configured to pull air from a boundary layer of flow over the outer end 729 (e.g., the tip) of the airfoil 722 while operating in the supercavitation mode. In such a configuration, a moment generated by the fluid supply system 740 could be reduced since the air would not have to turn after entering a nacelle 742, in accordance with various embodiments.

In various embodiments, the aerodynamic structure 720 comprises an airfoil 722 (e.g., a substantially symmetric airfoil). In this regard, the airfoil 722 can be configured to limit a pressure drag on vessel 100 in an equivalent manner to the cavitator 114 as described previously herein. In various embodiments, the aerodynamic structure 720 is configured to extend at least partially above a waterline 191 during operation of vessel 100. In various embodiments, the aerodynamic structure 720 can at least partially extend above the waterline 191 while operating with propulsion system 132 and/or while operating with propulsion system 134. The present disclosure is not limited in this regard. In various embodiments, the airfoil 722 extends from a root 721 at least partially defining an interface with the cavitator 114 to the outer end 729 (e.g., a tip) of the airfoil 722. Although illustrated as having root 721 at least partially interfacing with the cavitator 114, the present disclosure is not limited in this regard. For example, some or all of the root 721 can extend from a portion of the hull 110 that is aft of the cavitator 114 (i.e., the main body 118) and still be within the scope of this disclosure. In this regard, air from the external environment can be routed aft of cavitator 114, into hull 110, forward into the cavitator 114, and out the one more fluid outlets 146 and still be within the scope of this disclosure. Accordingly, a cavitator shape can maintain a uniform annular shape, which could improve the aerodynamics of the cavitator 114, in accordance with various embodiments. In various embodiments, the airfoil 722 extends axially from a leading edge 723 to a trailing edge 724. A chord length of the airfoil 722 can be substantially equal along a span of the airfoil 722 or tapered along the span of the airfoil 722. The present disclosure is not limited in this regard. In various embodiments, by tapering the airfoil 722, the root 721 may be stronger relative to an airfoil that includes a substantially equal chord length along the span of the airfoil 722.

In various embodiments, the airfoil 722 can comprise a cross-sectional shape in accordance with FIG. 7B. In this regard, the airfoil 722 can further comprise one or more fluid outlets 726 disposed aft in a chord direction (i.e., a longitudinal direction of the vessel 100, 200) of a maximum chord location 728. In this regard, forward of the one or more fluid outlets 726, the airfoil 722 comprises a cavitator 727 (i.e., a surface 725 configured to be wetted by water during operation in a supercavitation mode). In various embodiments, with reference back to FIG. 7A, the one or more fluid outlets 726 can be disposed along a portion of a span of the airfoil 722. Stated another way, the one or more fluid outlets 726 can be disposed along a span of the airfoil 722 that is configured to be below the waterline 191 during operation of the vessel 100, 200 in a supercavitation mode. In various embodiments, the one or more fluid outlets 726 are in fluid communication with the external environment 198 via the one or more fluid conduits 745 and the nacelle 742. In various embodiments, the airfoil 722 is substantially symmetric (i.e., within a nominal symmetric profile by 1 inch (2.54 cm), or by 0.5 inches (1.27 cm), or by 0.25 inches (0.635 cm), or by 0.10 inches (0.254 cm), or the like). In this regard, the airfoil 722 can be configured to generate little to no lateral force on the vessel 100, 200, during operation thereof.

In various embodiments, with the fluid supply system 740 from FIG. 7A being capable of providing a continuous supply of air, the fluid supply system 740 can be further configured to route at least a portion of the air from the external environment directly to the propulsion system 134, 234. In this regard, the air from the external environment can function as a motive fluid for an air-breathing engine (e.g., jet engine from FIG. 6A, ramjet engine from FIG. 6B, or the turbine-based combined cycle propulsion engine 2300 from FIGS. 23A-E). In various embodiments, in such an embodiment, the propulsion system 132 could potentially be eliminated since the propulsion system 134 could operate with or without the supercavitation flow pattern (e.g., without or without the boundary layer 164 from FIGS. 1B and 2B).

Figure 22A:
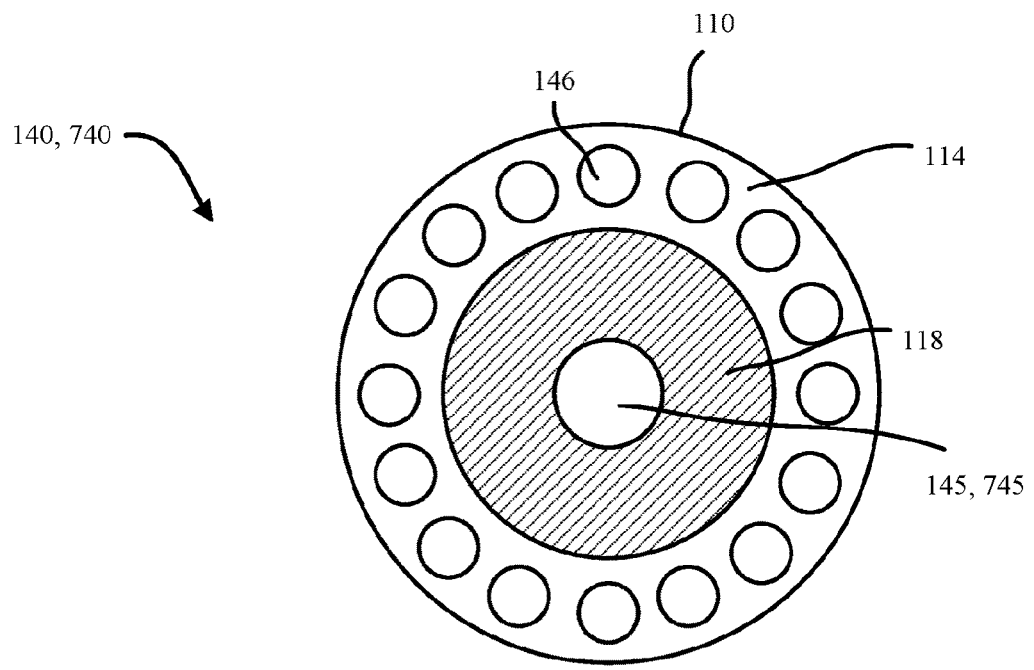
FIG. 22A illustrates an aft looking forward cross-sectional view of a cavitator, in accordance with various embodiments.
Figure 22B:
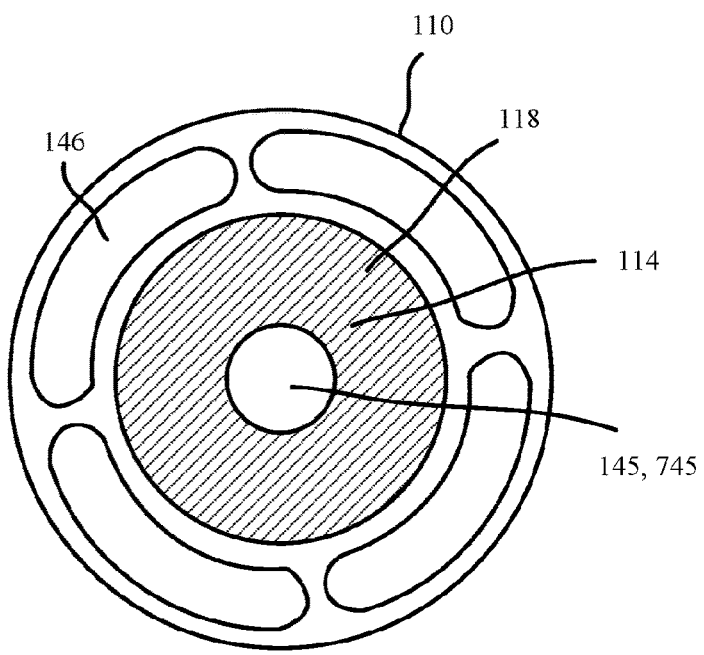
FIG. 22B illustrates an aft looking forward cross-sectional view of a cavitator, in accordance with various embodiments.

With brief reference now to FIG. 22A and 22B, an aft looking forward cross-sectional view of a portion of the fluid supply system 140, 740 is illustrated, with like numerals depicting like elements, in accordance with various embodiments. As described previously herein, the one or more fluid outlets 146 can be disposed in any arrangement about an axial surface of the cavitator 114. For example, the one or more fluid outlets 146 can include a plurality of apertures disposed circumferentially about a longitudinal axis of the cavitator 114 as shown in FIG. 22A, arcuate shaped apertures can be disposed circumferentially about the longitudinal axis, or the like. The present disclosure is not limited in this regard and any configuration of the one or more fluid outlets 146 that is capable of generating a supercavitation flow pattern as described previously herein is within the scope of this disclosure. In various embodiments, fluid supplied to the one or more fluid outlets 146, 745 can be routed from an aft location longitudinally from the one or more fluid outlets 146, 745. In this regard, although illustrated in FIG. 7A as routing air from the external environment 198 from a forward location relative to the one or more fluid outlets 146, the present disclosure is not limited in this regard, and the one or more fluid conduits 745, as the respective fluid supply source (e.g., the rotor 744) can be disposed longitudinally forward from the one or more fluid outlets 146, in accordance with various embodiments.

Referring back to FIGS. 1A and 1B, in various embodiments, vessel 100 can further comprise a ballast system 170 and a pressure hull 117. In various embodiments, the ballast system 170 can be in accordance with ballast systems known in the underwater vessels arts. In various embodiments, the ballast system 170 can include one or more main ballast tanks (e.g., ballast tank 166 and/or ballast tank 168) and/or free flood spaces. Although the ballast tanks 166, 168 are illustrated as being in a forward portion of the hull 110 and an aft portion of the hull 110, the present disclosure is not limited in this regard. For example, the ballast tanks 166, 168 can be provided in any configuration known in the underwater vessel arts and be within the scope of this disclosure.

In various embodiments, the ballast system 170 (e.g., the main ballast tanks and the free flood spaces) is configured to be flooded with surrounding sea water to transition the vessel from a surfaced configuration to a submerged configuration while the pressure hull 117 remains at or around atmospheric pressure and withstands the increased pressure. Similarly, the ballast system 170 is configured to discharge sea water disposed in the ballast system 170 to transition the vessel 100 back from the submerged configuration to the surfaced configuration. A "submerged configuration" as described herein refers to the vessel 100 being fully below the surface of the sea water (i.e., fully submerged). A "surface configuration" as described herein refers to hull 110 the vessel 100 being at least partially above the surface of the sea water. In various embodiments, pressure hull 117 is disposed within hull 110. A "pressure hull" as referred to herein is an airtight shell that surrounds an interior of vessel 100. In this regard, pressure hull 117 is at atmospheric pressure typically regardless of depth of the vessel 100. In various embodiments, cargo bay 120 is disposed within pressure hull 117. In various embodiments, cargo bay 120 is pressure hull 117. Stated another way, in various embodiments, an entirety of the pressure hull 117 can comprise the cargo bay 120 or a portion of the pressure hull 117 can comprise the cargo bay 120. The present disclosure is not limited in this regard.

With reference now to FIG. 1A, the plumbing system 150 is configured to feed fluid released from the one or more pressure vessels 142 (that is flowing along the external surface 112 of the main body 118 of the hull 110) into the propulsion system 134 (i.e., during operation of the fluid supply system 140, or for periods of time during operation of the fluid supply system 140). For example, the plumbing system 150 comprises one or more fluid conduits 154, a valve 152, and a scoop 156. Valve 152 is configured to transition from a closed position to an open position and vice versa. In response to transitioning to an open position, while the vessel 100 is in the supercavitation mode, a portion of the fluid from the one or more pressure vessels 142 that is traveling over the external surface 112 can be diverted via the scoop 156 into the one or more fluid conduits 154 to fluidly couple the one or more pressure vessels 142 to the propulsion system 134, in accordance with various embodiments. Although illustrated as including a scoop 156, the present disclosure is not limited in this regard. For example, a pulling force from the propulsion system 134 could be sufficient to pull a portion of the fluid from the boundary layer 164 of the fluid without having a scoop 156, in accordance with various embodiments.

Referring now to FIG. 1B, the vessel 100 from FIG. 1A in a supercavitation mode is illustrated, with like numerals depicting like elements, in accordance with various embodiments. As described previously herein, in the supercavitation mode, the one or more fluid outlets 146 of the fluid supply system 140 are fluidly coupled to a fluid source 141 (e.g., the one or more pressure vessels 142 or the external environment 198 for the fluid supply system 740 from FIG. 7A). In response to the one or more fluid outlets 146 being fluidly coupled to the fluid source 141 and the vessel 100 traveling at a sufficient speed, a boundary layer 164 is formed over the external surface 112 of the main body 118 of the hull 110, which at least partially forms the cavity 162 that at least partially encapsulates the vessel 100. Due to the fluid from the fluid source 141 that is released from the one or more fluid outlets 146 having orders of magnitude lower density relative to the density of water, a skin friction drag on the vessel can be significantly reduced. Additionally, by having a slender cavitator 114 at a forward end of hull 110, a pressure drag can be minimized on vessel 100.

In various embodiments, in response to the valve 152 being at least partially open while the boundary layer 164 is formed, a portion of the fluid in the boundary layer 164 can be diverted into the propulsion system 134 of the hybrid propulsion system 130. In this regard, the fluid of the fluid source 141 (e.g., the one or more pressure vessels 142 or the external environment 198 from FIG. 7A) can function as a motive fluid for propulsion system 134, function as a fuel for propulsion system 134, or the like. In various embodiments, when the fluid source 141 is from the external environment 198 as shown in FIG. 7A, the fluid is air, and the air can act as a motive fluid for the propulsion system 134 (e.g., for an air-breathing engine, such as a jet engine from FIG. 6A and/or a ramjet engine from FIG. 6B). The present disclosure is not limited in this regard. In various embodiments, an exhaust from the propulsion system 134 can be expelled from an aft end 116 of vessel 100.

Although described herein as including a plumbing system 150 configured to divert at least a portion of a boundary layer 164 into a propulsion system 134 of the vessel 100 for use in the propulsion system 134, the present disclosure is not limited in this regard. For example, with reference now to FIG. 2A, a schematic view of a vessel 200, without the plumbing system 150 of vessel 100 from FIG. 1A, is illustrated with like numerals depicting like elements. In various embodiments, vessel 200 comprises a hybrid propulsion system 230 comprising the propulsion system 132 and a propulsion system 234. The hybrid propulsion system 230 is in accordance with the hybrid propulsion system 130 as described previously herein with the exception that propulsion system 234 replaces the propulsion system 134.

Figure 6A:
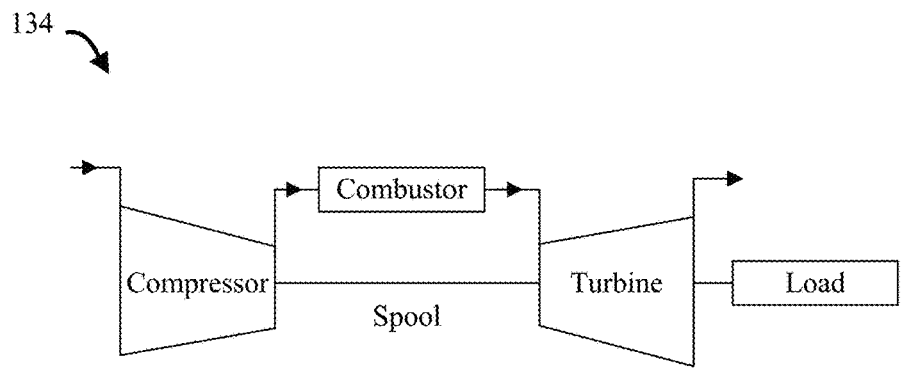
FIG. 6A illustrates a schematic view of a propulsion system of a hybrid propulsion system for a vessel, in accordance with various embodiments.
Figure 6B:
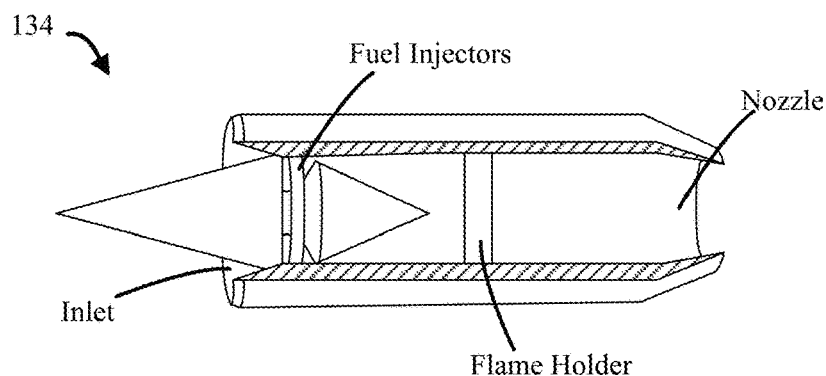
FIG. 6B illustrates a cross-sectional view of a propulsion system of a hybrid propulsion system for a vessel, in accordance with various embodiments.
Figure 6C:
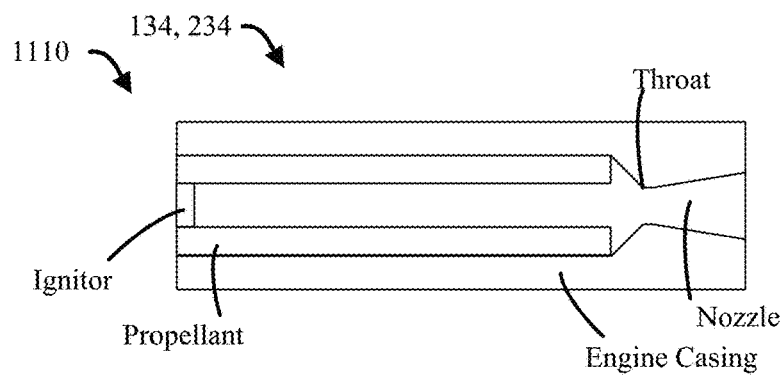
FIG. 6C illustrates a schematic view of a propulsion system of a hybrid propulsion system for a vessel, in accordance with various embodiments.

In various embodiments, the propulsion system 234 comprises an air-independent propulsion system configured to generate sufficient thrust to transition the vessel 200 into a supercavitation mode as described previously herein. For example, the propulsion system 234 can comprise a rocket engine 1110 as shown in FIG. 6C and described further herein. In various embodiments, by having a rocket engine 1110, the supercavitation flow pattern (as shown in FIG. 2B) does not have to be generated prior to igniting the rocket engine 1110. For example, the rocket engine 1110 from FIG. 6C can have an independent oxygen source, and can therefore burn anywhere, including the vacuum of space. Stated another way, the rocket engine 1110 of FIG. 6C can propel the vessel 200 from FIGS. 2A and 2B without utilizing fluid from the supercavitation flow pattern as shown in FIG. 2B. Yet, the supercavitation flow pattern of FIG. 2B facilitates significantly reduced skin friction drag, which facilitates significantly less drag (i.e., significantly less thrust to achieve the same speed).

Figure 3A:
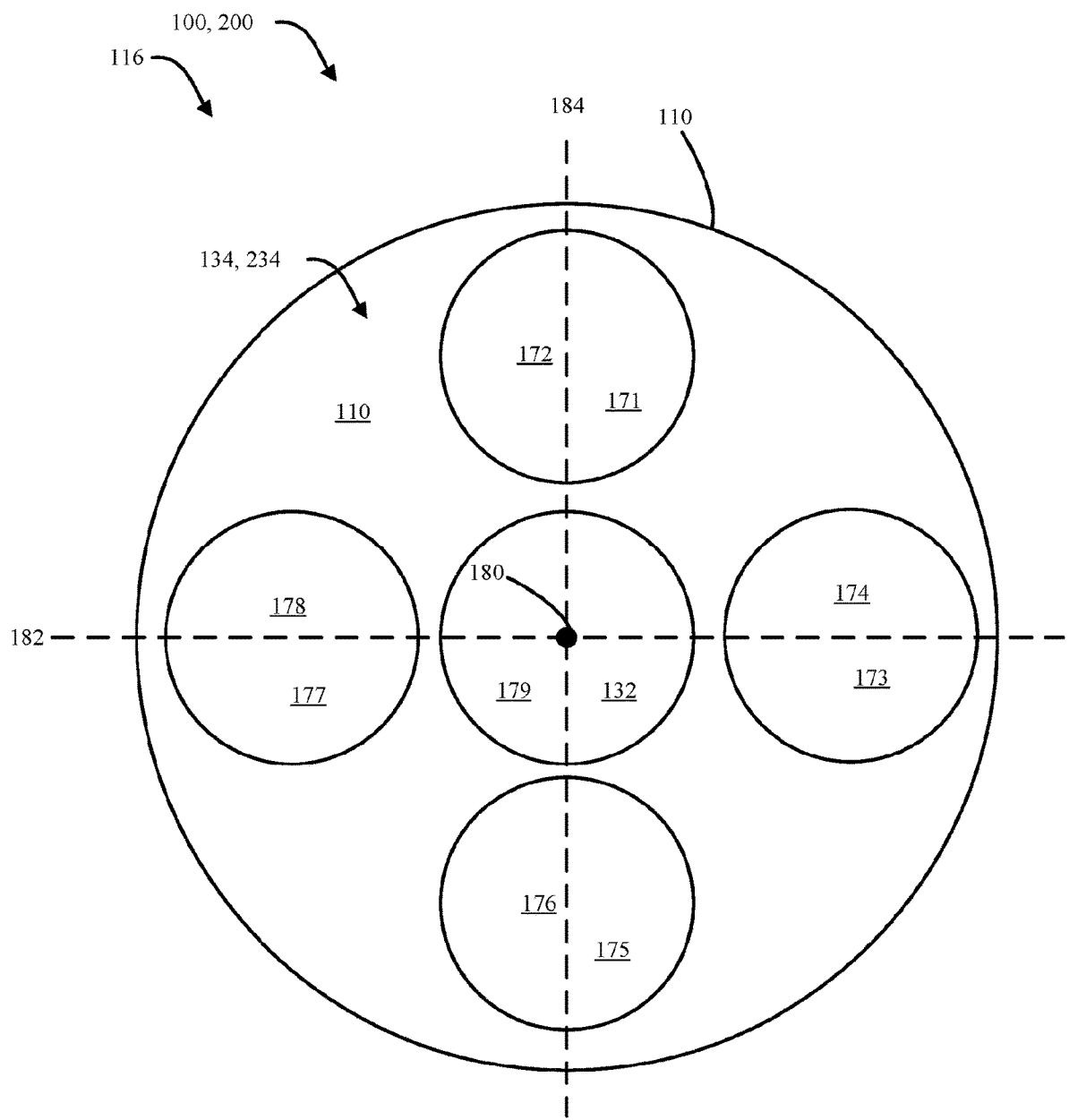
FIG. 3A illustrates an aft looking forward view of a vessel, in accordance with various embodiments.
Figure 3B:
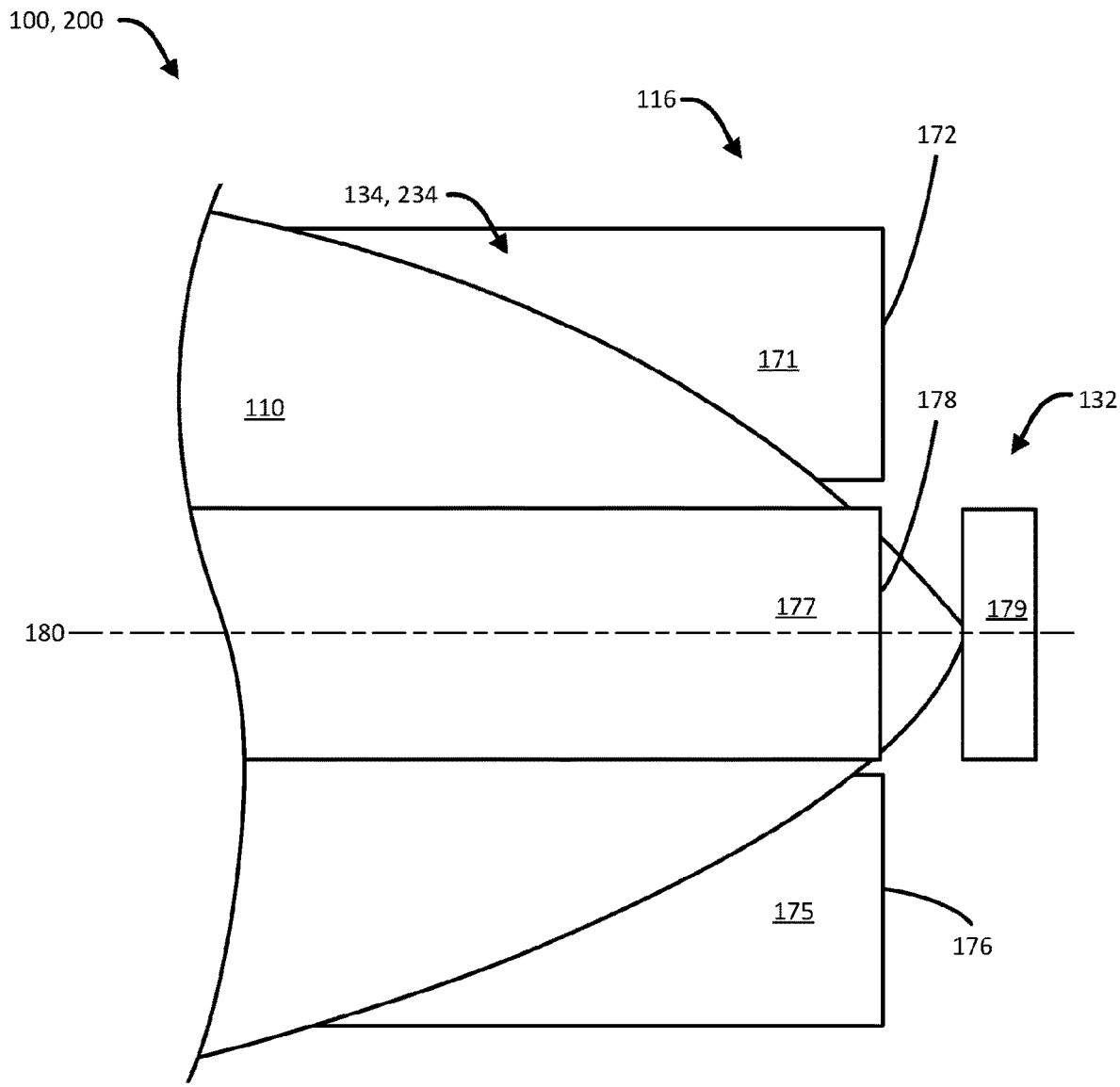
FIG. 3B illustrates a side view of a vessel, in accordance with various embodiments.

Referring now to FIGS. 3A and 3B, an aft looking forward view of the aft end 116 of the vessel 100, 200 (FIG. 3A), and a side view of the aft end 116 of the vessel 100, 200 (FIG. 3B) are illustrated, with like numerals depicting like elements, in accordance with various embodiments. In various embodiments, the propulsion system 134, 234 of the vessels 100, 200 includes exhaust outlets 172, 174, 176, 178. In various embodiments, exhaust outlets 172, 174, 176, 178 each comprise valves disposed therein. For example, in response to operating with the propulsion system 132 as described previously herein, the valves in the exhaust outlets 172, 174, 176, 178 can be in a closed position. In this regard, water surrounding the vessel 100, 200 can be prevented from entering the propulsion system 134, 234 during operation or anytime propulsions system 134, 234 is not in operation.

In various embodiments, each exhaust outlet can correspond to a respective engine (e.g., jet engine from FIG. 6A, ramjet engine from FIG. 6B, or rocket engine 1110 from FIG. 6C) in the propulsion system 134, 234. For example, the exhaust outlet 172 can correspond to a first engine 171, the exhaust outlet 174 can correspond to a second engine 173, the exhaust outlet 176 can correspond to a third engine 175, and the exhaust outlet 178 can correspond to a fourth engine 177. Although described herein as the engines 171, 173, 175, 177 as being one of a jet engine from FIG. 6A, a ramjet engine from FIG. 6B, or a rocket engine from FIG. 6C, the present disclosure is not limited in this regard. For example, the engines 171, 173, 175, 177 could be fully electrically powered engines, or any other alternative engine to those illustrated in FIGS. 6A-C and still be within the scope of this disclosure. Although the jet engine from FIG. 6A is illustrated as a gas turbine engine, the present disclosure is not limited in this regard. For example, a hybrid gas/electric turbine engine having one or more electric motors is also within the scope of this disclosure.

In various embodiments, the engines 171, 173, 175, 177 can be spaced apart circumferentially about an aerodynamic center 180 of the vessel 100, 200. In various embodiments, the engine 171 can mirror the engine 175 about a horizontal plane 182 disposed through the aerodynamic center 180. Similarly, engine 173 and the engine 177 can be mirror images of each other about a vertical plane 184 disposed through the aerodynamic center 180. In this regard, engines 171, 175 can at least partially control the pitch of the vessel 100, 200 and the engines 173, 177 can control yaw of the vessel 100, 200. Although illustrated as including four engines, the present disclosure is not limited in this regard. For example, pitch and yaw can be controlled with any number of engines greater than three and be within the scope of this disclosure.

In various embodiments, the aft end 116 of the vessel 100, 200 can further comprise the propulsion system 132 (e.g., a pump jet/propulsor (FIG. 5A), conventional propellers (FIG. 5B), permanent magnetic rotors (e.g., having a shaft in accordance with a rotor of FIG. 5C), or the like). In various embodiments, the propulsion system 132 can be disposed proximate the aerodynamic center 180 of the vessel 100, 200. In various embodiments, the propulsion system 132 comprises a propulsor 179 (e.g., a pump jet/propulsor (FIG. 5A), conventional propellers (FIG. 5B), permanent magnetic rotors (e.g., having a shaft in accordance with a rotor of FIG. 5C), or the like). In this regard, propulsor 179 can be configured to provide propulsion to the vessel 100, 200 when operating at low speeds (e.g., during docking, close to shore, or the like).

In various embodiments, with brief reference to FIG. 1B, for vessel 100, the plumbing system 150 can be configured to route a portion of the boundary layer flow 164 to at least two of the engines 171, 173, 175, 177. For example, two of the engines 171, 173, 175, 177 (e.g., engine 177 and engine 173) could be configured to operate without use of the boundary layer flow 164 (e.g., via a rocket engine from FIG. 6C, or another air-independent propulsion system), and two of the engines 171, 173, 175, 177 (e.g., engines 171 and 175) could operate with the use of the boundary layer flow 164 being used as a motive fluid (e.g., via a ramjet engine from FIG. 6B). In this regard, rocket engines could be utilized for brief periods to generate enough speed to operate in a ramjet configuration, and then the vessel 100 could transition from the rocket engines (from FIG. 6C) to the ramjet engines (FIG. 6B) in a manner described further herein.

In various embodiments, each of the engines 171, 173, 175, 177 can comprise the turbine-based combined cycle propulsion engine 2300 from FIGS. 23A-E. In various embodiments, a set of the engines 171, 173, 175, 177 can comprise the turbine-based combined cycle propulsion engine 2300 from FIGS. 23A-E (e.g., engine 171 and engine 175, engine 177 and engine 173, or the like).

Although illustrated in FIGS. 3A and 3B as having engines of the propulsion system 134, 234 disposed radially outward from the engine of propulsion system 132, the present disclosure is not limited in this regard. For example, the propulsion system 134 can have a propulsor 179 that is disposed radially outward from an engine of the propulsion system 134, 234 and still be within the scope of this disclosure. Similarly, although illustrated with multiple engines for the propulsion system 134, 234, the present disclosure is not limited in this regard. For example, a single engine embodiment of the propulsion system 134, 234 is within the scope of this disclosure.

Figure 2A:
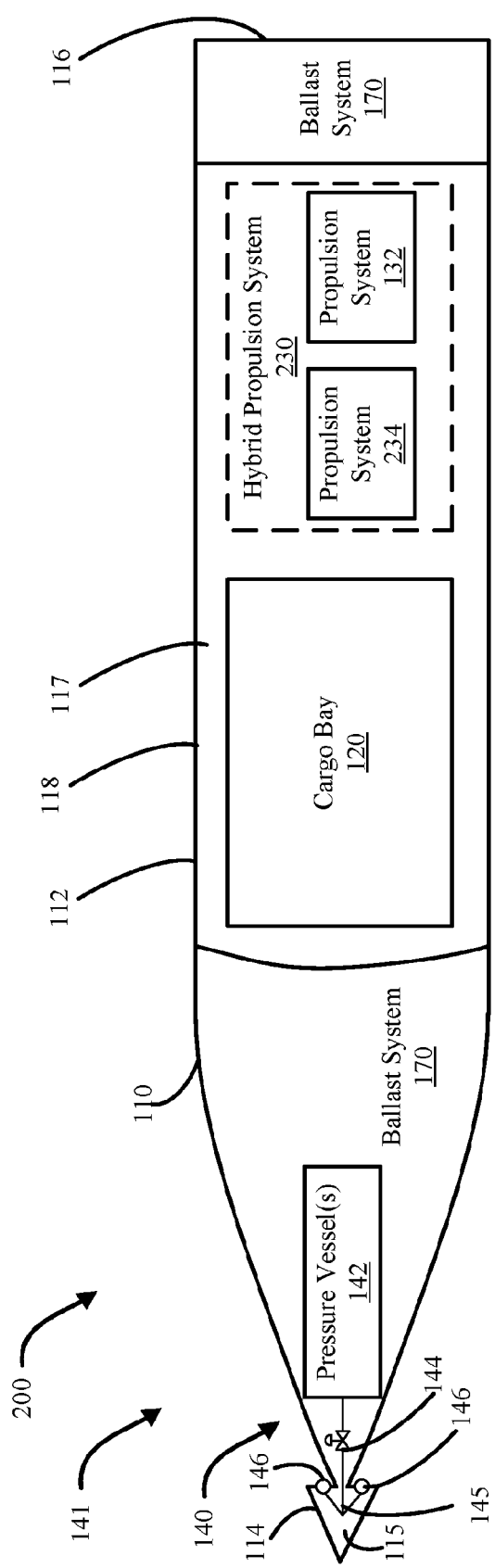
FIG. 2A illustrates a schematic view of a vessel configured to ship cargo, in accordance with various embodiments.
Figure 2B:
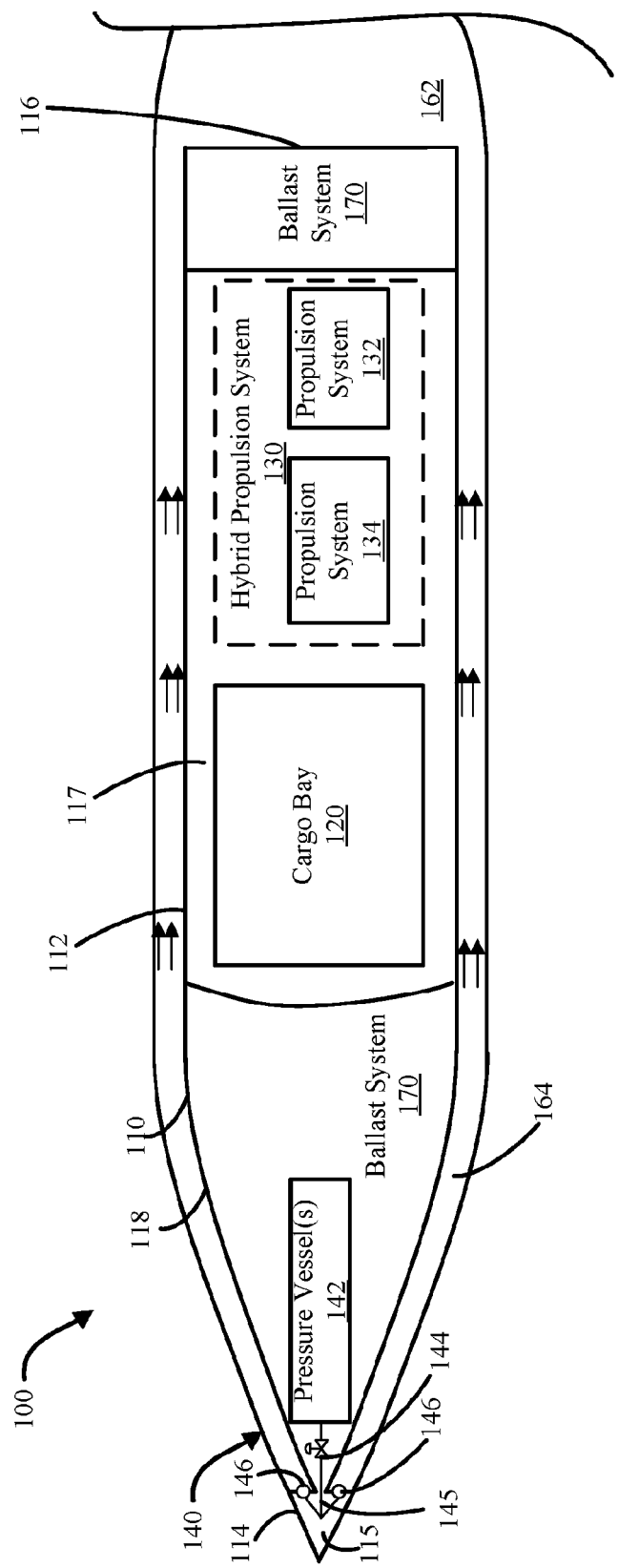
FIG. 2B illustrates a schematic view of the vessel from FIG. 2A during operation in a supercavitation mode, in accordance with various embodiments.
Figure 11:
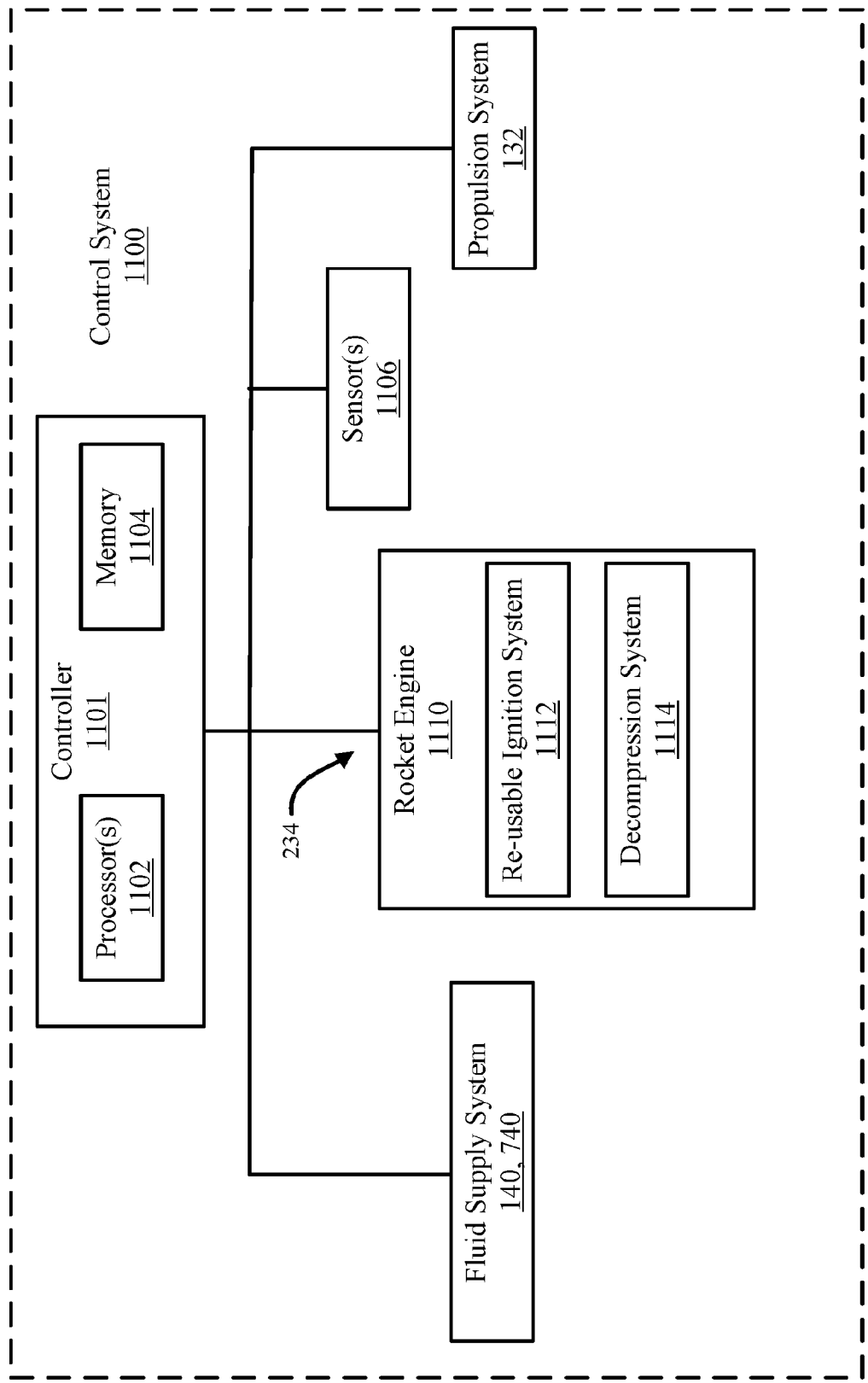
FIG. 11 illustrates schematic view of a control system for a vessel in accordance with various embodiments.

In various embodiments, for the propulsion system 234 from FIG. 2A, 2B, each of the engines 171, 173, 175, 177 can comprise a rocket engine 1110 from FIG. 11. In various embodiments, for the propulsion system 234 from FIG. 2A, 2B, a set of the engines (e.g., engine 173 and engine 177, engine 172 and engine 176, or the like) can comprise a rocket engine 1110 from FIG. 11 and a remaining set of engines can be configured for fluid communication with the boundary layer flow 164 via plumbing system 150 from FIGS. 1A, 1B, or the like. The present disclosure is not limited in this regard.

Figure 8:
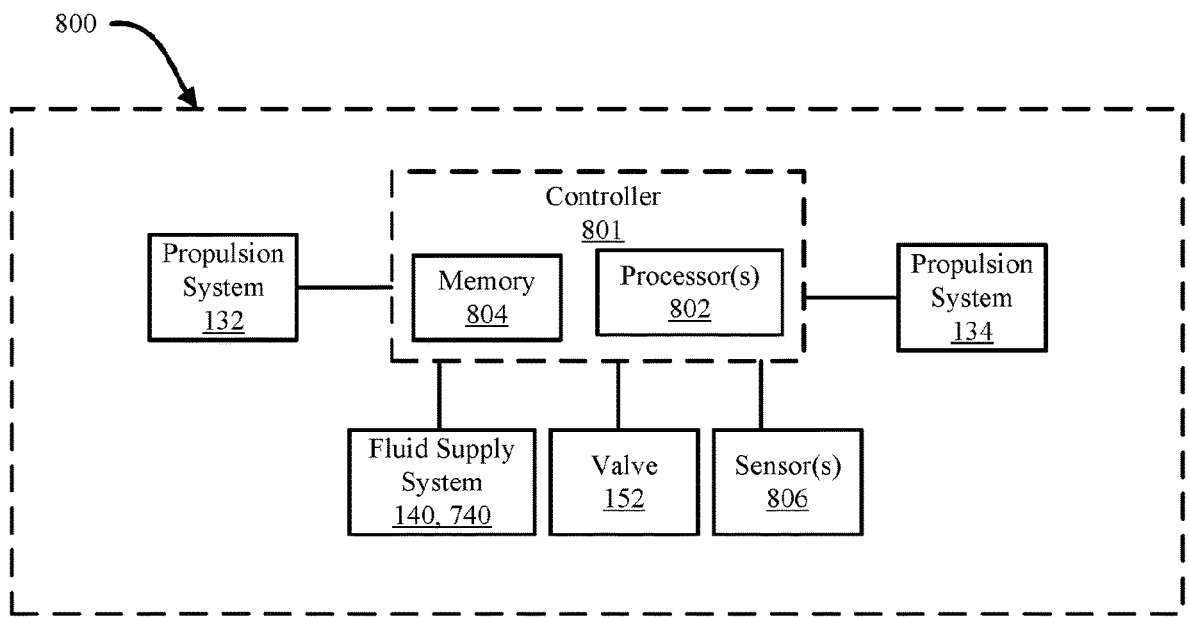
FIG. 8 illustrates a schematic view of a control system for a vessel, in accordance with various embodiments.
Figure 9:
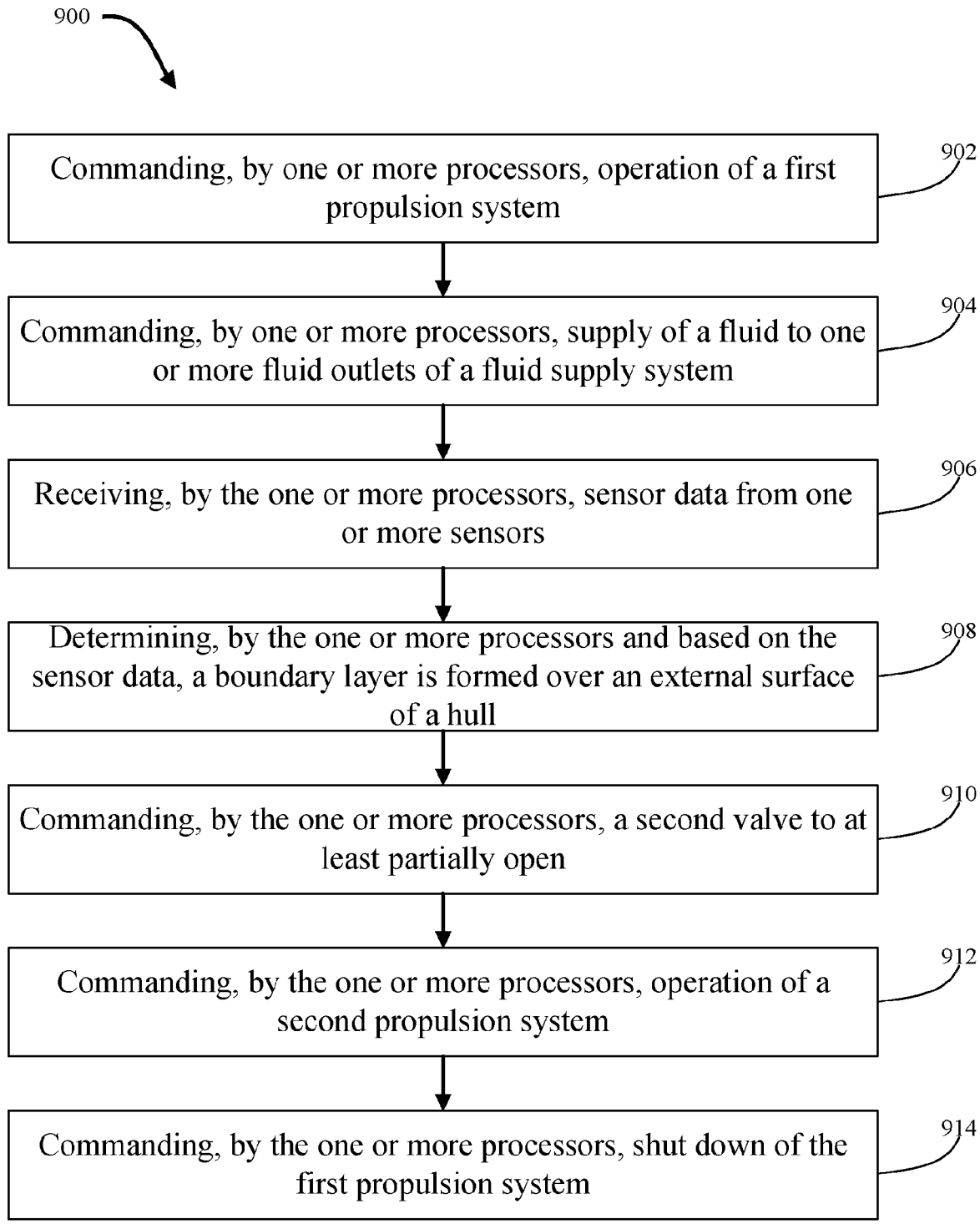
FIG. 9 illustrates a process performed by the control system of FIG. 8, in accordance with various embodiments.

Referring now to FIG. 8, a schematic block diagram of a control system 800 for a vessel 100 from FIGS. 1A-B is illustrated, in accordance with various embodiments. Stated another way, the control system 800 of FIG. 8 is configured to divert at least a portion of the boundary layer 164 into the propulsion system 134 while operating with the propulsion system 134 (e.g., continuously for use as a motive fluid, periodically for use as re-fueling the propulsion system 134, continuously as a fuel-oxidizer mixture, or the like). The present disclosure is not limited in this regard.

Control system 800 includes a controller 801 in electronic communication with the electronic components of the fluid supply system 140, 740 (e.g., valve 144 for fluid supply system 140, rotor 744 for the fluid supply system 740 from FIG. 7A, or the like), the valve 152, the propulsion systems 132, 134, and one or more sensors 806. In various embodiments, the rotor 744 can be electrically powered (e.g., via an electric storage device, such as a battery), gas-powered and started via an electric signal, or the like). The present disclosure is not limited in this regard.

In various embodiments, controller 801 may be integrated into computer systems onboard vessel 100. In various embodiments, controller 801 may be configured as a central network element or hub to access various systems, engines, and components of control system 800. Controller 801 may comprise a network, computer-based system, and/or software components configured to provide an access point to various systems, engines, and components of control system 800. In various embodiments, controller 801 comprises one or more processors 802. In various embodiments, controller 801 can be implemented in a single processor. In various embodiments, controller 801 can be implemented as and may include one or more processors and/or one or more tangible, non-transitory memories (e.g., one or more memories 804) and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. Controller 801 may comprise one or more processors 802 configured to implement various logical operations in response to execution of instructions, for example, instructions stored on a non-transitory, tangible, computer readable medium configured to communicate with controller 801.

System program instructions and/or controller instructions may be loaded onto a non-transitory, tangible computer-readable medium having instructions stored thereon that, in response to execution by a controller 801, cause the controller 801 to perform various operations. The term "non-transitory" is to be understood to remove only propagating transitory signals per se from the claim scope and does not relinquish rights to all standard computer-readable media that are not only propagating transitory signals per se.

In various embodiments, one or more sensors 806 can be any sensor capable of monitoring whether a supercavitation flow pattern is being generated. For example, the one or more sensors 806 can include speed sensors, boundary layer probes, piezoelectric sensors, pressure sensors, or the like. The present disclosure is not limited in this regard. In various embodiments, speed sensors can be used indirectly based on fluid dynamic studies (e.g., a boundary layer is generated after a predetermined speed threshold). In various embodiments, a boundary layer probe can be disposed forward of the scoop 156 to ensure a boundary layer has been generated prior to opening valve 152 of the plumbing system 150. Piezoelectric sensors can be disposed below a skin of the external surface 112 of the main body 118 forward of the scoop 156 and used to measure variations in pressure on the external surface 112 of the main body 118 to determine whether a boundary layer has been generated. Other pressure sensors can be utilized to determine the pressure of the fluid passing the probe. In response to a significant change in the pressure of the fluid, controller 801 would be able to determine a transition to a supercavitation flow pattern. Although described with various potential sensors in the one or more sensors 806, the present disclosure is not limited in this regard, and any sensor capable of providing data to a controller 801, so that the controller 801 can determine whether a supercavitation flow pattern is occurring over a portion of the hull 110 is within the scope of this disclosure.

Referring now to FIGS. 1A, 1B, 3A, 3B, 6, 8, and 9, with like numerals depicting like elements, a process flow (i.e., method 900 from FIG. 9) for the control system 800 from FIG. 8 of the vessel 100 from FIGS. 1A, 1B, 3A, and 3B is illustrated, in accordance with various embodiments. The method 900 comprises commanding, by the one or more processors 802 of the controller 801, operation of a first propulsion system (e.g., propulsion system 132 of the hybrid propulsion system 130) (step 902). In this regard, the propulsion system 132 can be initiated via any method in the underwater vessel arts, resulting in an initial propulsion of the vessel 100 in water.

The method 900 further comprises commanding, by one or more processors 802, supply of a fluid to one or more fluid outlets 146 of a fluid supply system 140, 740 (step 904). For example, for fluid supply system 140, the one or more processors 802 can command the valve 144 to at least partially open. In response to at least partially opening the valve 144, the fluid is released from the one or more fluid outlets 146 and directed along a contour of an external surface 112 of the main body 118 of the hull 110. For the fluid supply system 740, the one or more processors 802 can command the rotor 744 to rotate to a set speed (or within a range of speeds). In response to the rotor 744 rotating, air can be pulled from the external environment 198 through an inlet 741 of the nacelle 742, through the one or more fluid conduits 745, and out the one or more fluid outlets 146 to supply a boundary layer flow over the external surface 112 of the main body 118 of the hull 110.

The method 900 further comprises receiving, by the one or more processors 802 of the controller 801, sensor data from one or more sensors 806 (step 906). The sensor data from the one or more sensors 806 can correspond to a speed of the vessel 100, a boundary layer thickness of the boundary layer 164 at a location longitudinally forward of the valve 152, a pressure in the boundary layer at a location longitudinally forward of the valve 152, or the like. The present disclosure is not limited in this regard. The sensor data is configured to be interpreted by the one or more processors 802 to determine whether a boundary layer has sufficiently formed (i.e., a thickness of the boundary layer exceeds a boundary layer thickness threshold) proximate the valve 152, in accordance with various embodiments.

The method 900 further comprises determining, by the one or more processor 202 and based on the sensor data, a boundary layer 164 is formed over an external surface 112 of the main body 118 of the hull 110 (step 908), and commanding, by the one or more processors 802, the valve 152 to at least partially open in response to the determining the boundary layer is formed in step 908 (step 910) (i.e., as shown in FIG. 1B). In various embodiments, by ensuring the boundary layer 164 is formed over the external surface 112 of the main body 118 of the hull 110 prior to opening the second valve 152, the control system 200 can ensure that mainly (e.g., between 90% and 100%) of what is diverted to the propulsions system 134 is the fluid from the fluid source 141 (e.g., the one or more pressure vessels 142, the external environment 198, or the like). In various embodiments, the valves corresponding to the exhaust outlets 172, 174, 176, 178 described previously herein can be commanded at least partially open during step 910 as well. In various embodiments, the valves corresponding to the exhaust outlets 172, 174, 176, 178 described previously herein can be passive and not receive any instructions or command from the one or more processors 802. The present disclosure is not limited in this regard. The method 900 further comprises commanding, by the one or more processors 802, operation of a second propulsion system 134 of the hybrid propulsion system 130 (step 912). In various embodiments, the second propulsion system 134 can be initiated via any method, such as via an air starter valve, via an ejection charge, or the like. The present disclosure is not limited in this regard.

In various embodiments, the method 900 further comprises commanding, by the one or more processors 802, shut down of the first propulsion system (e.g., propulsion system 132 of the hybrid propulsion system 130) (step 914). In this regard, vessel 100 can be operating in a supercavitation mode via the second propulsion system 134 only to facilitate significantly faster transit time for transport of cargo, in accordance with various embodiments. In this regard, after traveling in the supercavitation mode, the one or more processors can be configured to transition from the supercavitation mode back to a non-supercavitation mode by shutting down the propulsion system 134 and re-starting the propulsion system 132. Accordingly, the one or more processors 802 can facilitate transitioning between the supercavitation mode and the non-supercavitation mode, in accordance with various embodiments.

Figure 10:
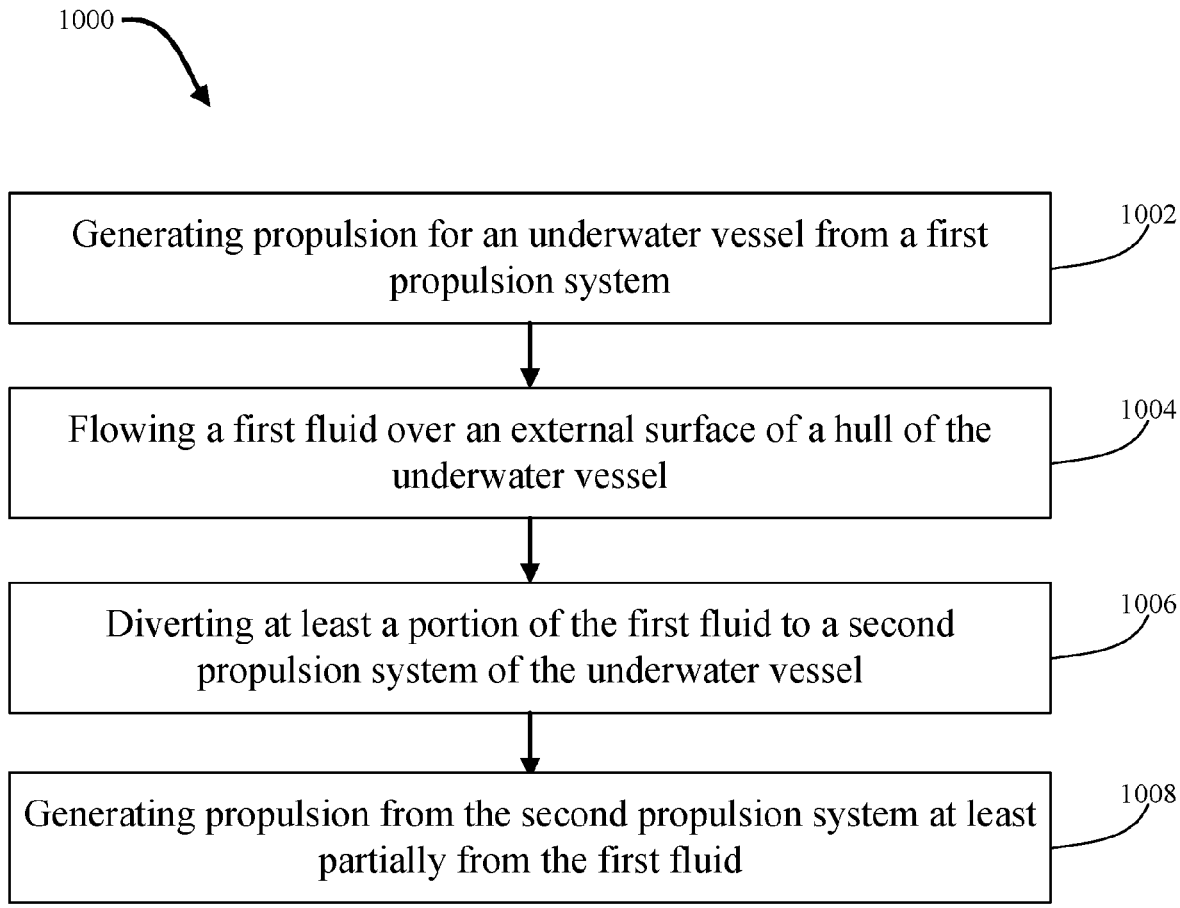
FIG. 10 illustrates a method for operating a vessel, in accordance with various embodiments.

Referring now to FIG. 10, a method 1000 of using the vessel 100 from FIGS. 1A, 1B, 3A, 3B is illustrated, in accordance with various embodiments. The method 1000 comprises generating propulsion for a vessel 100 from a first propulsion system (e.g., propulsion system 132 of a hybrid propulsion system 130) (step 1002). As stated previously herein, the propulsion system 132 can comprise a pump jet/propulsor (FIG. 5A), conventional propellers (e.g., non-ducted propulsors) (FIG. 5B), permanent magnetic rotors (e.g., having a shaft in accordance with a rotor of FIG. 5C), or the like. In various embodiments, the propulsion system 132 can be powered by an energy storage device (e.g., a battery, a fuel cell, a supercapacitor, or the like). In various embodiments, the propulsion system 132 can be powered by nuclear energy, or any air-independent propulsion system. The present disclosure is not limited in this regard.

In various embodiments, method 1000 further comprises flowing a first fluid over an external surface 112 of a main body 118 of a hull 110 of the vessel 100 (step 1004). The first fluid can be released from one or more fluid outlets 146 of a fluid supply system 140, 740 (e.g., supplied from one or more pressure vessels 142 for fluid supply system 140, supplied from an external environment 198 for fluid supply system 740), in accordance with various embodiments.

In various embodiments, the method 1000 further comprises diverting (e.g., via the plumbing system 150 as shown in FIG. 1B) at least a portion of the first fluid to a second propulsion system 134 of the vessel 100 (step 1006). In various embodiments, the first fluid can fuel the propulsion system 134 (e.g., the one or more pressure vessels 142 can comprise a fuel disposed therein) or function as a motive fluid for the propulsion system 134. For example, air from the external environment 198 for fluid supply system or any motive fluid disposed in the one or more pressure vessels 142 (e.g., an oxidizer such as air, oxygen gas, chlorine gas) can function as a motive fluid for the propulsion system 134. In various embodiments, method 1000 further comprises generating propulsion from the second propulsion system 134 at least partially from the first fluid (step 1008). For example, generating propulsion from the second propulsion system 134 can further comprise injecting a second fluid into the propulsion system from the fluid supply system 140 (e.g., a first fluid from a first of the one or more pressure vessels 142 and a second fluid from a second of the one or more pressure vessels 142). In various embodiments, the first fluid comprises a fuel, and the second fluid comprises an oxidizer, or vice versa. In this regard, the fluid supply system 140 can supply a mixture of fluid (e.g., including a fuel and an oxidizer) into the propulsion system 134 and generate propulsion in response to igniting the mixture of fluid, in accordance with various embodiments.

Referring now to FIG. 11, a schematic block diagram of a control system 1100 for a vessel (e.g., vessel 200 from FIGS. 2A and 2B) is illustrated, in accordance with various embodiments. Control system 1100 includes a controller 1101 in electronic communication with the electronic components of the fluid supply system 140, 740 (e.g., valve 144 for fluid supply system 140, rotor 744 for the fluid supply system 740, or the like), the propulsion system 132, the propulsion system 234, and one or more sensors 1106. In various embodiments, the rotor 744 can be electrically powered (e.g., via an electric storage device, such as a battery), gas-powered and started via an electric signal, or the like). The present disclosure is not limited in this regard.

In various embodiments, controller 1101 may be integrated into computer systems onboard vessel 100. In various embodiments, controller 1101 may be configured as a central network element or hub to access various systems, engines, and components of control system 1100. Controller 1101 may comprise a network, computer-based system, and/or software components configured to provide an access point to various systems, engines, and components of control system 1100. In various embodiments, controller 1101 comprises one or more processors 1102. In various embodiments, controller 1101 can be implemented in a single processor. In various embodiments, controller 1101 can be implemented as and may include one or more processors and/or one or more tangible, non-transitory memories (e.g., one or more memories 1104) and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. Controller 1101 may comprise one or more processors 1102 configured to implement various logical operations in response to execution of instructions, for example, instructions stored on a non-transitory, tangible, computer readable medium configured to communicate with controller 1101.

System program instructions and/or controller instructions may be loaded onto a non-transitory, tangible computer-readable medium having instructions stored thereon that, in response to execution by a controller 1101, cause the controller to perform various operations. The term "non-transitory" is to be understood to remove only propagating transitory signals per se from the claim scope and does not relinquish rights to all standard computer-readable media that are not only propagating transitory signals per se.

In various embodiments, the one or more sensors 1106 can be any sensor capable of monitoring whether a supercavitation flow pattern is being generated. For example, the one or more sensors 1106 can include speed sensors, boundary layer probes, piezoelectric sensors, pressure sensors, or the like. The present disclosure is not limited in this regard. In various embodiments, speed sensors can be used indirectly based on fluid dynamic studies (e.g., a boundary layer is generated after a predetermined speed threshold). Piezoelectric sensors can be disposed below a skin of the external surface 112 and used to measure variations in pressure on the external surface 112 to determine a boundary layer profile. Other pressure sensors can be utilized to determine the pressure of the fluid passing the probe. In response to a significant change in the pressure of the fluid, controller 1101 would be able to determine a transition to a supercavitation flow pattern. Although described with various potential one or more sensors 1106, the present disclosure is not limited in this regard, and any sensor capable of providing data to a controller 1101, so that the controller 1101 can make operational determinations is within the scope of this disclosure.

With continued reference to FIG. 11, the second propulsion system 234 comprises one or more of a rocket engine 1110 from FIG. 6C. The rocket engine 1110 can comprise a re-usable ignition system 1112 and a decompression system 1114. In this regard, the rocket engine 1110 is configured to start (i.e., be ignited), propel the vessel 200 from FIGS. 2A, 2B, 3A, 3B, then stop (i.e., by decompression), in accordance with various embodiments. Accordingly, the rocket engine 1110 can be re-used for multiple operation cycles prior to changing a propellant, in accordance with various embodiments. In various embodiments, each of the engines 171, 173, 175, 177 from FIGS. 3A, 3B can comprise the rocket engine 1110, a set of the engines 171, 173, 175, 177 from FIGS. 3A, 3B can comprise the rocket engine 1110, or the like. The present disclosure is not limited in this regard.

Figure 12B:
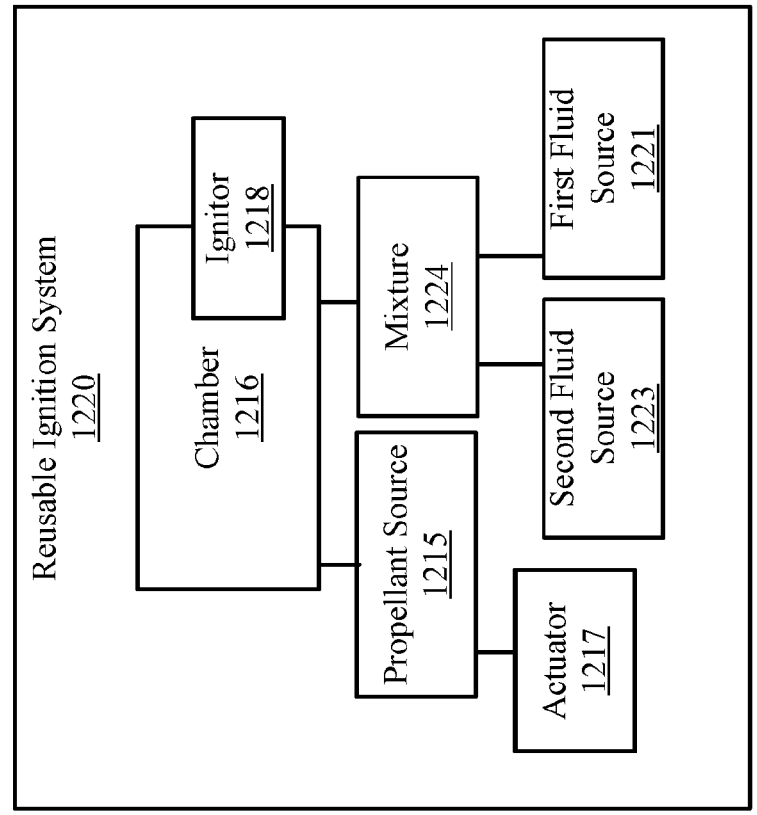
FIG. 12B illustrates a schematic view of a re-usable ignition system for a rocket engine of a vessel, in accordance with various embodiments.
Figure 12A:
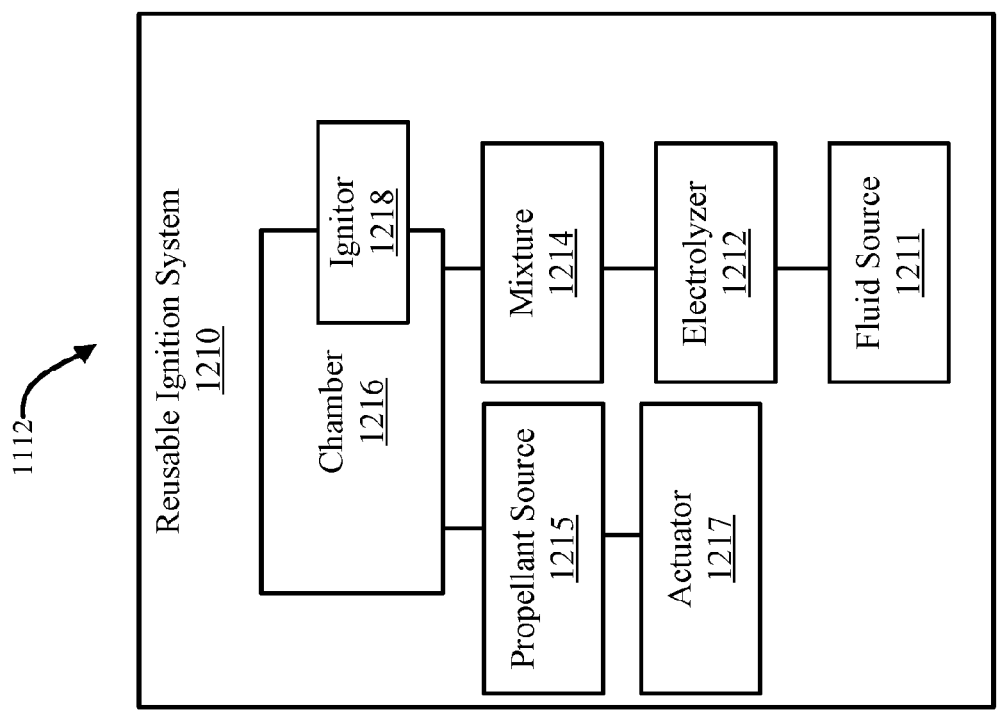
FIG. 12A illustrates a schematic view of a re-usable ignition system for a rocket engine of a vessel, in accordance with various embodiments.

Referring now to FIGS. 12A and 12B, re-usable ignition system 1112 with an electrolyzer 1212 (FIG. 12A) and without an electrolyzer (FIG. 12B) are illustrated, in accordance with various embodiments. In this regard, in contrast to a typical pyrotechnic igniter that ignites a rocket engine with a single spark and cannot be re-used, the re-usable ignition system 1210, 1220 is configured to be re-usable as described previously herein. For example, mixture 1214, 1224 is configured to be released into chamber 1216 of the rocket engine 1110 from FIG. 11. The mixture 1214 includes an oxidizer (e.g., oxygen) and a fuel (e.g., hydrogen). In various embodiments, an amount of the mixture 1214 released in the chamber is configured to ignite a solid propellant (e.g., released from a propellant source 1215), to fuel the rocket engine 1110 from FIG. 11, in accordance with various embodiments. In various embodiments, for the re-usable ignition system 1210, the fluid source 1211 can be water (e.g., seawater pulled from a body of water, such as the ocean, a lake, or the like). In this regard, the electrolyzer 1212 can electrolyze the water from the fluid source 1211 and form a hydrogen and oxygen mixture in mixture 1214, which is supplied to chamber 1216. Although described as pulling seawater, the present disclosure is not limited in this regard. For example, water can be stored in the fluid source 1211 and still be within the scope of this disclosure. In various embodiments, for the re-usable ignition system 1220, a first fluid source 1221 can comprise an oxidizer and a second fluid source 1223 can comprise a fuel.

In various embodiments, the propellant source 1215 comprises a propellant for the rocket engine 1110. In various embodiments, the propellant is a solid propellant. In this regard, based on a transport cycle (i.e., a time period that the vessel 200 will operate in a supercavitation mode), the controller 1101 may command and actuator 1217 to deposit a portion of the propellant from the propellant source 1215 corresponding to the time period. In this regard, in various embodiments, a decompression system 1114 of the rocket engine 1110 may be eliminated. Alternatively, in accordance with various embodiments, the re-usable ignition system 1112 may not include the propellant source 1215 and the actuator 1217, and a solid propellant can be disposed directly in chamber 1216. In this regard, the decompression system 1114 from FIG. 11 can be utilized to extinguish a burn of the propellant to stop the vessel 200 from traveling in a supercavitation mode, in accordance with various embodiments.

In various embodiments, the re-usable ignition system 1112 further comprises an ignitor 1218 (e.g., an electrode or any other re-usable type of ignitor). In this regard, upon releasing a fuel-oxidizer mixture into chamber 1216 from the mixture 1214, 1224 and igniting the fuel-oxidizer mixture by the ignitor 1218, a solid propellant disposed in chamber 1216 can be ignited. In various embodiments, the solid propellant can be any solid propellant known in the art. For example, the solid propellant can be a black powder propellent (i.e., charcoal, potassium nitrate, and/or sulfur), a zinc-sulfur propellant, a candy propellant (i.e., potassium nitrate, or another oxidizer, and a sugar fuel, such as dextrose, sorbitol, or sucrose), a double base propellent (e.g., nitroglycerin dissolve in a nitrocellulose gel and solidified with additives), a composite propellant (e.g., ammonium nitrate composite propellant (ANCP), ammonium perchlorate composite propellant (APCP), or the like), a high-energy composite propellant (e.g., a composite propellant with a high-energy explosive, such as hexogen or octogen), a composite modified double base propellant (e.g., a nitrocellulose/nitroglycerin double base/binder with a solid, such as ammonium perchlorate (AP) and powdered aluminum), or a smokeless propellant (e.g., $C_6H_6N_6(NO_2)_6$ CL-20 nitroamine).

Figure 12C:
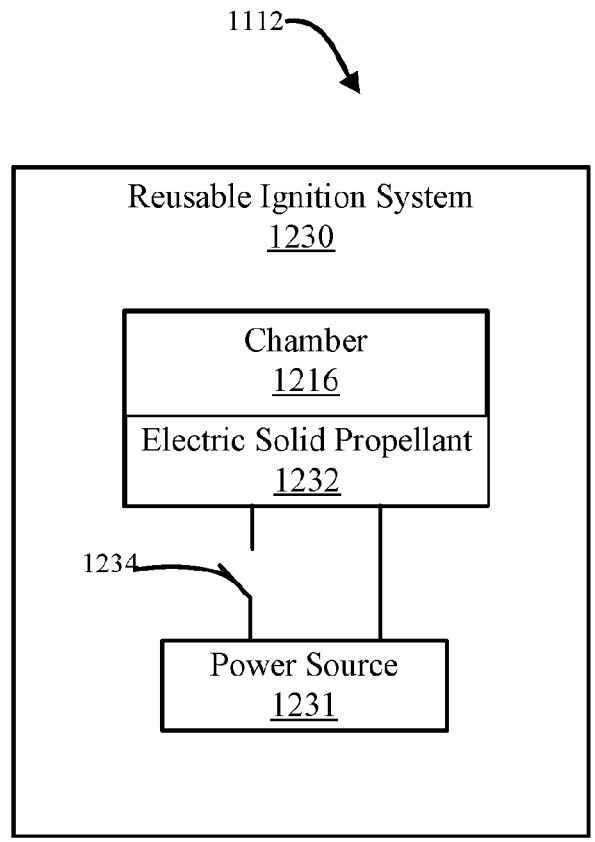
FIG. 12C illustrates a schematic view of a re-usable ignition system for a rocket engine of a vessel, in accordance with various embodiments.

Referring now to FIG. 12C, a re-usable ignition system 1112 with an electric solid propellant 1232 (i.e., re-usable ignition system 1230) is illustrated, in accordance with various embodiments. In various embodiments, the electric solid propellant includes plastisol. An electric solid propellant 1232, as described herein refers to a solid propellant that burns in response to being exposed to a current (e.g., by electrically coupling a power source 1231 to the solid propellant), and stops burning in response to the current being disconnected from the solid propellant (e.g., by electrically disconnecting the power source 1231). In various embodiments, the power source 1231 comprises an electric storage device, such as a battery or the like. In various embodiments, the controller 1101 of the control system 1100 from FIG. 11 can control whether a current is applied to the solid propellant by an electrical switch 1234, or the like. Although illustrated as an electrical switch 1234, any manner of controlling whether a current is applied to the electric solid propellant 1232 is within the scope of this disclosure. In various embodiments, an electric solid propellant can eliminate a decompression system 1114 from FIG. 11. In various embodiments, a decompression system 1114 may still be beneficial with the re-usable ignition system 1230 in case the vessel 200 as a redundant stopping mechanism, or the like.

Figure 13:
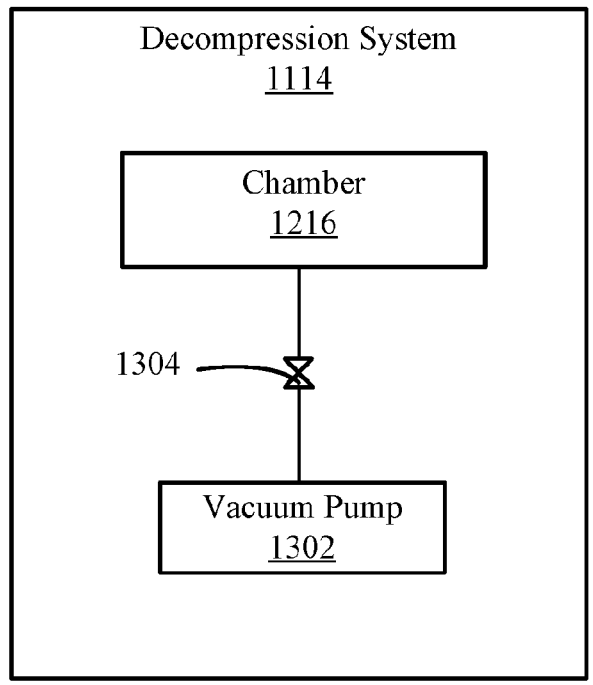
FIG. 13 illustrates a decompression system for a vessel of a gas turbine engine, in accordance with various embodiments.

Referring now to FIG. 13, a schematic view of a decompression system 1114 for a rocket engine 1110 from FIG. 11 is illustrated in accordance with various embodiments. The decompression system 1114 is configured to rapidly decompress chamber 1216 to stop burning of the solid propellant disposed therein. For example, the decompression system 1114 can comprise a vacuum pump 1302 configured to be in fluid communication with chamber 1216 (e.g., through a fluid conduit or the like), in accordance with various embodiments. In this regard, the controller 1101 from FIG. 11 can command an isolation valve 1304 to open in response to determining that the burning of the solid propellent in chamber 1216 is desired. Accordingly, the vacuum pump 1302 can rapidly decompress chamber 1116 and stop the burning, in accordance with various embodiments. In various embodiments, the vacuum pump can be configured to generate a high, ultra-high, or extremely high vacuum, in accordance with various embodiments. For example, the vacuum generated from vacuum pump 1302 can be about $10^{-3}$ mbar or lower.

In various embodiments, the vacuum pump 1302 can comprise a root pump, an adsorption pump, a vapor jet pump, a diffusion ejector pump, a turbo molecular pump, an ion sputter pump, or a cryo pump. The present disclosure is not limited in this regard.

Figure 14:
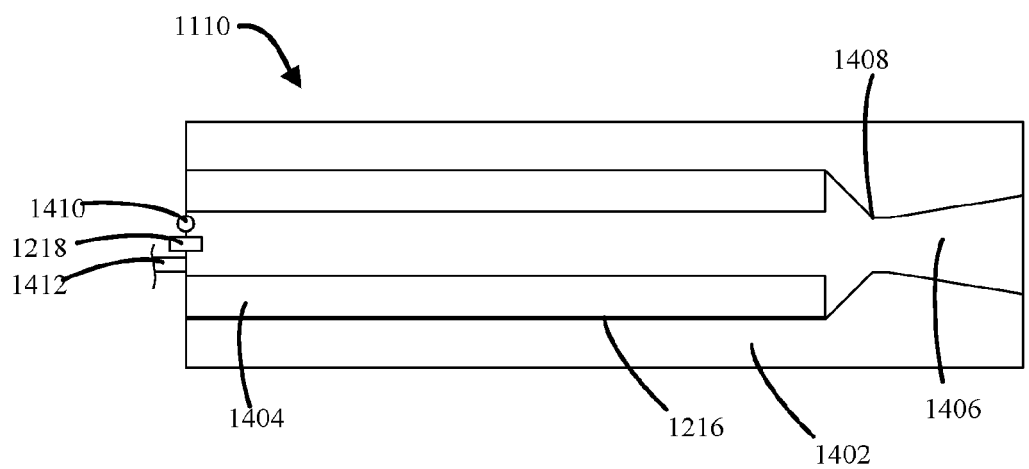
FIG. 14 illustrates a rocket engine for a vessel, in accordance with various embodiments.
Figure 15:
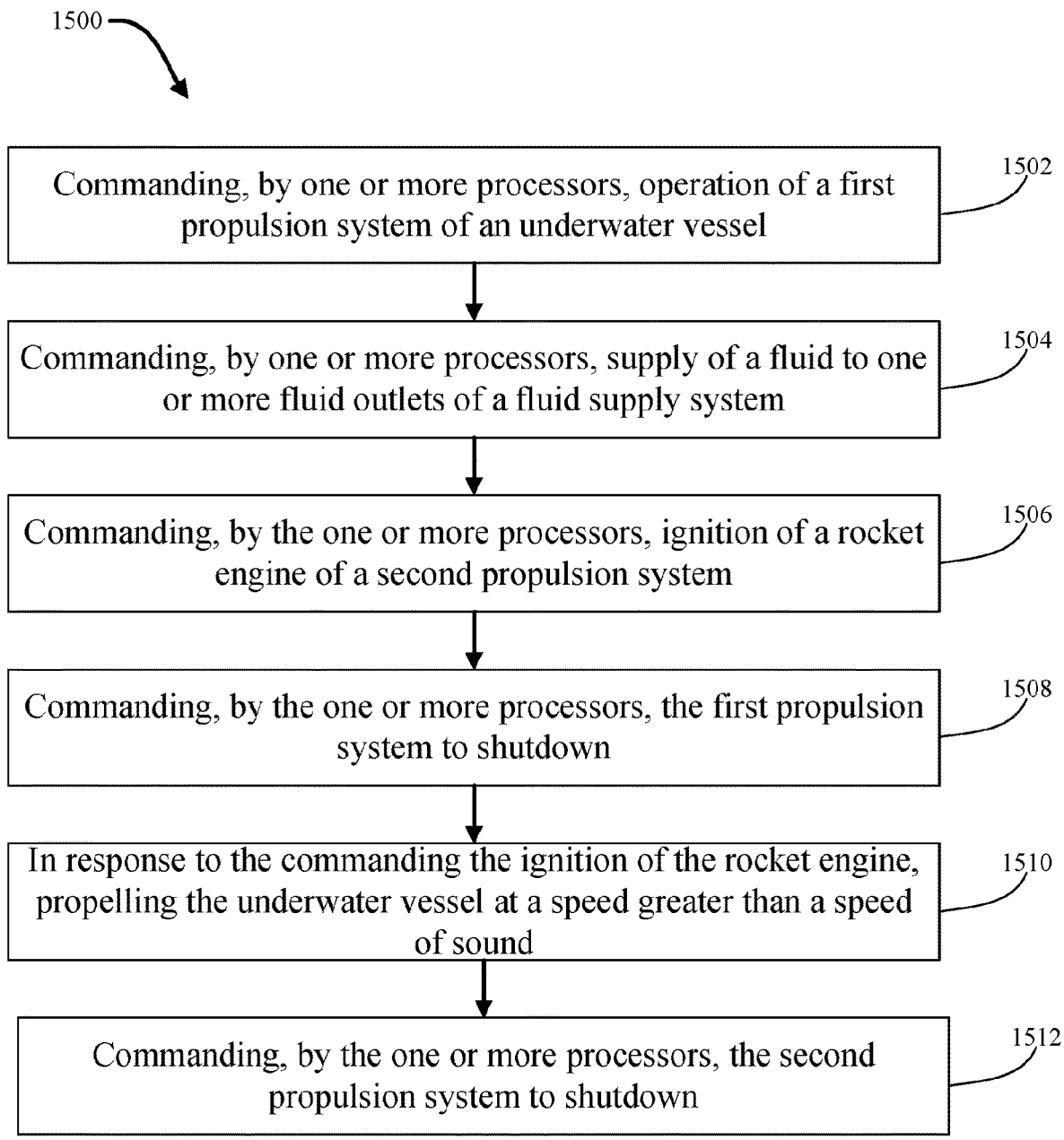
FIG. 15 illustrates a process flow for the control system of FIG. 11, in accordance with various embodiments.
Figure 16:
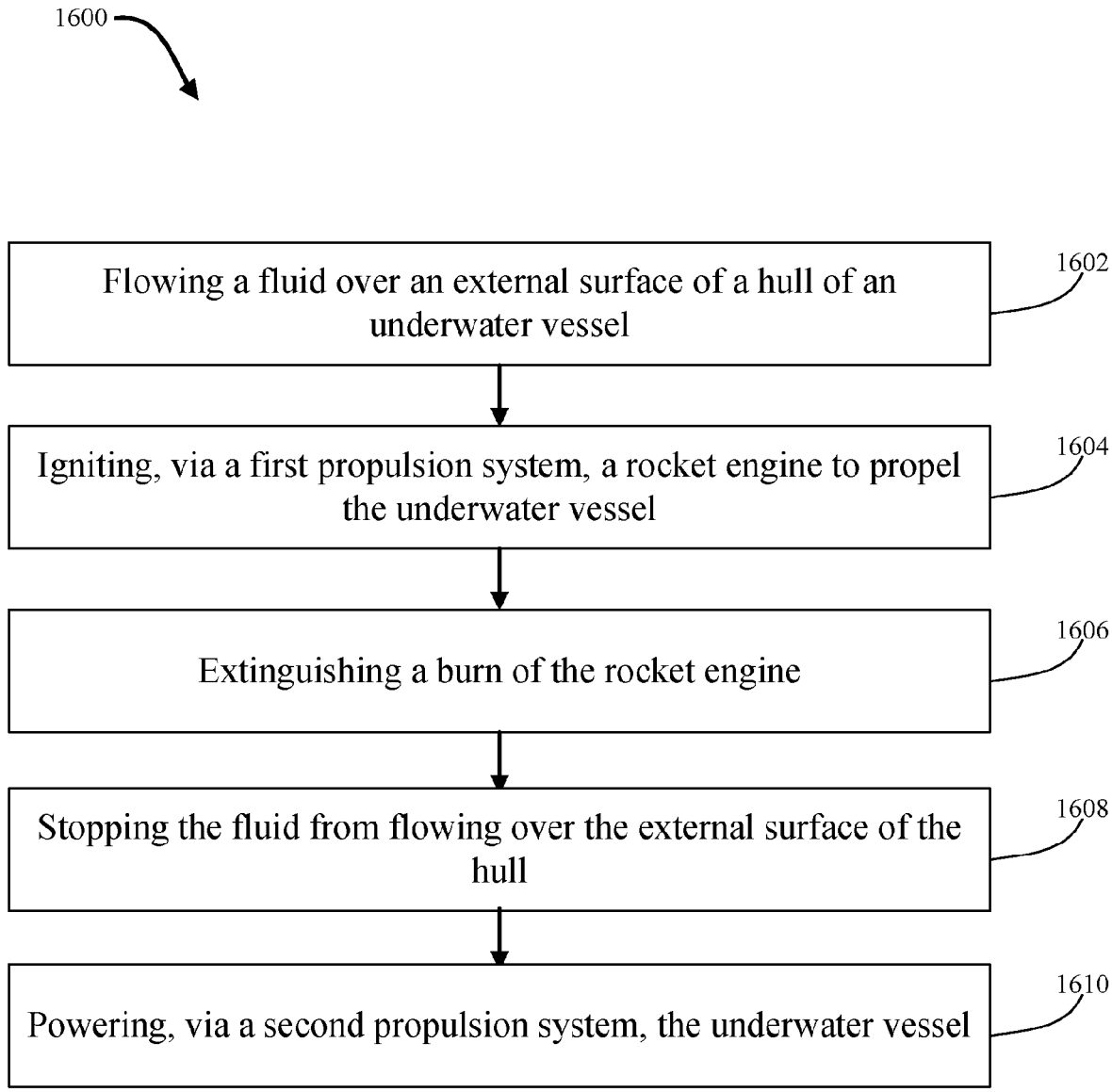
FIG. 16 illustrates a method of operating the vessel, in accordance with various embodiments.

Referring now to FIG. 14, rocket engine 1110 is illustrated, in accordance with various embodiments. The rocket engine 1110 comprises chamber 1216 (e.g., a combustion chamber) defined at least partially by an engine casing 1402, a solid propellant 1404 disposed in chamber 1216, and a nozzle 1406 disposed at an aft end of the engine casing 1402. The rocket engine 1110 comprises a convergent-divergent nozzle. Stated another way, a transition between the chamber 1216 and the nozzle 1406 includes a throat 1408 where gases produced in the chamber 1216 are choked, providing thrust as the flow of gases accelerate as a cross-sectional area increases in the nozzle 1406 aft of the throat 1408.

In various embodiments, the rocket engine 1110 comprises a fluid outlet 1410 and igniter 1218 from the re-usable ignition system 1112 from FIGS. 11 and 12A-B, and a fluid inlet 1412 of the decompression system 1114 from FIG. 13. The fluid outlet 1410 can be configured to output the mixture 1214 or mixture 1224 into chamber 1216. In various embodiments, the fluid outlet 1410, the igniter 1218 and the fluid inlet 1412 can be disposed at a forward end of the rocket engine 1110. However, the present disclosure is not limited in this regard. For example, the fluid outlet 1410, the igniter 1218, and/or the fluid inlet 1412 can be disposed outward from a centerline of the rocket engine 1110 and still be within the scope of this disclosure. In various embodiments, the propellant source 1215 can be deposited into chamber 1216 via actuator 1217 and aligns the propellant 1404 therein as shown in FIG. 14. In this regard, after the propellant 1404 is used, the vessel 200, can transition back to the propulsion system 132, re-load the propellant 1404 via the propellant source 1215 and the actuator 1217, and re-ignite a newly deposited propellant 1404 to re-start the propulsion system 234 with the rocket engine 1110, in accordance with various embodiments.

Referring now to FIGS. 2A, 2B, 3A, 3B, 7, 11-14, and 15 with like numerals depicting like elements, a process 1500 (FIG. 15) performed by the controller 1101 of the control system 1100 of the vessel 200 is illustrated, in accordance with various embodiments. In this regard, the controller 1101 can comprise an article of manufacture including a tangible, non-transitory computer-readable storage medium (e.g., one or more memories 1104) having instructions stored thereon for operating a vessel, in response to execution by one or more processors 1102, which causes the one or more processors 1102 to perform the operations of process 1500.

Figure 5A:
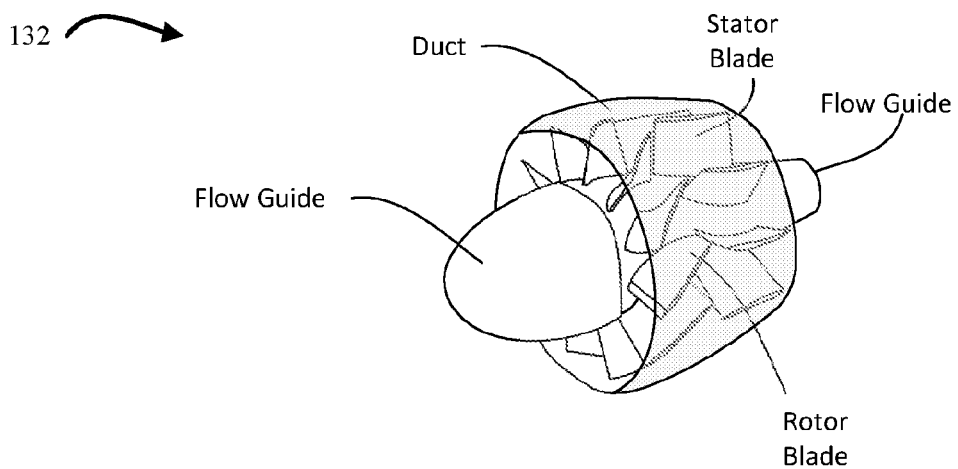
FIG. 5A illustrates a perspective view of a propulsion system of a hybrid propulsion system for a vessel, in accordance with various embodiments.
Figure 5B:
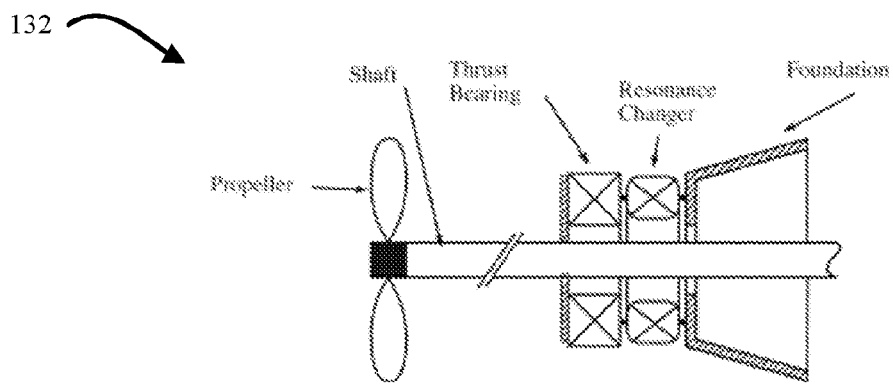
FIG. 5B illustrates a cross-sectional view of a propulsion system of a hybrid propulsion system for a vessel, in accordance with various embodiments.
Figure 5C:
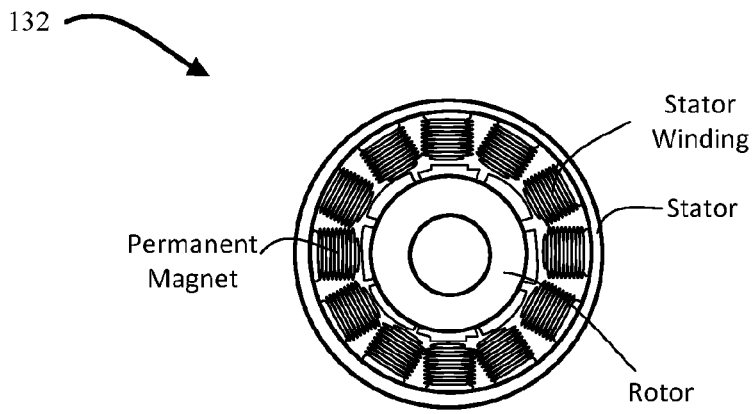
FIG. 5C illustrates a front view of a propulsion system of a hybrid propulsion system for a vessel, in accordance with various embodiments.

In various embodiments, process 1500 comprises commanding, by the one or more processors 1102, a propulsion system 132 to propel the vessel 200 (step 1502). In this regard, the one or more processors 1102 can command a shaft of a propellor, or a rotor, of the propulsion system 132 (e.g., as shown in FIGS. 5A-C) to begin rotating. In response to commanding rotation of the propeller or the rotor, propulsion system 132 propels the vessel 200 in a manner typical of underwater vessels. In this regard, step 1502 of process 1500 can be performed for short precise periods of a respective cargo transport cycle (e.g., prior to docking, traveling through tight, or shallow areas, or the like). The present disclosure is not limited in this regard.

In various embodiments, method 1500 further comprises commanding, by one or more processors 1102, supply of a fluid to one or more fluid outlets 146 of a fluid supply system 140, 740 (step 1504). For example, for fluid supply system 140, the one or more processors 1102 can command the valve 144 to at least partially open. In response to at least partially opening the valve 144, the fluid is released from the one or more fluid outlets 146 and directed along a contour of an external surface 112 of the main body 118 of the hull 110. For the fluid supply system 740 from FIG. 7A, the one or more processors 1102 can command the rotor 744 to rotate to a set speed (or within a range of speeds). In response to the rotor 744 rotating, air can be pulled from the external environment 198 through an inlet 741 of the nacelle 742, through the one or more fluid conduits 745, and out the one or more fluid outlets 146 to supply a boundary layer flow over the external surface 112 of the main body 118 of the hull 110. As described previously herein, by flowing the fluid over the external surface 112 of the main body 118 of the hull 110, a skin friction drag of the vessel 200 is greatly reduced relative to the vessel 200 without the fluid flowing over the external surface 112 of the main body 118 of the hull 110. In this regard, with greatly reduced drag, a thrust necessary to propel the vessel 200 to a certain speed (e.g., 1,000 mph) is greatly reduced. Stated another way, since drag is directly proportional to density of the fluid the vessel 200 is traveling through, by significantly reducing the density of that fluid, the drag is significantly reduced. Although illustrated as including step 1504, the present disclosure is not limited in this regard. For example, the second propulsion system 234 could be operated without the use of fluid supply system 140, 740 and would still be within the scope of this disclosure.

In various embodiments, the process 1500 further comprises commanding, by the one or more processors 1102, an ignition of a rocket engine 1110 of a second propulsion system 234 (step 906). In various embodiments, the one or more processors 1102 commands a fuel-oxidizer mixture (e.g., mixture 1214 of re-usable ignition system 1210 or mixture 1224 of re-usable ignition system 1220) to release into a chamber 1216 of the rocket engine 1110 (e.g., a combustion chamber), and the one or more processors 1102 commands an ignitor (e.g., ignitor 1218) to generate a spark as described previously herein. In response to the release of the mixture and the spark, a solid propellant disposed in chamber 1216 is ignited and begins to burn. In response to the burning of the solid propellant, hot gases are generated and exhausted through nozzle 1406 of the rocket engine 1110 to propel the vessel 200 in the supercavitation mode described previously herein. Although described as using a re-usable ignition system that utilizes a fuel-oxidizer mixture and ignitor, the present disclosure is not limited in this regard. For example, the one or more processors 1102 can command a re-usable ignition system 1230 to electrically couple a power source 1231 to an electric solid propellant 1232 (e.g., through an electrical switch 1234 or the like) to ignite the rocket engine 1110. In this regard, with the electric solid-propellant 1232, a de-compression system 1114 could potentially be eliminated, in accordance with various embodiments.

In various embodiments, process 1500 further comprises commanding, by the one or more processors 1102, the propulsion system 132 to shutdown (step 1508). In this regard, once vessel 200 is travelling with a supercavitation flow pattern (as shown in FIG. 1B), and/or the second propulsion system 234 is being utilized, the propulsion system 132 can be shutdown. In various embodiments, the propulsion system 132 can be shut down near simultaneously with step 1506. Stated another way, the use of propulsion system 132 may provide little to no additional propulsion once the propulsion system 234 with one or more of the rocket engine 1110 is in use.

In various embodiments, in response to the commanding of the ignition of the rocket engine 1110, the vessel 200 is propelled at a speed greater than the speed of sound (i.e., 767 mph (343 m/s) at sea level) (step 1510). Although described herein as traveling at a speed greater than the speed of sound in the supercavitation mode, the present disclosure is not limited in this regard. For example, vessel 200 can include a rocket engine 1110 that is sized and configured to propel the vessel 200 at speeds less than the speed of sound and still be within the scope of this disclosure. In various embodiments, the vessel 200 can be configured to travel at speeds greater than Mach 3 (i.e., three times the speed of sound), or greater than Mach 5 (i.e., 5 times the speed of sound).

In various embodiments, the commanding the ignition of the rocket engine 1110 comprises commanding a release of a mixture (e.g., from mixture 1214 or mixture 1224) of a fuel and oxidizer (e.g., hydrogen and oxygen) into a chamber 1216 of the rocket engine 1110 (e.g., a combustion chamber), and commanding ignition of the mixture. In various embodiments, the commanding the ignition of the mixture comprises commanding an igniter 1218 (e.g., an electrode or the like) to generate a spark. In response to the spark being generated with the mixture disposed in the chamber 1216 of the rocket engine 1110, the mixture from mixture 1214 or mixture 1224 ignites, and in response to the ignition of the mixture, a solid propellant, such as solid propellant 1404 of FIG. 14 ignites. Accordingly, the solid propellant 1404 burns creating combustible gases that are exhausted through the nozzle 1406 of the rocket engine 1110 to propel the vessel 100.

In various embodiments, the process 1500 further comprises commanding, by the one or more processors 1102, the propulsion system 234 to shutdown (step 1512). In this regard, once it is desirable to switch back to operation of the vessel 200 with the propulsion system 132, the propulsion system 234 can be shut down, and the first propulsion system can be re-started (e.g., in accordance with step 1502 of process 1500). In various embodiments, the propulsion system 234 can be shut down by a decompression system 1114 of a rocket engine 1110, by a re-usable ignition system 1230 of a rocket engine 1110 (e.g., by disconnecting an electrical circuit with an electrical switch 534), or the like. The present disclosure is not limited in this regard.

Referring now to FIGS. 2A, 2B, 3A, 3B, 7, 11-14, and 16, a method 1600 (FIG. 16) of operating vessel 200 is illustrated, in accordance with various embodiments. The method 1600 comprises flowing a fluid (e.g., from pressure vessel 142 for fluid supply system 140 or from an external environment 198 for fluid supply system 740) over an external surface 112 of a main body 118 of a hull 110 of the vessel 100 (step 1602). In various embodiments, the fluid can have a density significantly less than the density of water as described previously herein. In this regard, the fluid can greatly reduce skin friction drag on the vessel 200. In various embodiments, the fluid comprises at least one of air, oxygen gas, chlorine gas, hydrogen gas, and helium gas.

In various embodiments, the method 1600 further comprises igniting, by a propulsion system 234, a rocket engine 1110 to propel the vessel 200 (step 1604). The propulsion system 234 can be ignited by the re-usable ignition system 1210, 1220, or 1230. The present disclosure is not limited in this regard. In various embodiments, igniting the rocket engine 1110 comprises electrolyzing water (e.g., by electrolyzer 1212 of re-usable ignition system 1210) to form a hydrogen and oxygen mixture and generating a spark (e.g., by ignitor 1218) to ignite the mixture (e.g., mixture 1214).

In various embodiments, method 1600 further comprises extinguishing a burn of the rocket engine 1110 (step 1606). In various embodiments, the burn of the rocket engine 1110 can be extinguished by a decompression system 1114 or by the re-usable ignition system 1230 as described previously herein. The present disclosure is not limited in this regard. The burn of the rocket engine 1110 may be extinguished in response to a control system 1100 determining it is desirable to switch between the propulsion system 234 and a propulsion system 132 (i.e., for slower more precise travel). In various embodiments, the spark is generated from an electrode of ignitor 1218.

In various embodiments, method 1600 further comprises stopping the fluid from flowing over the external surface 112 of the main body 118 of the hull 110 (step 1608). In this regard, a supercavitation flow pattern (as shown in FIG. 2B) may be stopped to transition into a default operational mode (i.e., with the propulsion system 132).

In various embodiments, the method 1600 further comprises powering, via the propulsion system 132, the vessel 200 (step 1610). In this regard, after travelling in a supercavitation mode with the propulsion system 234, the vessel 200 is configured to transition to a default mode with the propulsion system 132 to travel at slower speeds to navigate a port, shallow water, or the like.

Figure 17:
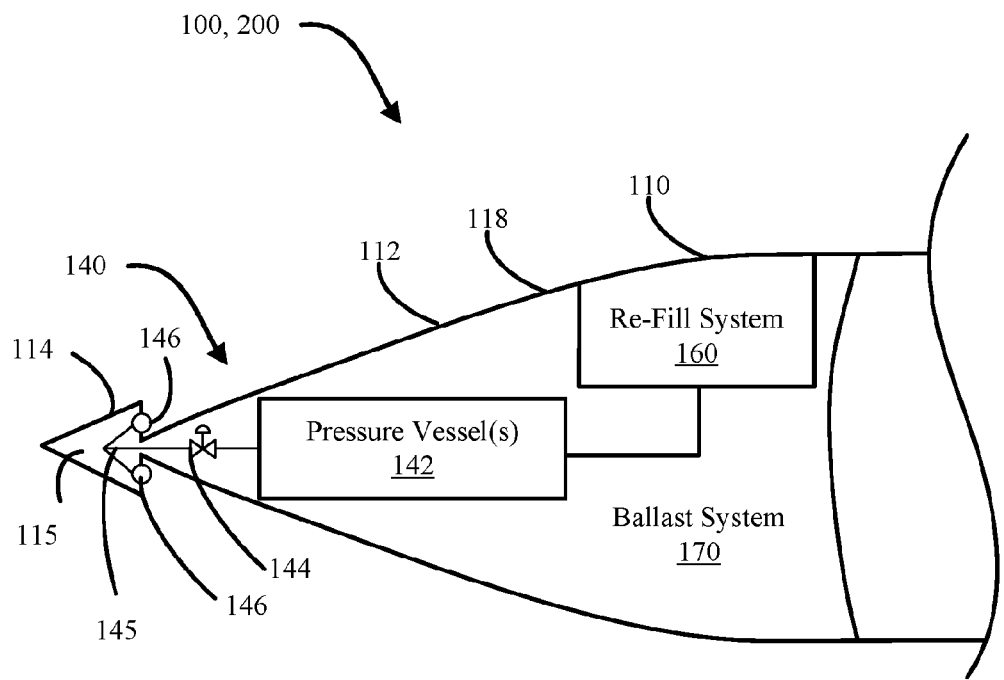
FIG. 17 illustrates a schematic view of a portion of a vessel with a re-fill system, in accordance with various embodiments.

Referring now to FIG. 17, a schematic view of the vessel 100, 200 from FIGS. 1A, 1B, 2A, 2B, 3A, 3B with a re-fill system 160 is illustrated, in accordance with various embodiments. Although illustrated as including a re-fill system 160 in FIG. 17, the present disclosure is not limited in this regard, and various embodiments without the re-fill system 160 are included within this disclosure.

In various embodiments, the propulsion system 132 of vessel 100, 200 can be utilized at various times during a respective trip cycle, including during re-filling of the fluid supply system 140. For example, in response to the fluid supply system 140 being empty, or near empty, the vessel 100, 200 can transition from the propulsion system 134, 234 to the propulsion system 132 (or shut off all propulsion systems and rely solely on the ballast system 170) and re-fill the fluid supply system 140 by utilizing the re-fill system 160. Accordingly, the size for each of the one or more pressure vessels 142 may be greatly reduced compared to sizing the each of the one or more pressure vessels based on an estimated maximum trip length.

In various embodiments, the fluid supply system 140 disclosed herein comprises the one or more pressure vessels 142 and the re-fill system 160. The re-fill system 160 is configured to re-fill one or more pressure vessels 142. For example, for a respective long trip cycle (e.g., a trip cycle of over 5,000 miles), the one or more pressure vessels 142 can run out of the fluid used for the fluid supply system 140 (i.e., the pressure vessel can transition to an empty, or near empty state). Stated another way, a total volume of the fluid in the fluid supply system 140 can fall below a threshold volume to operate the vessel 100, 200 with a supercavitation flow pattern. A "threshold volume" as referred to herein, can be a volume of fluid that allows the vessel to travel in the supercavitation mode for a minute, or for five minutes, or for fifteen minutes. The present disclosure is not limited in this regard.

In various embodiments, for the fluid supply system 140 having the re-fill system 160, the fluid disposed within the one or more pressure vessels 142 can be an oxidizer (e.g., air, oxygen gas, chlorine gas for vessel 100, 200 from FIGS. 1A, 1B, 2A, 2B), a fuel (e.g., hydrogen gas, ammonia gas, methane gas for vessel 100 from FIGS. 1A, 1B), an inert gas (e.g., helium for vessel 200 from FIG. 2A, 2B), or a combination of an oxidizer in a first set of the one or more pressure vessels 142 and a fuel in a second set of the one or more pressure vessels 142 (e.g., for vessel 100 from FIGS. 1A, 1B). In various embodiments, use of an inert gas, such as helium, could be beneficial due to helium's density is seven times less than air. However, oxidizers, such as air are significantly more abundant, making an oxidizer a more practical fluid for the pressure vessel 142, in accordance with various embodiments. In various embodiments the re-fill system 160 disclosed herein can be utilized in combination with any fluid. However, the re-fill system 160 in combination with pulling air from an external environment facilitates easy and consistent re-filling of the fluid supply system 140 at any point along a transport cycle for the vessel 100, in accordance with various embodiments.

In various embodiments, when vessel 100, 200 includes the re-fill system 160, the fluid of the fluid supply system 140 comprises air. Although described herein as comprising air, the present disclosure is not limited in this regard. For example, any fluid with a density less than water is within the scope of this disclosure. In such a configuration where air is not the fluid disposed in the fluid supply system, the re-fill system 160 can be re-filled by attaching to an external fluid supply (e.g., a helium gas fluid supply, a hydrogen gas fluid supply, or the like). Yet, the abundance of air, and ease of utilizing the re-fill system disclosed herein with air to re-fill a fluid supply system 140 of a vessel 100, 200 can facilitate underwater cargo transport in accordance with this disclosure.

In various embodiments, by having a re-fill system as described herein, the size of the fluid supply system 140 can be greatly reduced. For example, if the pressure vessels were to be sized for the longest potential trip (e.g., 8,000 to 10,000 miles), the one or more pressure vessels could utilize a significant amount of the volume of vessel 100, 200. Yet, with a re-fill system 160 as disclosed herein, the fluid supply system 140 can be configured to travel shorter distances with a supercavitation flow pattern, transition to a normal operating mode to re-fill the fluid supply system 140, and then transition back to the supercavitation mode once the fluid supply system 140 is re-filled.

Figure 18:
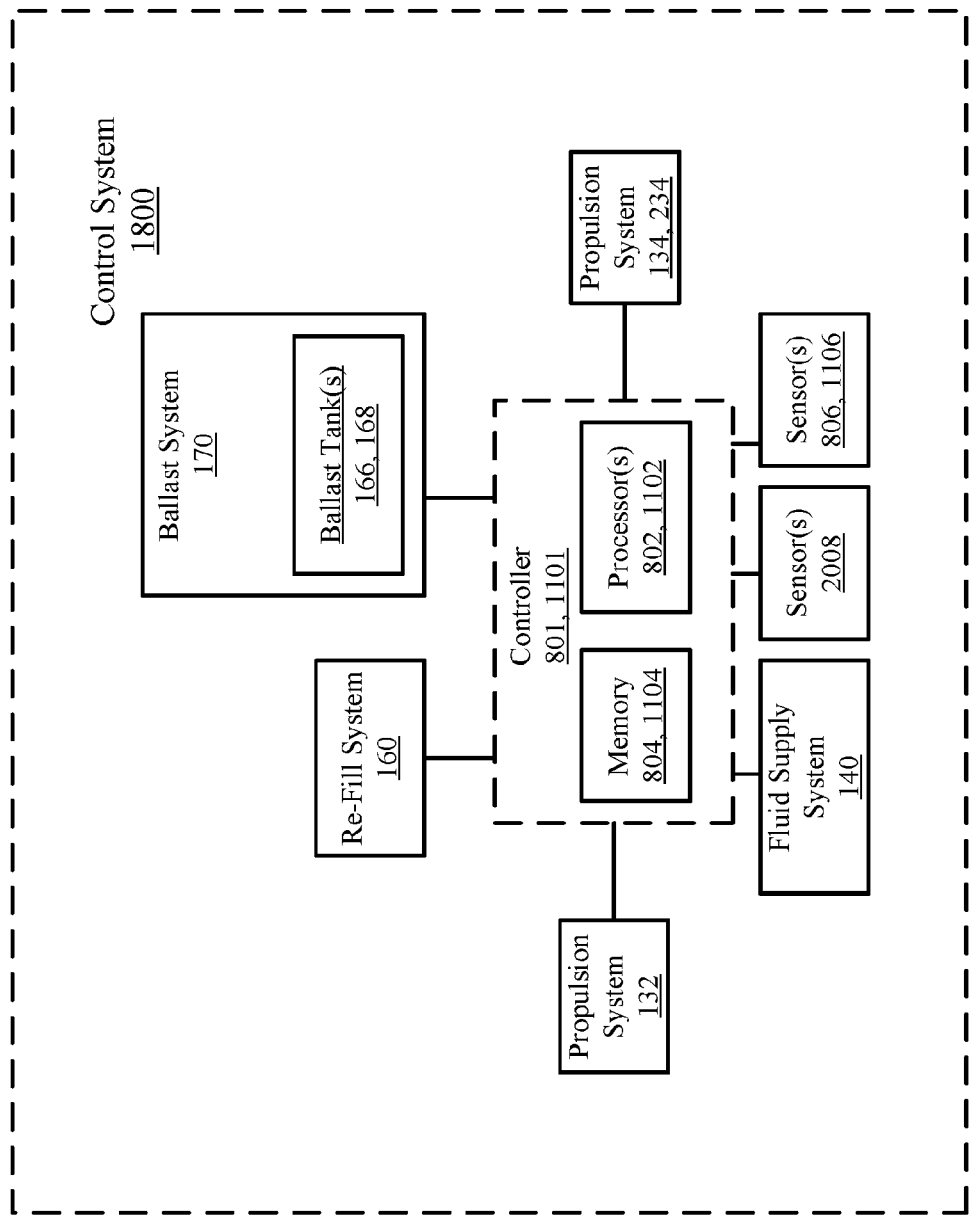
FIG. 18 illustrates a schematic view of a control system for a vessel, in accordance with various embodiments.

Referring now to FIG. 18, a control system 1800 for the vessel 100, 200 with the re-fill system 160 from FIG. 17 is illustrated, with like numerals depicting like elements, in accordance with the various embodiments. Control system 1800 includes a controller 801, 1101 in electronic communication with the fluid supply system 140 (e.g., valve 144 and/or valve 152 from FIG. 1A, valve 144 from FIG. 2A, or the like), propulsion system 132, propulsion system 134, 234, the one or more sensors 806, 1106 (e.g., configured to provide data related to the boundary layer 164 over the external surface 112 of the main body 118 of the hull), and one or more sensors 2008 (e.g., configured to provide data related to a fill level of each of the one or more pressure vessels 142 of the fluid supply system). In various embodiments, the control system 1800 further comprises the re-fill system 160 in electronic communication with the controller 801, 1101. In this regard, the controller 801, 1101 is configured to communicate electronically with the re-fill system 160 to determine a total pressure of the fluid supply system 140, determine whether the fluid supply system 140 should be re-filled, and to re-fill the fluid supply system 140 by utilizing the re-fill system 160, as described further herein.

As described previously herein, the ballast system 170 can comprise one or more ballast tanks 166, 168. In this regard, as shown in FIGS. 1A, 1B, 2A, and 2B, the one or more ballast tanks 166, 168 of the vessel 100, 200 can be disposed in the hull 110 external from the pressure hull 117. Although illustrated as including a forward ballast tank and an aft ballast tank, the present disclosure is not limited in this regard. For example, any arrangement of ballast tanks known in the underwater vessel arts is within the scope of this disclosure.

Figure 19:
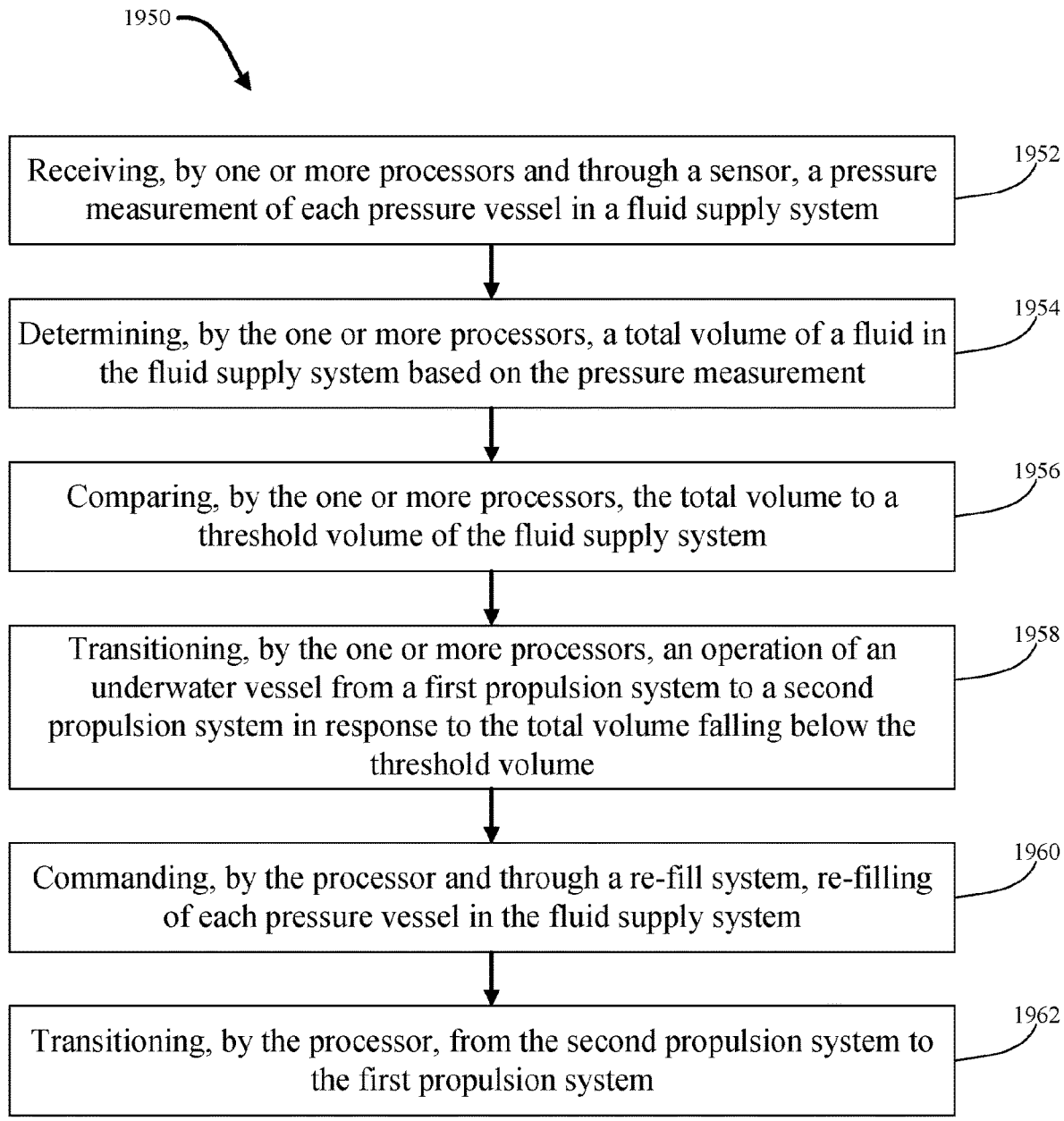
FIG. 19 illustrates a process performed by the control system of FIG. 18, in accordance with various embodiments.
Figure 20A:
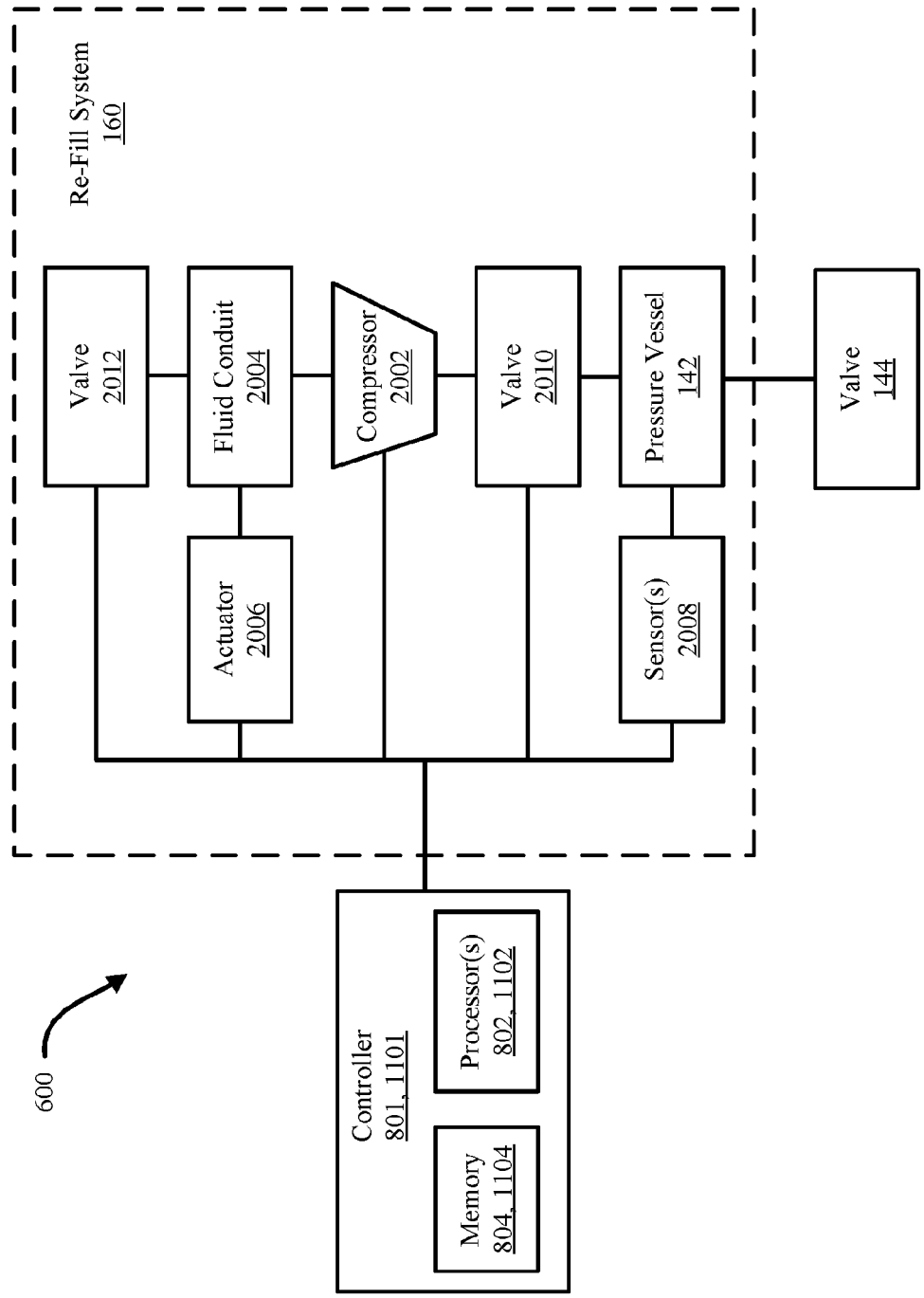
FIG. 20A illustrates a schematic view of a portion of a control system for a vessel, in accordance with various embodiments.
Figure 20B:
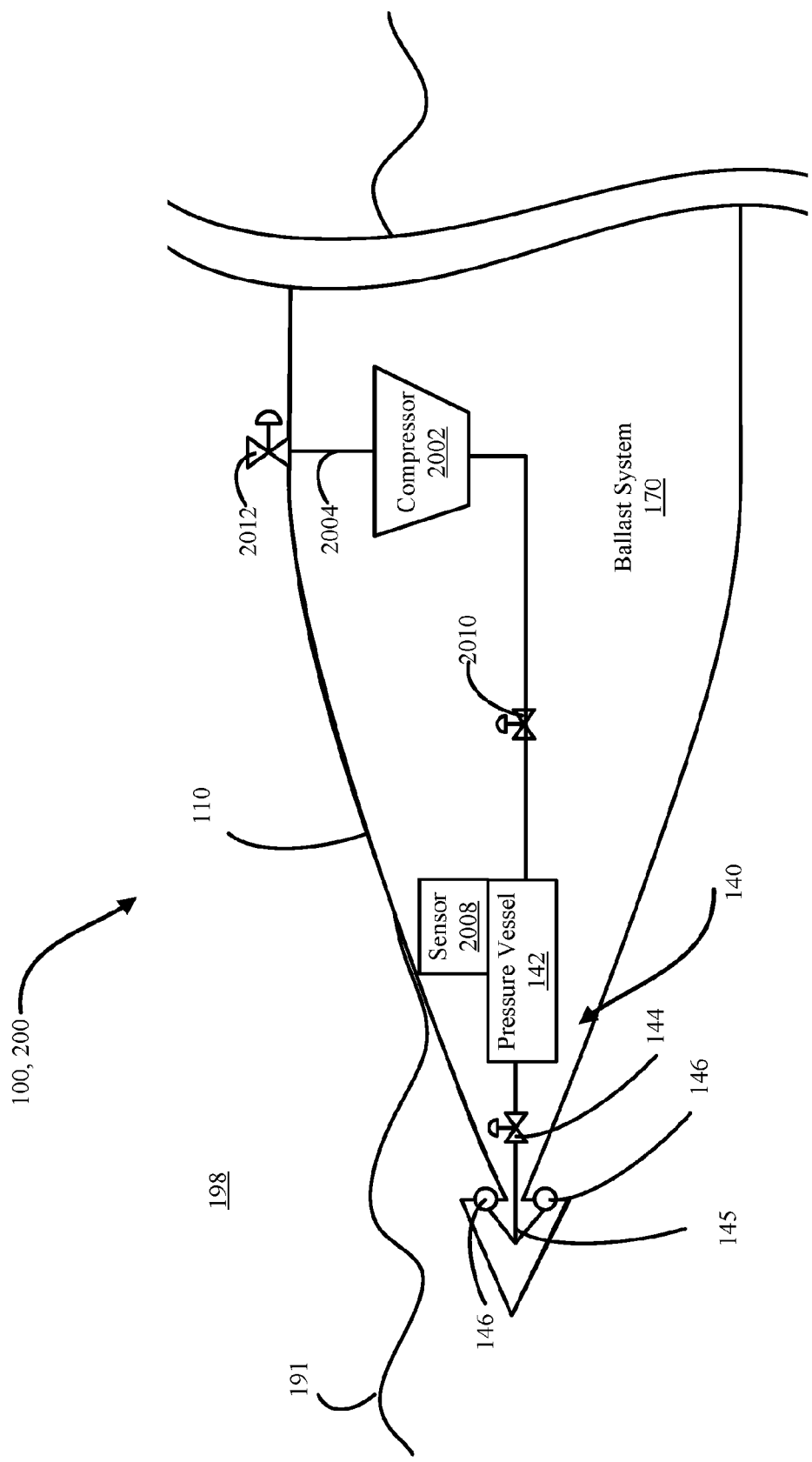
FIG. 20B illustrates a schematic view of a vessel utilizing the control system of FIG. 18, in accordance with various embodiments.
Figure 20C:
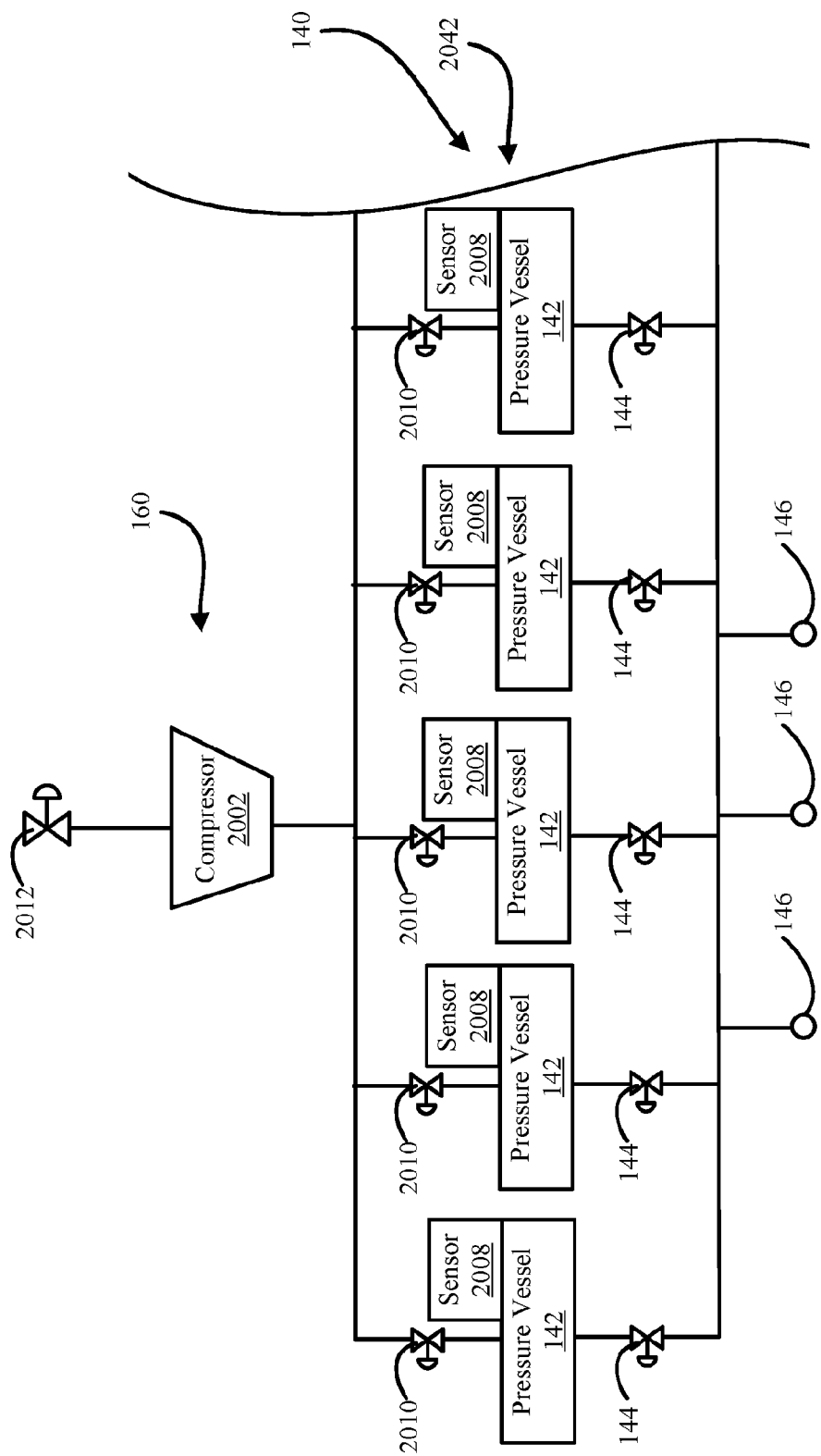
FIG. 20C illustrates a schematic view of a portion of a re-fill system and a fluid supply system, in accordance with various embodiments.
Figure 20D:
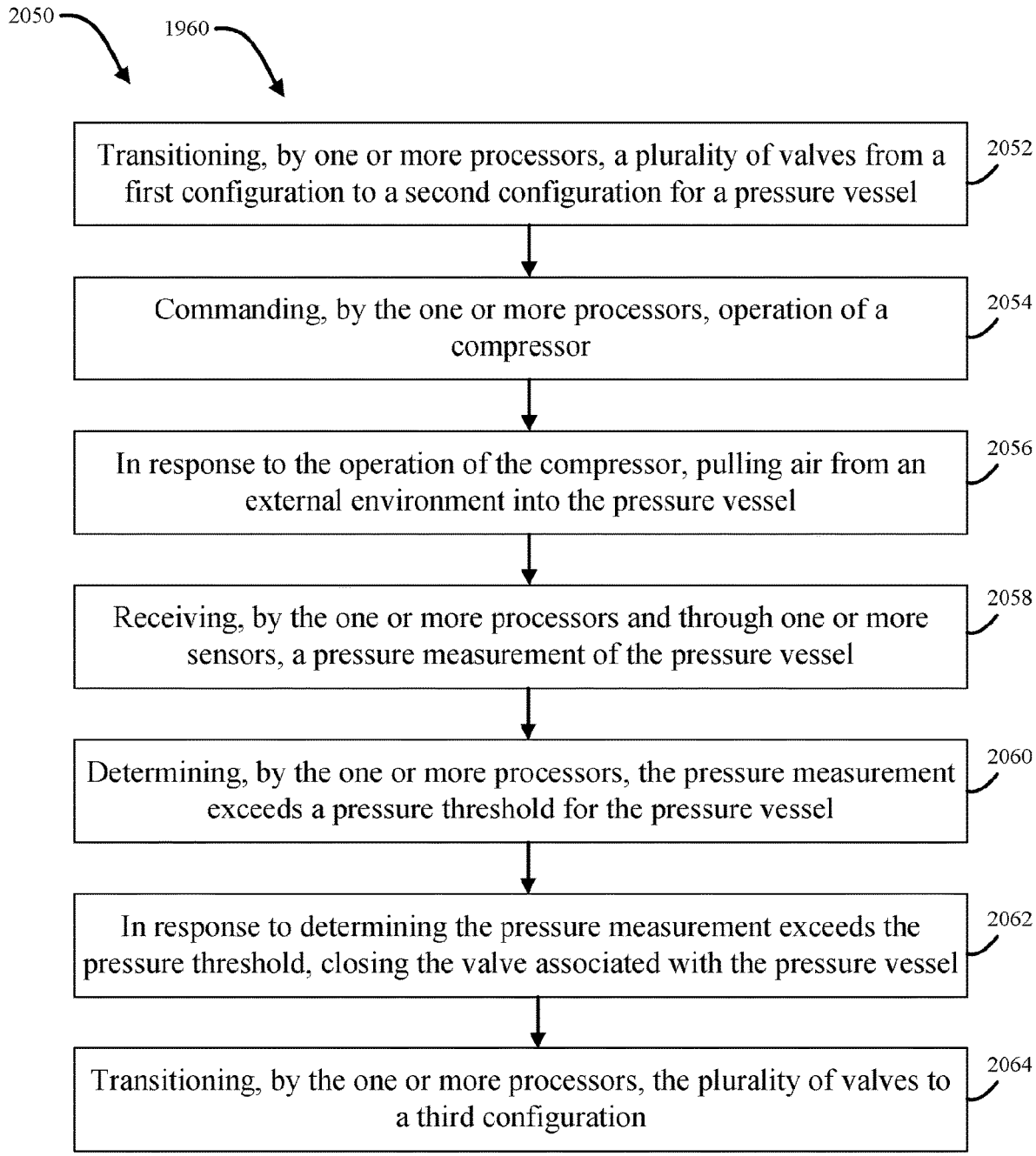
FIG. 20D illustrates a process for refilling a fluid supply system of a vessel, in accordance with various embodiments.

Referring now to FIGS. 18 and 19, a process 1950 (FIG. 19) for re-filling the fluid supply system 140 with the re-fill system 160 performed by the control system 1800 from FIG. 18 is illustrated, in accordance with various embodiments. Process 1950 comprises receiving, by one or more pressure vessels 142 and through a sensor (e.g., one or more sensors 2008), such as a pressure sensor configured to measure a pressure within a cavity defined by each of the one or more pressure vessels 142 as shown in FIGS. 20A-C and described further herein), a pressure measurement of each of the one or more pressure vessels 142 in a fluid supply system 140 (step 1952). Although the one or more pressure vessels 142 is illustrated previously herein with a single pressure vessel, the present disclosure is not limited in this regard. For example, as shown in FIG. 20C, the one or more pressure vessels 142 of the fluid supply system 140 can comprise a plurality of pressure vessels 2042. In this regard, by having a plurality of pressure vessel 2042, the fluid supply system 140 can utilize standard pressure vessels for each of the plurality of pressure vessels 2042, providing a level of redundancy, and/or facilitating easier and quicker maintenance, in accordance with various embodiments.

In various embodiments, by having a plurality of pressure vessels 2042 as shown in FIG. 20C, each of the one or more pressure vessels 142 can include a valve 2010 disposed fluidly upstream of the pressure vessel 142 and a valve 144 disposed fluidly downstream of the pressure vessel 142. In this regard, each of the one or more pressure vessels 142 can be fluidly isolated from an adjacent of the one or more pressure vessels 142, in accordance with various embodiments, as described further herein. Similarly, each of the one or more sensors 2008 (e.g., a pressure sensor) can be operably coupled to a cavity defined by each of the one or more pressure vessels 142 to provide pressure data to the controller 801, 1101 from FIG. 18 as described in step 1952.

In various embodiments, process 1950 further comprises determining, by the one or more processors 802, 1102, a total volume of a fluid (e.g., air) in the fluid supply system 140 based on pressure data from each of the one or more pressure vessels 142 in the fluid supply system 140 (step 1954). Stated, another way, a total volume of the fluid at an ambient pressure (e.g., a pressure at fluid outlets 146 of fluid supply system 140 from FIGS. 1A, 1B, 2A, 2B during operation of the vessel 100, 200), can be calculated by Boyle's law (i.e., when temperature is constant, $P_1V_1=P_2V_2$), where $P_1$ is pressure in the pressure vessel 142, $V_1$ is volume in the pressure vessel, $P_2$ is ambient pressure, and $V_2$ is solved for by the controller 801, 1101. In other words, a volume ($V_2$) of the fluid in each of the one or more pressure vessels 142 at an ambient pressure can be solved by Boyle's law as described above. This calculation can be performed for each of the one or more pressure vessels 142 in the fluid supply system 140 to determine the total volume of the fluid in the fluid supply system 140. Although described herein as the one or more pressure vessels 142 calculating the volume ($V_2$) of the fluid at an ambient pressure, the present disclosure is not limited in this regard. For example, the one or more processors 802, 1102, can use the pressure data directly and compare to a total pressure threshold, where the total pressure threshold is based on the volume ($V_2$), and still be within the scope of this disclosure. Stated another way, any parameter for determining a fluid supply system 140 is empty (or near empty) with respect to a fluid is within the scope of this disclosure.

In various embodiments, process 1950 further comprises comparing, by the one or more processors 802, 1102, the total volume to a threshold volume of the fluid supply system 140 (step 1956). In various embodiments, the threshold volume of the fluid supply system 140 can be less than or equal to 5% of the total volume, less than or equal to 2% of the total volume, less than or equal to 1% of the total volume, equal to 0% of the total volume, or the like. The threshold volume can be pre-determined (i.e., selected or set) based on numerous factors, including whether keeping a small portion of the fluid supply system 140 filled prior to re-filling is desirable.

In various embodiments, the process 1950 further comprises transitioning, by the one or more processors 802, 1102, an operation of a vessel 100, 200 from a first propulsion system (e.g., propulsion system 134, 234) to a second propulsion system (e.g., propulsion system 132) in response to the total volume falling below the threshold volume (step 1958). In this regard, since one or more processors 802, 1102 determined that the total volume of the fluid supply system 140 is empty (or near empty), the one or more processors 802, 1102 can transition to the second propulsion system (e.g., propulsion system 132) that does not utilize the fluid supply system 140 to begin a process of re-filling the fluid supply system 140 as described further herein.

In various embodiments, the process 1950 further comprises commanding, by the one or more processors 802, 1102 and through the re-fill system 160, re-filling each of the one or more pressure vessels 142 in the fluid supply system 140 (step 1960). In various embodiments, prior to re-filling in accordance with step 1960, the vessel 100, 200 can surface (i.e., a portion of the vessel 100, 200 can be above a water surface as shown in FIG. 20B) and described further herein. In this regard, air from an external environment (e.g., the atmosphere) can be pulled, by the re-fill system 160, into the vessel 100, 200 to re-fill each of the one or more pressure vessels 142 in the fluid supply system 140. Although described herein as surfacing the vessel 100, 200 prior to re-filling the fluid supply system 140, the present disclosure is not limited in this regard. For example, a fluid conduit (e.g., fluid conduit 2004 from FIGS. 20A-C) can be extended above the surface of the water (e.g., by an actuator 2006 from FIGS. 20A-C), then a valve (e.g., valve 2012 from FIGS. 20A-C) can be opened, and the re-fill system 160 can be operated as described herein, and still be within the scope of this disclosure. However, by surfacing the vessel 100, 200, the re-fill system 160 can include fewer components, reducing weight and cost of the re-fill system 160, in accordance with various embodiments.

In various embodiments, the actuator 2006 can be any type of actuator (i.e., a linear actuator, a rotary actuator, a hydraulic actuator, a pneumatic actuator, an electric actuator, a thermal and magnetic actuator, a mechanical actuator, a supercoiled polymer actuator, or the like). The present disclosure is not limited in this regard.

In various embodiments, after the fluid supply system 140 is re-filled in accordance with step 1960, the process 1950 further comprises transitioning, by the one or more processors 802, 1102, from the second propulsion system (e.g., propulsion system 132) to the first propulsion system (e.g., propulsion system 134, 234) (step 1962). In this regard, the vessel 100, 200 can transition back to the propulsion system 134, 234 to travel at high speeds in a supercavitation mode as described previously herein to facilitate a significantly faster transit times relative to typical cargo systems that travel between ports, in accordance with various embodiments.

Referring now to FIGS. 20A and 20B, a schematic view (FIG. 20A) and a schematic operational view (FIG. 20B) of the re-fill system 160 for the fluid supply system 140 of the vessel 100, 200 from FIGS. 1A, 1B, 2A, 2B, 3A, 3B are illustrated, in accordance with various embodiments. The re-fill system 160 comprises a compressor 2002, valves 2010, 2012, a fluid conduit 2004, and one of the one or more pressure vessels 142 of the fluid supply system 140. As described above, and illustrated in FIG. 20C, the fluid supply system 140 can comprise a plurality of pressure vessel 2042, each of the plurality of pressure vessels 2042 fluidly coupled in parallel between the compressor 702 of the re-fill system 160 and the fluid outlets 146 of the fluid supply system 140. Although illustrated as including all of the one or more pressure vessels 142 in parallel, the present disclosure is not limited in this regard. For example, sets of the one or more pressure vessels 142 can be disposed in series and still be within the scope of this disclosure.

In various embodiments, the fluid conduit 2004 can be an extendable fluid conduit in mechanical communication with an actuator 2006. However, the present disclosure is not limited in this regard. For example, the re-fill system 160 could be without the actuator 2006, and the vessel 100, 200 could at least partially surface prior to re-filling the one or more pressure vessels 142 without extending the fluid conduit 2004 above the surface of the water (e.g., as shown in FIG. 20B and described further herein).

In various embodiments, various components of the re-fill system 160 are in electronic communication (i.e., wired or wireless communication) with the controller 801, 1101 of the control system 1800 from FIG. 18. Although controller 801, 1101 is illustrated as being in direct electronic communication with the re-fill system 160, the present disclosure is not limited in this regard. For example, re-fill system 160 can include a local controller that is in direct electronic communication with the controller 801, 1101 and configured to operate the re-fill system 160 and still be within the scope of this disclosure. In this regard, controller 801, 1101 could be in electronic communication with the local controller, in accordance with various embodiments.

In various embodiments, the controller 801, 1101 is in electronic communication with the valves 2010, 2012, the one or more sensors 2008, the actuator 2006, and/or the compressor 2002. In various embodiments, the compressor can be any type of compressor (e.g., a reciprocating compressor, a rotary compressor, such as an eccentric vane, a roots blower, or a screw compressor, a turbo-compressor, such as a centrifugal, an axial, or a mixed compressor, and a sector compressor. In various embodiments, the compressor 2002 can be a compressor of the propulsion system 134 (e.g., such as a compressor of a jet engine from FIG. 6A). In this regard, during re-filling of the fluid supply system 140 as described further herein, a portion of the propulsion system 134 (e.g., the compressor), can be utilized to compress air from the external environment and direct the compressed air to each of the one or more pressure vessels 142 to re-fill the fluid supply system 140, in accordance with various embodiments.

Referring now to FIGS. 20A-D, a process 2050 (FIG. 20D) performed by the controller 801, 1101 of the control system 1800 (FIG. 18) for re-filling a fluid supply system 140 (FIGS. 20B-C) is illustrated, in accordance with various embodiments. In various embodiments, the process 2050 is a sub-process of step 1960 from process 1950 from FIG. 19. The process 2050 comprises transitioning, by the one or more processors 802, 1102, a plurality of valves (e.g., valves 144, 2010, 2012) from a first configuration to a second configuration for at least one of the one or more pressure vessels 142 (step 2052). The first configuration of the plurality of valves (e.g., valves 144, 2010, 2012) can be an operational configuration or a completely closed configuration. The present disclosure is not limited in this regard. For example, an operational configuration can be a configuration of the plurality of valves (e.g., valves 144, 2010, 2012) configured to generate the supercavitation flow pattern over the vessel 100, 200 as described previously herein, and a completely closed configuration can be a configuration where all valves in the plurality of valves (e.g., valves 144, 2010, 2012) are closed (e.g., after transitioning from the propulsion system 134, 234 to the propulsion system 132 as described previously herein).

The process 2050 can further comprise commanding, by the one or more processors 802, 1102, operation of a compressor 2002 (step 2054). For example, the one or more processors 802, 1102 can command an electric motor of an electric-powered compressor, an electric starter of a gas-powered compressor or diesel engine compressor, or the like. The present disclosure is not limited in this regard.

In response to the operation of compressor 2002, process 2050 further comprises pulling air from an external environment 198 (e.g., above a surface of the water, i.e., waterline 191 as shown in FIG. 20B) into the at least one of the one or more pressure vessels 142 (step 2056). In various embodiments, each of the plurality of pressure vessels 2042 can be filled sequentially or simultaneously. For example, a first of the one or more pressure vessels 142 can be filled, then the valve 2010 corresponding to the first of the one or more pressure vessels 142 can be closed, then a valve 2010 corresponding to a second of the one or more pressure vessels 142 can be opened, then the second of the one or more pressure vessels 142 can be filled, and so on. Alternatively, in accordance with various embodiments, the valve 2010 for each of the one or more pressure vessels 142 that is to be re-filled can be in an open state simultaneously, and the valve 2010 for each of the one or more pressure vessels 142 can be closed by the one or more processors 802, 1102 after a threshold pressure (or volume) has been reached in the respective pressure vessel of the one or more pressure vessels 142. The process 2050 further comprises receiving, by the one or more processors 802, 1102 and through one or more sensors 2008, a pressure measurement of one of the one or more pressure vessels 142 (step 2058). In various embodiments, pressure measurement data from one of the one or more sensors 2008 is received if each of the one or more pressure vessels 142 is being filled sequentially. In various embodiments, a plurality of sets of pressure measurement data, each corresponding to a respective pressure vessel in the one or more pressure vessels 142, are received if each of the one or more pressure vessels 142 is filled simultaneously. In this regard, if each of the one or more pressure vessels 142 is filled simultaneously, each of the one or more pressure vessels 142 may exceed a pressure threshold at various times. Accordingly, the process 2050 further comprises determining, by the one or more processors 802, 1102, the pressure measurement exceeds a pressure threshold for each of the one or more pressure vessels 142 being filled (step 2060), and in response to determining the pressure measurement exceeds the pressure threshold for a respective pressure vessel in the one or more pressure vessels 142, closing the valve 2010 corresponding to the respective pressure vessel in the one or more pressure vessels 142 (step 2062).

In various embodiments, if each of the one or more pressure vessels 142 is filled simultaneously, steps 2060, 2062 can be continued for each of the one or more pressure vessels 142 until all pressure vessels in the plurality of pressure vessel 2042 are filled. If each of the one or more pressure vessels 142 is filled sequentially, steps 2060, 2062 can be performed sequentially for each of the one or more pressure vessels 142, with the next of the one or more pressure vessels 142 being filled by transitioning the valve 2010 from a closed state to an open state prior to step 2060, in accordance with various embodiments.

The process 2050 further comprises transitioning, by the one or more processors 802, 1102, the plurality of valves to a third configuration (step 2064). In various embodiments, the third configuration can be different from the first configuration in step 2052. For example, the first configuration can correspond to an operation mode utilizing the propulsion system 132 prior to re-filling by process 1950 from FIG. 19, and the third configuration can correspond to a supercavitation operation mode utilizing the propulsion system 134, 234, in accordance with various embodiments. In this regard, the vessel 100, 200 can transition directly back into a supercavitation mode, in accordance with various embodiments. In various embodiments, the third configuration can be the same as the first configuration in step 2052. For example, the first configuration and the third configuration can both correspond to an operation mode utilizing the propulsion system 132 (i.e., one prior to re-filling by process 1950 from FIG. 19, and the other prior to transitioning back to the supercavitation mode). In this regard, the vessel 100, 200 can operate with the propulsion system 132 for surfacing and submerging, in accordance with various embodiments. In various embodiments, although described herein as utilizing a propulsion system during surfacing and submerging, the present disclosure is not limited in this regard. For example, all of the propulsion systems (e.g., propulsion system 132 and propulsion system 134, 234) can be deactivated during surfacing and submerging and would still be within the scope of this disclosure.

Figure 21:
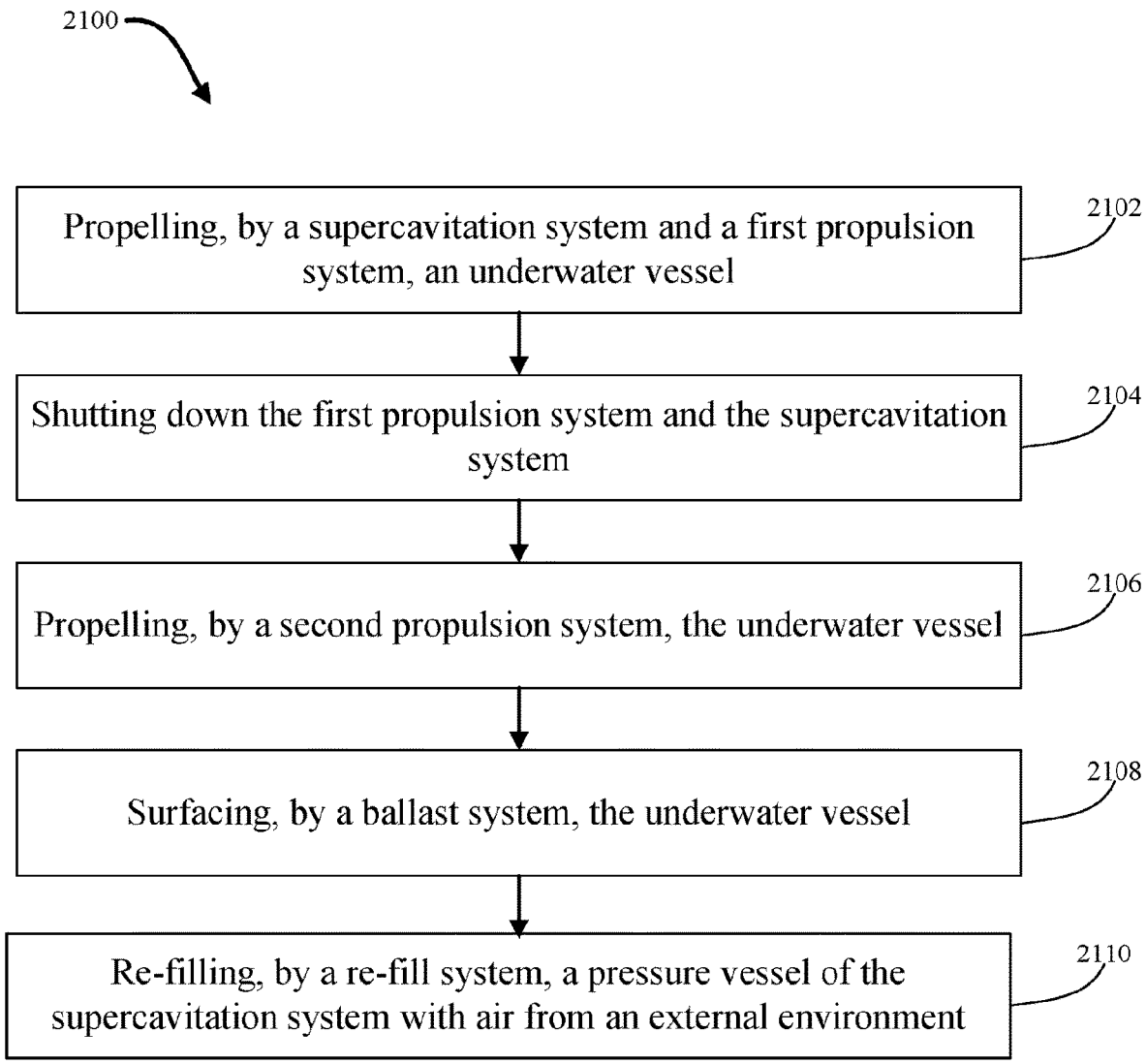
FIG. 21 illustrates a method for operating a vessel with a fluid supply system, in accordance with various embodiments.

Referring now to FIG. 21, method 2100 for operating a vessel 100, 200 from FIGS. 1A, 1B, 2A, 2B, 3A, 3B with the re-fill system 160 of FIG. 17 is illustrated, in accordance with various embodiments. With combined reference to FIGS. 1A-3B and 17, the method 2100 comprises propelling, by a fluid supply system 140 and a first propulsion system (e.g., propulsion system 134 or propulsion system 234), a vessel 100, 200 (step 2102). As described previously herein, the propulsion system 134, 234 can comprise a jet engine (FIG. 6A), a ramjet engine (FIG. 6B), and/or a rocket engine (FIG. 6C).

The method 2100 further comprises shutting down the first propulsion system (e.g., propulsion system 134, 234) and the fluid supply system 140 (step 2104). In various embodiments, the propulsion system 134, 234 and the fluid supply system 140 can be shut down due to a volume of fluid in the fluid supply system 140 being empty, or near empty, as described previously herein.

In various embodiments, the method 2100 further comprises propelling, by a second propulsion system (i.e., propulsion system 132), the vessel 100, 200 (step 2106). As described previously herein, the second propulsion system can comprise a pump jet/propulsor (FIG. 5A), conventional propellers (e.g., non-ducted propulsors) (FIG. 5B), permanent magnetic rotors (e.g., having a shaft in accordance with a rotor of FIG. 5C), or the like. In various embodiments, the propulsion system 132 can be powered by an energy storage device (e.g., a battery, a fuel cell, a supercapacitor, or the like). In various embodiments, the propulsion system 132 can be powered by nuclear energy, or any air-independent propulsion system known in the underwater vessel arts. The present disclosure is not limited in this regard.

In various embodiments, the method 2100 further comprises surfacing, by a ballast system 170, the vessel 100, 200 (step 2108). The ballast system 170 can discharge seawater disposed in the main ballast tanks and/or free flooded spaces to at least partially surface the vessel 100, 200 (i.e., to transition the vessel 100, 200 from a submerged configuration to a surfaced configuration). In response to surfacing the vessel 100, 200, the re-fill system 160 can be capable of being fluidly coupled to the external environment 198 (i.e., to pull air from the external environment), to re-fill the fluid supply system 140 as described previously herein.

In various embodiments, the method 2100 further comprises re-filling, by the re-fill system 160, each of the one or more pressure vessels 142 of the fluid supply system 140 with air from the external environment (step 2110). In this regard, as air can be readily accessible by the vessel 100, 200 (i.e., from surfacing or by extending a fluid conduit above the surface as described previously herein), the fluid supply system 140 can be easily and efficiently re-filled as desired during a respective trip, in accordance with various embodiments. In various embodiments, this allows a size of each of the one or more pressure vessels 142 to be greatly reduced in contrast with sizing a volume of fluid for the fluid supply system 140 based on a maximum trip length.

With combined reference now to FIGS. 1A, 1B, 2A, 2B, 3A, 3B, 7A, 8, a vessel 100, 200 is disclosed herein. In various embodiments, the vessel 100, 200 comprises: a hull 110 comprising a cavitator 114 and a main body 118, the main body 118 coupled to, and extending aft from, the cavitator 114, the main body 118 comprising an external surface 112; one or more fluid outlets 146 disposed in hull 110 (e.g., disposed in the cavitator 114, the main body 118 proximate the cavitator, or the like). The one or more fluid outlets 146 configured to be in fluid communication with a fluid source (e.g., an external environment 198, one or more pressure vessels 142, or the like) during operation in at least one mode (e.g., a supercavitation mode) of the vessel 110, 200, the one or more fluid outlets 146 configured to release the fluid and generate a boundary layer 164 over an external surface 112 of the main body 118 of the hull 110; and a propulsion system 134 configured to receive a first fluid directed by the one or more fluid outlets 146 along the external surface 112 of the main body 118 of the hull 110 during operation of the vessel 100, 200 in the at least one mode.

In various embodiments, the vessel 100, 200 further comprises a cargo bay 120 disposed within the hull 110.

In various embodiments, vessel 100, 200 further comprises one or more pressure vessels 142 coupled to the hull; and a valve 144 disposed fluidly between the one or more fluid outlets 146 and the one or more pressure vessels 142. In various embodiments, in response to at least partially opening the valve 114, at least one of the one or more pressure vessels 142 is fluidly coupled to each of the one or more fluid outlets 146. In various embodiments, the vessel 100, 200 further comprises a plurality of pressure vessels, wherein each of the plurality of the pressure vessels comprises a fluid disposed therein.

In various embodiments, the fluid for each of the plurality of the pressure vessels of the vessel 100 comprises one of a fuel or an oxidizer for the propulsion system 134. In various embodiments, each of a first set of the plurality of the pressure vessel comprises a fuel for the propulsion system 134, and each of a second set of the plurality of the pressure vessel comprises an oxidizer for the propulsion system 134.

In various embodiments, the vessel 100 further comprises a scoop 156 and a valve 152, wherein: the scoop 156 is coupled to the hull 110, the valve 152 configured to at least partially open, and in response to the valve 152 at least partially opening, a portion of a boundary layer flow 164 of the fluid is routed to the propulsion system 134. In various embodiments, scoop 156 is configured to divert a portion of the boundary layer flow into a fluid conduit during operation of the vessel. In various embodiments, the vessel 100, further comprising a controller 801 electronically coupled to the valve 152, the controller 801 is configured to at least partially open the valve 152 to fluidly couple the portion of the boundary layer flow 164 to the propulsion system 134. In various embodiments, the vessel 100 further comprises one or more sensors 806, each of the one or more sensors 806 electronically coupled to the valve 152, wherein the controller 801 is configured to: receive sensor data from the one or more sensors 806; determine, based on the sensor data, a parameter of the boundary layer flow 164 is met; and perform the step of at least partially opening the valve 152 in response to the parameter of the boundary layer flow 164 being met.

In various embodiments, the vessel 100 further comprises a scoop 156 and a valve 152, wherein: the scoop 156 is coupled to the hull 110, the valve 152 configured to at least partially open, and in response to the valve 152 at least partially opening, a portion of a boundary layer flow 164 of the fluid is routed to the propulsion system 134. In various embodiments, the vessel 100 further comprises one or more pressure vessels 142 disposed within the hull 110, a valve 144 disposed fluidly between the one or more pressure vessels 142 and the one or more fluid outlets 146, and a controller 801 electronically coupled to the valve 144 and the valve 152. In various embodiments, the controller 801 is configured to: at least partially open the valve 144 to generate the boundary layer flow 164 along the external surface 112 of the main body 118 of the hull 110 and perform the step of at least partially opening the valve 152 to fluidly couple the portion of the boundary layer flow 164 to the propulsion system 134. In various embodiments, the controller is further configured to: command the valve 144 to transition from a first closed state to a first open state at a first time; and subsequently command the valve 152 to transition from a second closed state to a second open state at a second time, wherein the controller is configured to wait for a transition time between commands, the transition time defined between the second time and the first time.

In various embodiments, the vessel 100 further comprises a scoop 156 and a valve 152, wherein: the scoop 156 is coupled to the hull 110, the valve 152 configured to at least partially open, and in response to the valve 152 at least partially opening, a portion of a boundary layer flow 164 of the fluid is routed to the propulsion system 134. In various embodiments, a portion of a boundary layer flow 164 is diverted into an inlet of the propulsion system 134 in response to transitioning the valve 152 from the second closed state to a second open state.

A method of operating vessel 100 (e.g., a supercavitation vehicle) is disclosed herein. In various embodiments, the method 100 comprises: routing a first fluid through one or more fluid outlets 146, the first fluid generating a boundary layer 164 over an external surface 112 of a main body 118 of the hull 110, the main body 118 coupled to, and extending aft from, a cavitator 114; diverting at least a portion of the first fluid to a propulsion system 134 disposed within the hull; and generating propulsion from the propulsion system 134 at least partially from the first fluid.

In various embodiments, the method further comprises fueling the propulsion system with the first fluid.

In various embodiments, the method further comprises generating propulsion from a second propulsion system prior to the releasing the first fluid.

In various embodiments, generating propulsion from the propulsion system further comprises injecting a second fluid into the propulsion system, the first fluid comprising an oxidizer, the second fluid comprising a fuel.

In various embodiments, generating propulsion from the propulsion system further comprises injecting a second fluid into the propulsion system, the first fluid comprising a fuel, the second fluid comprising an oxidizer.

With combined reference now to FIGS. 1A, 1B, 2A, 2B, 3A, 3B, 7A, 8, a vessel 100, 200 is disclosed herein. In various embodiments, the vessel 100, 200 comprises: a hull 110 comprising a cavitator 114 and a main body 118, the main body 118 coupled to, and extending aft from, the cavitator 114, the main body 118 comprising an external surface 112; one or more fluid outlets 146 disposed in hull 110 (e.g., disposed in the cavitator 114, the main body 118 proximate the cavitator, or the like). The one or more fluid outlets 146 configured to be in fluid communication with a fluid source (e.g., an external environment 198, one or more pressure vessels 142, or the like) during operation in at least one mode (e.g., a supercavitation mode) of the vessel 110, 200, the one or more fluid outlets 146 configured to release the fluid and generate a boundary layer 164 over an external surface 112 of the main body 118 of the hull 110; and a propulsion system 134 configured to receive a first fluid directed by the one or more fluid outlets 146 along the external surface 112 of the main body 118 of the hull 110 during operation of the vessel 100, 200 in the at least one mode.

With combined reference now to FIGS. 2A, 2B, 3A, 3B, 7A, and 11-14, a vessel 200 is disclosed herein. In various embodiments, the vessel 200 comprises: a hull 110; and a propulsion system 234 disposed at least partially within the hull 110, the propulsion system 234 comprising a rocket engine 1110 and a re-usable ignition system 1112, the re-usable ignition system 1112 configured to ignite a solid propellant a plurality of distinct and separate times.

In various embodiments, vessel 200 further comprises a fluid supply system 140, 740 disposed at least partially within hull 110. In various embodiments, the fluid supply system 140, 740 comprises one or more fluid outlets 146 disposed in the hull 110, the one or more fluid outlets 146 configured to be in fluid communication with a fluid source (e.g., one or more pressure vessels 142, an external environment 198, or the like) during operation of the vessel 200 in a first mode (e.g., a supercavitation mode), the one or more fluid outlets 146 configured to release the fluid along the external surface 112 of the main body 118 in the first mode.

In various embodiments, the fluid supply system 140 comprises one or more pressure vessels 142, one or more fluid conduits 145, and a valve 144. In various embodiments, the hull 110 comprises a cavitator 114, the cavitator 114 configured to be wetted by water during operation of the fluid supply system 140, and the one or more fluid conduits 145 extends from the one or more pressure vessels 142 to one or more fluid outlets 146 disposed in the hull 110 (e.g., the cavitator 114 or in the main body 118 proximate the cavitator 114). In various embodiments, hull 110 comprises a main body 118 coupled to, and extending aft from, the cavitator 114. In various embodiments, the fluid supply system 140 is configured to release the fluid over an external surface 112 of the hull 110 in response to the valve 144 at least partially opening. In various embodiments, at least one of the one or more vessels 142 comprises one of a hydrogen gas, a helium gas, an oxygen gas, and air.

In various embodiments, the fluid source comprises the external environment 198. In various embodiments, the vessel 100, 200 comprises an aerodynamic structure 720 and a rotor 744 coupled to the aerodynamic structure 720, the aerodynamic structure 720 extending outward from the hull 110, the rotor 744 configured to pull air from the external environment 198 through one or more fluid conduits 745 and out the one or more fluid outlets 146 to generate a supercavitation flow pattern over the main body 118 of the vessel 200.

In various embodiments, the vessel 200 further comprises a pressure hull 117, the pressure hull 117 including a cargo bay 120 disposed therein.

In various embodiments, vessel 200 further comprises a second propulsion system (e.g., propulsion system 132) including one of a pump jet/propulsor (FIG. 5A), a propeller (FIG. 5B), and a permanent magnetic rotor (FIG. 5C).

In various embodiments, vessel 200 comprises a plurality of the rocket engine 1110 (e.g., engines 171, 173, 175, 177, engine 171 and engine 175, or engine 173 and engine 177). In various embodiments, the plurality of the rocket engine 1110 can be spaced apart circumferentially about an aerodynamic center of the hull 110.

In various embodiments, the propulsion system 234 further includes a chamber decompression system 1114 configured to extinguish a burn of a solid propellant in the rocket engine 1110.

In various embodiments, the rocket engine 1110 is configured to operate with an electric solid propellant 1232. In various embodiments, the re-usable ignition system 1230 further comprises a power source 1231, the propulsion system 234 configured to electrically couple the power source 1231 to the electric solid propellant 1232 to initiate a burning of the electric solid propellant 1232 and to electrically de-couple the power source 1231 from the electric solid propellant 1232 to stop the burning of the electric solid propellant 1232.

In various embodiments, the reusable ignition system 1112, 1210 includes an electrolyzer 1212 and an ignitor 1218 (e.g., an electrode), the electrolyzer 1212 configured to release a mixture 1214 of hydrogen and oxygen into a combustion chamber 1216 of the rocket engine 1110, the ignitor 1218 configured to generate a spark to ignite the mixture 1214.

A method of operating vessel 200 is disclosed herein. In various embodiments, the method comprises: igniting, via a first propulsion system (e.g., propulsion system 234), a rocket engine 1110 to propel a vessel 200; extinguishing a burn of the rocket engine 1110; and powering, via a second propulsion system (e.g., propulsion system 132), the vessel 200.

In various embodiments, the method further comprises flowing a fluid over an external surface 112 of a main body 118 of a hull 112 of the vessel, the main body 118 coupled to and extending aft from a cavitator of the hull 110, wherein the fluid comprises at least one of air, oxygen gas, chlorine gas, and helium gas. In various embodiments, the method further comprises stopping the fluid from flowing over the external surface 112 of the main body 118 of the hull 110.

In various embodiments, the extinguishing the burn further comprises decompressing a combustion chamber 1216 of the rocket engine 1110.

In various embodiments, the igniting rocket engine 1110 comprises electrolyzing water (e.g., via an electrolyzer 1212) to form a hydrogen and oxygen mixture and generating a spark (e.g., via an ignitor 1218) to ignite the mixture 1214.

An article of manufacture including a tangible, non-transitory computer-readable storage medium (e.g., one or more memories 1104) having instructions stored thereon for operating a vessel 200, in response to execution by one or more processors 1102, cause the one or more processors 1102 to perform operations comprising: commanding, by the one or more processors, a first propulsion system (e.g., propulsion system 132) to propel the vessel 200; commanding, by the processor, an ignition of a rocket engine 1110 of a second propulsion system 234; and in response to the commanding the ignition of the rocket engine 1110, propelling the vessel 200 at a speed greater than a speed of sound.

In various embodiments, the commanding the ignition of the rocket engine 1110 comprises commanding a release of a mixture 1214, 1224 of hydrogen and oxygen into a combustion chamber 1216 of the rocket engine 1110, and commanding ignition of the mixture 1214, 1224. In various embodiments, the operations further comprise commanding, by the one or more processors, a valve 144 to release a fluid over an external surface 112 of a main body 118 of a hull 110 of the vessel 200.

With combined reference now to FIGS. 1A, 1B, 2A, 2B, 3A, 3B, 7A, and 17-20C, a vessel 100, 200 is disclosed herein. In various embodiments, the vessel 100, 200, comprises: a hull 110 including a cavitator 114 and a main body 118, the main body 118 coupled to, and disposed aft of, the cavitator 114, the main body 118 comprising an external surface 112; a fluid supply system 140 disposed at least partially within the hull, the fluid supply system 140 including a pressure vessel (e.g., at least one of the one or more pressure vessels 142) and a fluid outlet 146 (e.g., at least one of the one or more fluid outlets 146), the fluid supply system 140 configured to release a fluid from the pressure vessel, out the fluid outlet, and at least partially along the external surface 112 of the main body 118; and a re-fill system 160 comprising a compressor 2002 and a valve 2012, the re-fill system 160 configured to re-fill the pressure vessel with air from an external environment 198.

In various embodiments, vessel 100, 200 further comprises a pressure sensor (e.g., one of the one or more sensors 2008 is a pressure sensor) configured to measure a pressure within a cavity defined by the pressure vessel. In various embodiments, the vessel 100, 200 further comprises a controller 801, 1101 in electronic communication with the valve 2012, the compressor 2002, and the pressure sensor, the controller 801, 1101 configured to command the re-fill system 160 to re-fill the pressure vessel in response to the controller 801, 1101 determining a parameter of the fluid supply system 140 is below a threshold parameter of the fluid supply system 140. In various embodiments, the controller 801, 1101 is further configured to: receive, from the pressure sensor, pressure data; determine, based on the pressure data, the fluid supply system 140 includes a fluid volume that is less than a threshold volume; commanding the vessel 100, 200 to transition from a first propulsion system (e.g., propulsion system 134, 234) to a second propulsion system 132; and commanding the re-fill system 160 to re-fill the pressure vessel with the air from the external environment.

In various embodiments, the fluid supply system 140 further comprises a plurality of pressure vessels 2042 including the pressure vessel.

In various embodiments, each of the plurality of pressure vessels are disposed proximate a forward end of the vessel 100, 200 (i.e., spaced apart longitudinally in closer proximity to a forward end relative to an aft end). For example, the plurality of pressure vessels can be twice as close to the forward end relative to the aft end, three times as close between 1 and 10 times as close, 10 times or more close, or the like). The present disclosure is not limited in this regard.

In various embodiments, the fluid supply system 140 comprises a first fluid conduit (e.g., one of the one or more fluid conduits 145) extending from the pressure vessel (e.g., one of the one or more pressure vessels 145) to a fluid outlet (e.g., each of the one or more fluid outlets 146), the fluid outlet configured to direct the fluid along the external surface 112 of the main body 118 of the hull 110, and the re-fill system 160 comprises a second fluid conduit (e.g., fluid conduit 2004) configured to be in fluid communication with the pressure vessel.

In various embodiments, the re-fill system 160 is configured to pull air from the external environment 198 with the compressor 2002 into the pressure vessel.

In various embodiments, the vessel 100 further comprises an air-breathing engine (e.g., jet engine from FIG. 6A, ramjet engine from FIG. 6B, or a turbine-based combined cycle propulsion engine 2300 from FIGS. 23A-E) configured to receive a portion of the fluid flowing over the external surface 112 of the main body 118 of the hull 110 during operation of the fluid supply system 140. In various embodiments, the air-breathing engine includes the compressor of the re-fill system.

A method of operating a vessel 100, 200 is disclosed herein. In various embodiments, the method comprises: propelling, by a fluid supply system 140 and a first propulsion system (e.g., propulsion system 134, 234), the vessel 100, 200, the vessel generating a supercavitation flow patter in response to the propelling; shutting down the first propulsion system and the fluid supply system 140; surfacing, by a ballast system 170, the vessel 100, 200; and re-filling, by a re-fill system 160, a pressure vessel (e.g., at least one of the one or more pressure vessels 142) of the fluid supply system 140 with air from an external environment 198.

In various embodiments, a portion of the hull of the vessel 100, 200 is disposed above a waterline of a body of water during the re-filling the pressure vessel, and the external environment 198 is disposed above the waterline 191 of the body of water.

In various embodiments, the pressure vessel is re-filled while propelling the vessel with a second propulsions system (e.g., propulsion system 132).

In various embodiments, the method further comprises re-starting the first propulsion system (e.g., propulsion system 134, 234) and the fluid supply system 140, after the re-filling the pressure vessel, to propel the vessel 100, 200 with the supercavitation flow pattern.

In various embodiments, a fluid released from the fluid supply system 140 is a motive fluid for the first propulsion system (e.g., propulsion system 134).

In various embodiments, the re-filling the pressure vessel comprises pulling air from the external environment 198, by a compressor 2002, into the one or more pressure vessel. In various embodiments, the first propulsion system includes the compressor.

An article of manufacture including a tangible, non-transitory computer-readable storage medium (e.g., one or more memories 804, 1104) having instructions stored thereon for operating a vessel 100, 200, in response to execution by one or more processors 802, 1102, cause the one or more processors 802, 1102 to perform operations comprising: commanding, by the one or more processors, a fluid released from a fluid supply system 140 of the vessel 100, 200; commanding, by the processor, a first propulsion system (e.g., propulsion system 134, 234) to propel the vessel 100, 200; determining, by the one or more processors 802, 1102, a parameter of the fluid supply system 140 is below a threshold parameter of the fluid supply system 140; transitioning, by the one or more processors 802, 1102, operation of the first propulsion system (e.g., propulsion system 134, 234) to operation of a second propulsion system (e.g., propulsion system 132); commanding, by the one or more processors 802, 1102, a re-fill system 160 to re-fill the fluid of the fluid supply system 140 with air from an external environment 198.

In various embodiments, the commanding the re-fill system 160 includes starting a compressor 2002 and opening a valve 2012 to fluidly couple a pressure vessel (e.g., at least one of the one or more pressure vessels 142) of the fluid supply system 140 to the external environment 198. In various embodiments, in response to fluidly coupling the pressure vessel to the external environment 198, the air is pulled into the pressure vessel.

With combined reference now to FIGS. 1A, 1B, 3A, 3B, 7A, 7B, a vessel 100 is disclosed herein. In various embodiments, vessel 100 comprises a hull 110; an air-breathing engine (e.g., jet engine from FIG. 6A, ramjet from FIG. 6B, turbine-based combined cycle propulsion engine 2300 from FIGS. 23A-E, a hybrid gas-electric turbine engine, or the like); and a fluid supply system 740 (e.g., a supercavitation system) configured to fluidly couple an external environment 198 with the air-breathing engine (e.g., jet engine from FIG. 6A, ramjet from FIG. 6B, or turbine-based combined cycle propulsion engine 2300 from FIGS. 23A-E) and to generate a supercavitation flow pattern (e.g., boundary layer 164) along a portion of an external surface of the hull 110 in response to operating in a supercavitation mode.

In various embodiments, at least 75% of the surface area of the hull, or at least 85% of a surface area of the hull 110, or at least 90% of a surface area of the hull 110 is below a water line in response to operating in the supercavitation mode. In various embodiments, vessel 100 is configured to travel at speeds greater than Mach 0.5, or greater than Mach 1, or greater than Mach 3, or greater than Mach 4 in response to operating in the supercavitation mode.

In various embodiments, hull 110 of vessel 100 comprises a cavitator disposed at a forward end of hull 110. In various embodiments, vessel 100 comprises an aerodynamic structure extending outward from the hull 110, the fluid supply system 740 including an inlet 741 configured above a waterline 191 while operating in the supercavitation mode of the fluid system 740. In various embodiments, inlet 741 is in fluid communication with the air-breathing engine in response to operating in the supercavitation mode. In various embodiments, the fluid supply system 740 further comprises an outlet (e.g., at least one of one or more fluid outlets 146) disposed on a surface of an aft end of the cavitator 114

(or disposed proximate the cavitator 114 in the main body 118 of the hull 110), wherein the inlet 741 is in fluid communication with the outlet, and wherein the outlet is configured to release the air along the portion of the external surface 112 of the hull 110 in response to operating in the supercavitation mode.

In various embodiments, vessel 100 further comprises a rotor coupled to the aerodynamic structure 720 and configured to pull air from the external environment 198 through inlet 741. In various embodiments, a first portion of the air is released along an external surface 112 of the hull 110, and a second portion of the air is directed to the air-breathing engine (e.g., propulsion system 134). In various embodiments, vessel 100 further comprises one or more fluid conduits (e.g., a duct) extending longitudinally along the main body 118 of the hull 110, the duct in fluid communication with the inlet 741.

In various embodiments, the air-breathing engine comprises a turbine-based combined cycle engine 2300 from FIGS. 23A-E.

In various embodiments, vessel 100 further comprises a pressure hull disposed within the hull, the pressure hull including a cargo bay disposed therein.

A method of operating vessel 100 is disclosed herein. In various embodiments, the method comprises: receiving air from an external environment 198 through an inlet 741 of a vessel 100, at least 75% of the surface area of the vessel 100 being below a water line; directing a first portion of the air to an air breathing engine disposed within the hull 110; forming a boundary layer 164 along an external surface of the hull 110 with a second portion of the air; and propelling the underwater vessel 100, by the air breathing engine, with the air being a motive fluid.

In various embodiments, the receiving the air further comprises pulling the air from the external environment 198.

In various embodiments, the pulling the air further comprises pulling, via a rotor disposed within one of a nacelle coupled to an aerodynamic structure 720 or a fluid conduit (e.g., one of the one or more fluid conduits 745 disposed through the aerodynamic structure 720, the air from the external environment 198.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote various parts but not necessarily to denote the same or dissimilar materials.

Systems, methods, and apparatus are provided herein. In the detailed description herein, references to "various embodiments" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

I claim:

1. A vessel, comprising:
   a hull comprising a cavitator and a main body, the main body coupled to the cavitator, the main body extending aft from the cavitator, the main body comprising an external surface;
   a ballast tank disposed in the hull;
   an air-breathing engine coupled to the hull;
   a fluid supply system comprising a fluid outlet disposed in the hull, the fluid outlet configured to be in fluid communication with a fluid source during operation of the vessel in a supercavitation mode, the fluid supply system configured to form a supercavitation flow pattern in response to operating in the supercavitation mode, wherein the air-breathing engine is configured to receive a portion of a fluid from the fluid source of the fluid supply system during operation of the vessel in the supercavitation mode;
   a fluid conduit routed from an inlet of the air-breathing engine to the external surface of the main body of the hull and a valve coupled to the fluid conduit;
   one or more sensors and a controller, the controller in electronic communication with the valve and the one or more sensors, wherein the controller is configured to:
   receive sensor data from the one or more sensors;

determine, based on the sensor data, the supercavitation flow pattern is formed over the external surface of the main body of the hull;

at least partially open the valve in response to the supercavitation flow pattern being formed; and in response to the valve being at least partially opened, at least the portion of the fluid from the supercavitation flow pattern is routed to the inlet of the air-breathing engine.

2. The vessel of claim 1, further comprising a hybrid propulsion system including the air-breathing engine and a propulsor, wherein:

the propulsor is coupled to the hull, and the hybrid propulsion system is configured to operate in a non-supercavitation mode with the propulsor.

3. The vessel of claim 1, further comprising an aerodynamic structure extending outward from the hull.

4. The vessel of claim 3, further comprising a fluid conduit routed through the aerodynamic structure, the fluid conduit configured to be in fluid communication with the fluid source and the fluid outlet in the supercavitation mode.

5. The vessel of claim 4, wherein:

the fluid source is an external environment above a waterline, and in the supercavitation mode, the main body and the cavitator are disposed entirely below the waterline.

6. The vessel of claim 3, wherein:

the aerodynamic structure includes an airfoil, and the airfoil is substantially symmetric about a chord line extending from a leading-edge to a trailing edge of the airfoil.

7. The vessel of claim 6, wherein:

the airfoil comprises a cross-sectional shape having a max camber location and an airfoil fluid outlet, the airfoil fluid outlet disposed aft of the max camber location, the fluid outlet configured to be in fluid communication with the fluid source during operation of the vessel in the supercavitation mode.

8. The vessel of claim 3, further comprising a rotor coupled to the aerodynamic structure, the rotor configured to pull air from the external environment through a fluid conduit and out the fluid outlet.

9. The vessel of claim 8, wherein the supercavitation flow pattern is formed in response to the air being pulled from the external environment, through the aerodynamic structure, and out the fluid outlet.

10. The vessel of claim 1, further comprising a pressure hull coupled to the hull, the pressure hull comprising a cargo bay disposed therein.

11. The vessel of claim 1, wherein the air-breathing engine comprises one of a gas turbine engine, a hybrid electric-gas turbine engine, a ramjet engine, or a turbine-based combined cycle engine.

12. The vessel of claim 1, wherein:

the cavitator comprises a surface configured to be wetted by water during operation in the supercavitation mode, and the cavitator defines a leading-edge body of the hull.

13. The vessel of claim 1, further comprising a propulsor coupled to the hull and a plurality of the air-breathing engine, wherein each of the plurality of the air-breathing engine is disposed radially outward from the propulsor relative to a longitudinal axis of the propulsor.

14. The vessel of claim 1, further comprising a ballast system including the ballast tank, the ballast system configured to transition the hull from a surfaced configuration to at least a partially submerged configuration.

15. The vessel of claim 1, further comprising a re-fill system comprising a compressor and a second valve, wherein:

the fluid supply system comprises a pressure vessel, and the re-fill system is configured to refill the pressure vessel with air from an external environment.

16. A method of operating the vessel of claim 1, the method comprising:

routing the fluid through the fluid outlet, the fluid generating the supercavitation flow pattern over the external surface of the main body of the hull;

diverting at least the portion of the fluid to the air-breathing engine disposed within the hull; and generating propulsion from the air-breathing engine at least partially from the fluid.

17. A method of operating a vessel that comprises a hull comprising a cavitator and a main body, the main body coupled to the cavitator, the main body extending aft from the cavitator, the main body comprising an external surface; a ballast tank disposed in the hull; an air-breathing engine coupled to the hull; and a fluid supply system comprising a fluid outlet disposed in the hull, the fluid outlet configured to be in fluid communication with a fluid source during operation of the vessel in a supercavitation mode, the fluid supply system configured to form a supercavitation flow pattern in response to operating in the supercavitation mode, the method comprising:

routing a fluid from the fluid source through the fluid outlet, the fluid generating the supercavitation flow pattern over the external surface of the main body of the hull;

diverting at least a portion of the fluid from the supercavitation flow pattern to the air-breathing engine disposed within the hull; and generating propulsion from the air-breathing engine at least partially from the fluid.

* * * * *